(12) United States Patent
Tani et al.

(10) Patent No.: US 6,335,722 B1
(45) Date of Patent: Jan. 1, 2002

(54) VIDEO OR INFORMATION PROCESSING METHOD AND PROCESSING APPARATUS, AND MONITORING METHOD AND MONITORING APPARATUS USING THE SAME

(75) Inventors: Masayuki Tani, Katsuta; Kimiya Yamaashi, Hitachi; Koichiro Tanikoshi, Hitachi; Masayasu Futakawa, Hitachi; Shinya Tanifuji, Hitachi; Atsuhiko Nishikawa, Mito; Atsuhiko Hirota, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/328,566

(22) Filed: Oct. 24, 1994

Related U.S. Application Data

(63) Continuation of application No. 07/960,442, filed as application No. PCT/JP92/00434 on Apr. 8, 1992, now abandoned.

(30) Foreign Application Priority Data

| Apr. 8, 1991 | (JP) | 3-074927 |
| Sep. 18, 1991 | (JP) | 3-238277 |

(51) Int. Cl.⁷ ................................................. G09G 5/08
(52) U.S. Cl. .......................... 345/173; 348/36; 348/208; 340/325.06
(58) Field of Search .................. 395/155–161; 364/138, 139; 345/156, 157, 113, 185; 348/15

(56) References Cited

U.S. PATENT DOCUMENTS

| 4,258,385 A | * 3/1981 | Greenberg et al. ........... 345/113 |
| 4,286,289 A | * 8/1981 | Ottesen et al .............. 340/712 X |
| 4,727,539 A | * 2/1988 | Arita et al. ..................... 370/89 |
| 4,763,356 A | * 8/1988 | Day, Jr. et al. .............. 345/113 |
| 4,764,882 A | 8/1988 | Braschel et al. ............. 364/508 |
| 4,801,421 A | 1/1989 | Ackerson et al. ............ 376/249 |
| 4,833,592 A | * 5/1989 | Yamanaka .................... 364/138 |
| 4,857,902 A | * 8/1989 | Naimark et al. |
| 4,893,115 A | * 1/1990 | Blanchard ..................... 340/712 |

(List continued on next page.)

FOREIGN PATENT DOCUMENTS

| DE | 4033303 | 4/1991 |
| EP | 0-436-312 A3 | 7/1991 |
| JP | 1240978 | 9/1989 |
| JP | 353292 | 3/1991 |

(List continued on next page.)

OTHER PUBLICATIONS

Marty Franz, *Object–Oriented Programming*, Scott, Foresman and Co., 1990, pp. 3–10.*

Setrag Khoshafian et al., *Intelligent Offices*, John Wiley & Sons, Inc., 1985–1992, pp. 208,209, 236–241, 305–312, 323–325.*

(List continued on next page.)

*Primary Examiner*—Amare Mengistu
(74) *Attorney, Agent, or Firm*—Antonelli, Terry, Stout & Kraus, LLP

(57) ABSTRACT

In a remote operation monitoring system and the like, it is a video processing apparatus capable of intuitively grasping an object operated by an operator and an operation result. The video processing apparatus includes a unit (310, 320, 2104, 2202) for storing information about at least one object displayed on a screen of a display unit; a unit (12, 2105) for designating information about the object; a unit (300, 2201) for searching the store unit based upon the designated information, and for obtaining information within the store unit corresponding to the designated information; and also a unit (20, 2103) for performing a process related to the object based on the obtained information. An operator can readily grasp an object to be operated and a result.

7 Claims, 51 Drawing Sheets

U.S. PATENT DOCUMENTS

| | | | | |
|---|---|---|---|---|
| 4,914,624 A | * | 4/1990 | Dunthorn | 340/712 |
| 4,992,866 A | * | 2/1991 | Morgan | |
| 5,021,878 A | * | 6/1991 | Lang | |
| 5,025,314 A | * | 6/1991 | Tang et al. | 358/93 |
| 5,095,365 A | * | 3/1992 | Takatoo et al. | 358/108 |
| 5,124,908 A | * | 6/1992 | Broadbent | 395/161 X |
| 5,187,571 A | * | 2/1993 | Braun et al. | |
| 5,201,034 A | * | 4/1993 | Matsuura et al. | 395/161 X |
| 5,412,400 A | * | 5/1995 | Takahara et al. | 345/185 |
| 5,568,183 A | * | 10/1996 | Cortjens et al. | 348/15 |
| 5,684,514 A | * | 11/1997 | Branscomb | 345/157 |
| 5,777,896 A | * | 7/1998 | Arita et al. | 364/550 |

FOREIGN PATENT DOCUMENTS

| | | |
|---|---|---|
| JP | 372397 | 3/1991 |
| KR | 88-11818 | 10/1988 |
| KR | 91-12991 | 12/1990 |

OTHER PUBLICATIONS

Pollack, Andrew, "For Artificial Reality, Wear A Computer," The New York Times, Monday, Apr. 10, 1989, pp. D1 and D5.*

* cited by examiner

FIG. 1B

| CONSTRUCTIVE ELEMENTS OF FIG.1 | ELEMENTS CORRESPONDING TO FIRST EMBODIMENT | ELEMENTS CORRESPONDING TO SECOND EMBODIMENT |
|---|---|---|
| DISPLAY UNIT | DISPLAY 10 | DISPLAY 2111 |
| SCREEN POSITION DESIGNATING UNIT | PRESSURE SENSITIVE TOUCH PANEL 12 | MOUSE 2150, TOUCH PANEL 2107 |
| VIDEO/GRAPHICS SYNTHESING UNIT | BLEND CIRCUIT IN MAN/MACHINE SERVER | BLEND CIRCUIT 2207 IN WORK STATION 2103 |
| VIDEO OUTPUT UNIT | CAMERA 60 | CAMERA 2110, VIDEO/AUDIO RECORDING UNIT 2108 |
| OBJECT IDENTIFYING/PROCESS EXECUTING UNIT | CPU 3000 FIG 18 IN MAN/MACHINE SERVER | CPU 2201, MAIN MEMORY 2202 IN WORK STATION 2103, FIG. 50-54 |
| OBJECT INFORMATION STORAGE UNIT | DISK 320 IN MAN/MACHINE SERVER 20, MAIN MEMORY 310, FIG 23-25 | DATABASE 2104, MAIN MEMORY 2202, FIG. 60 |

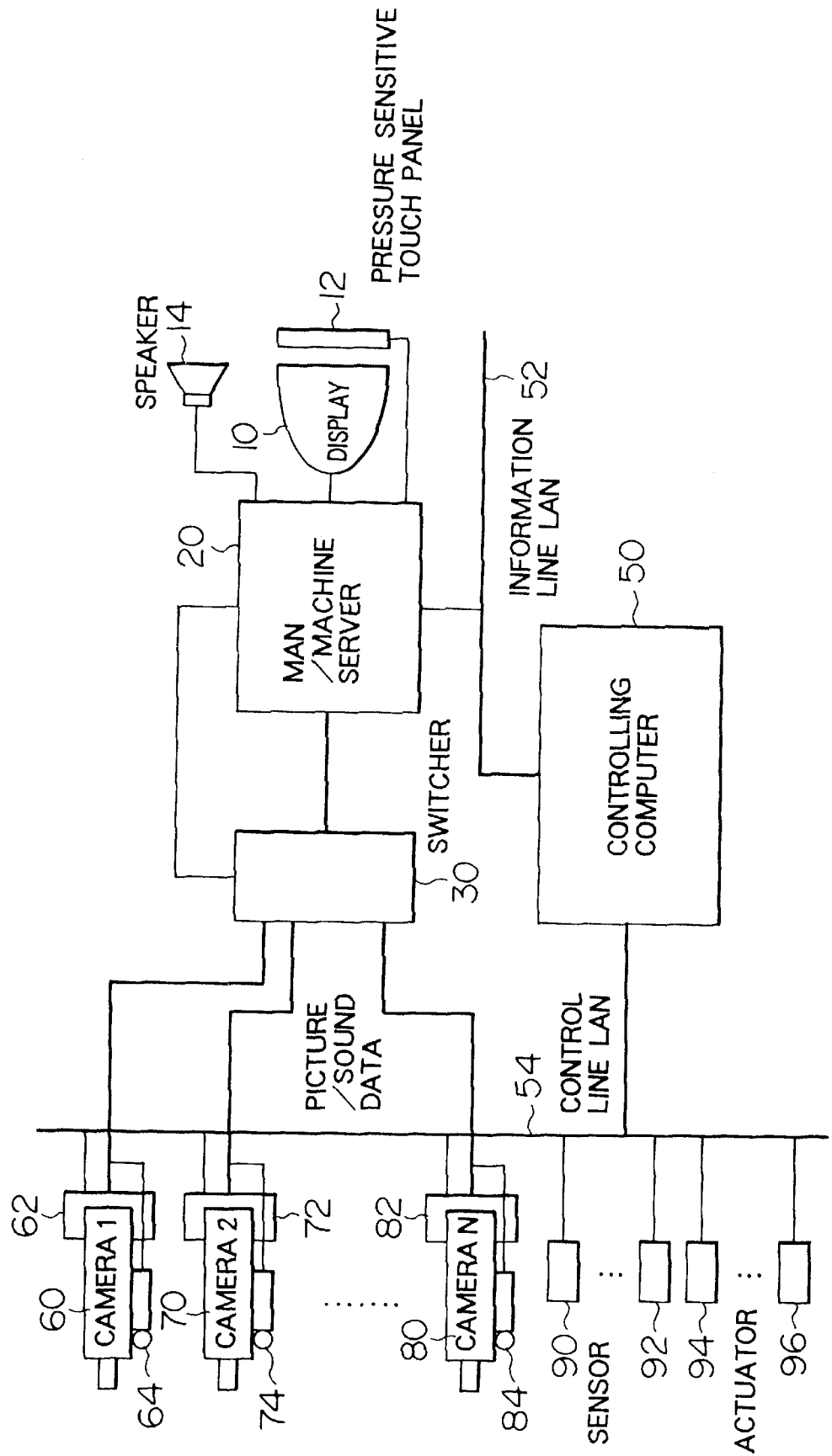

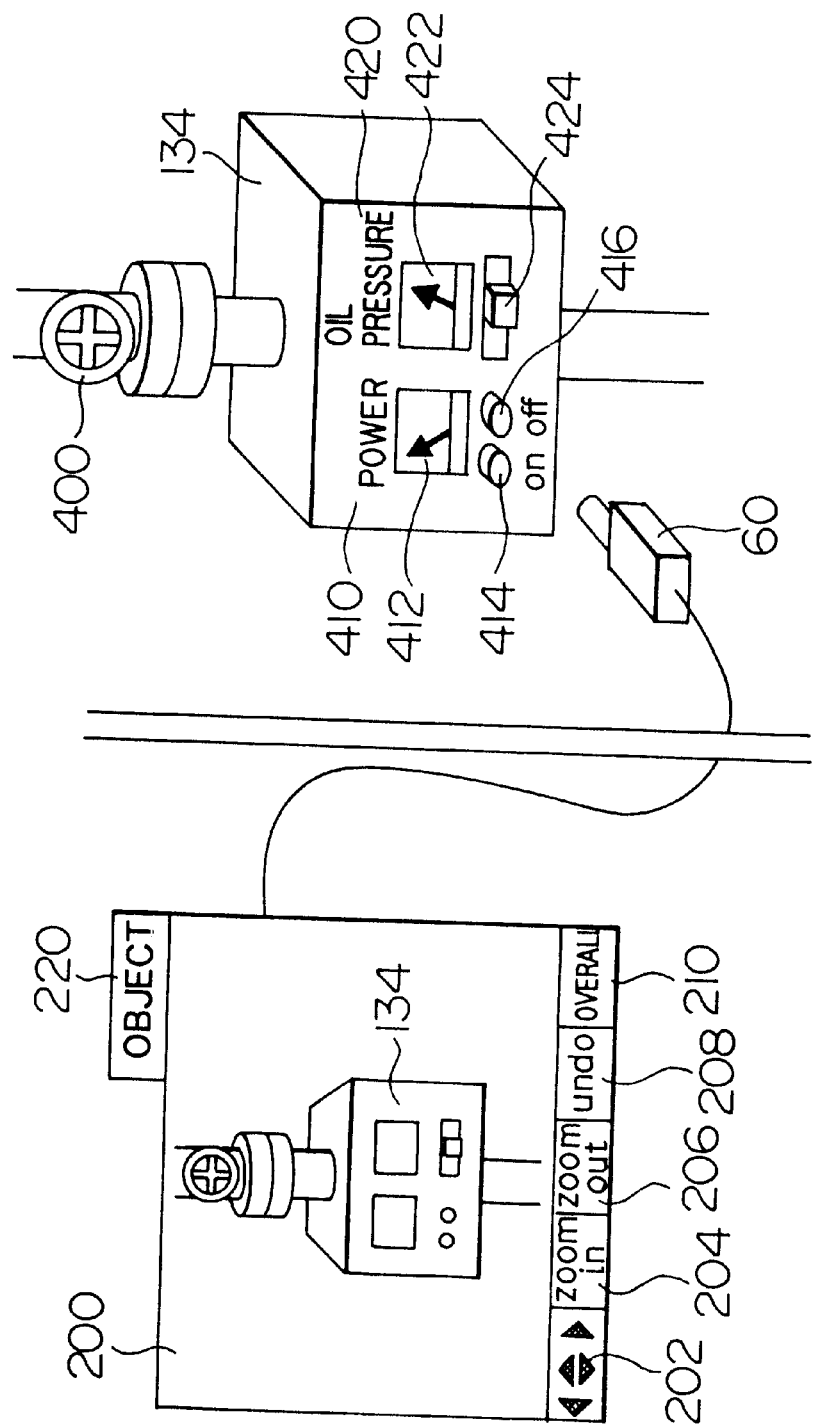

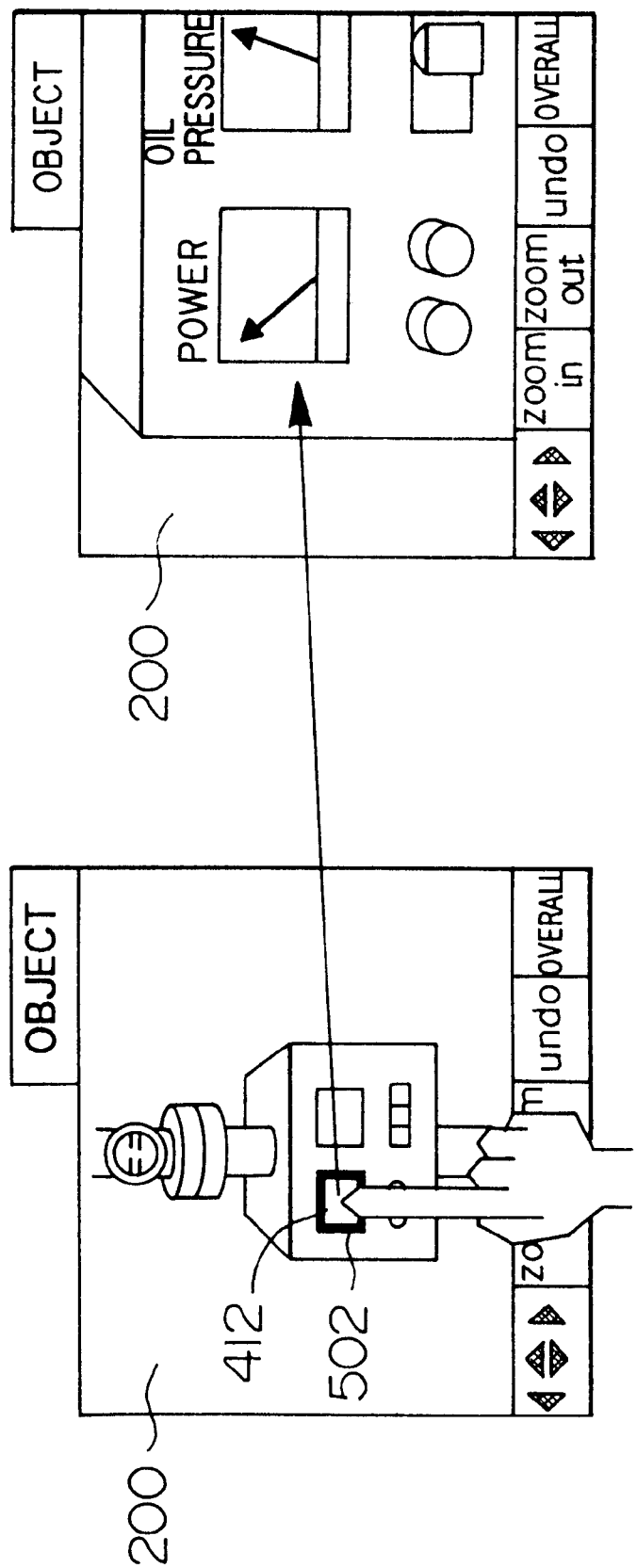

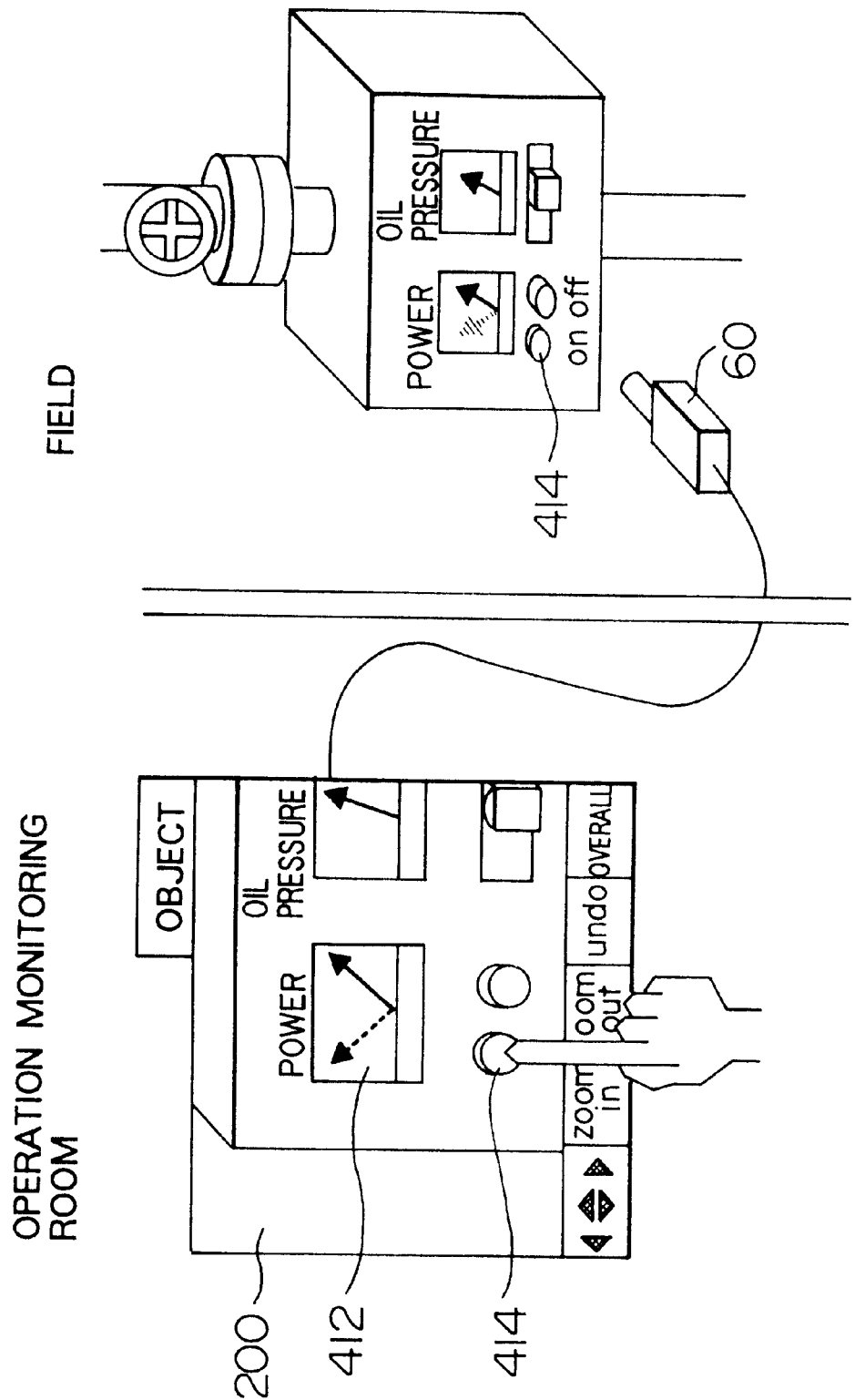

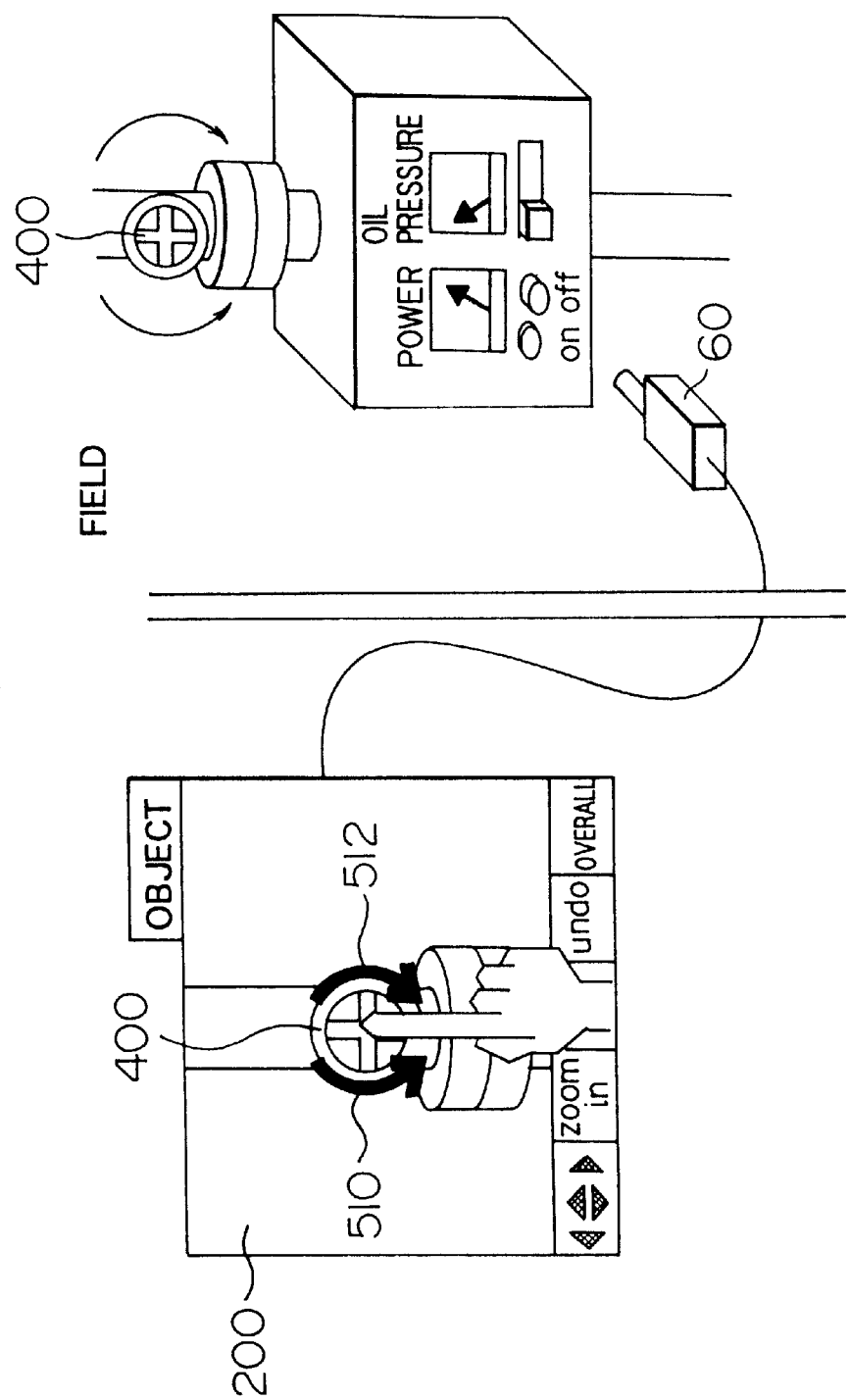

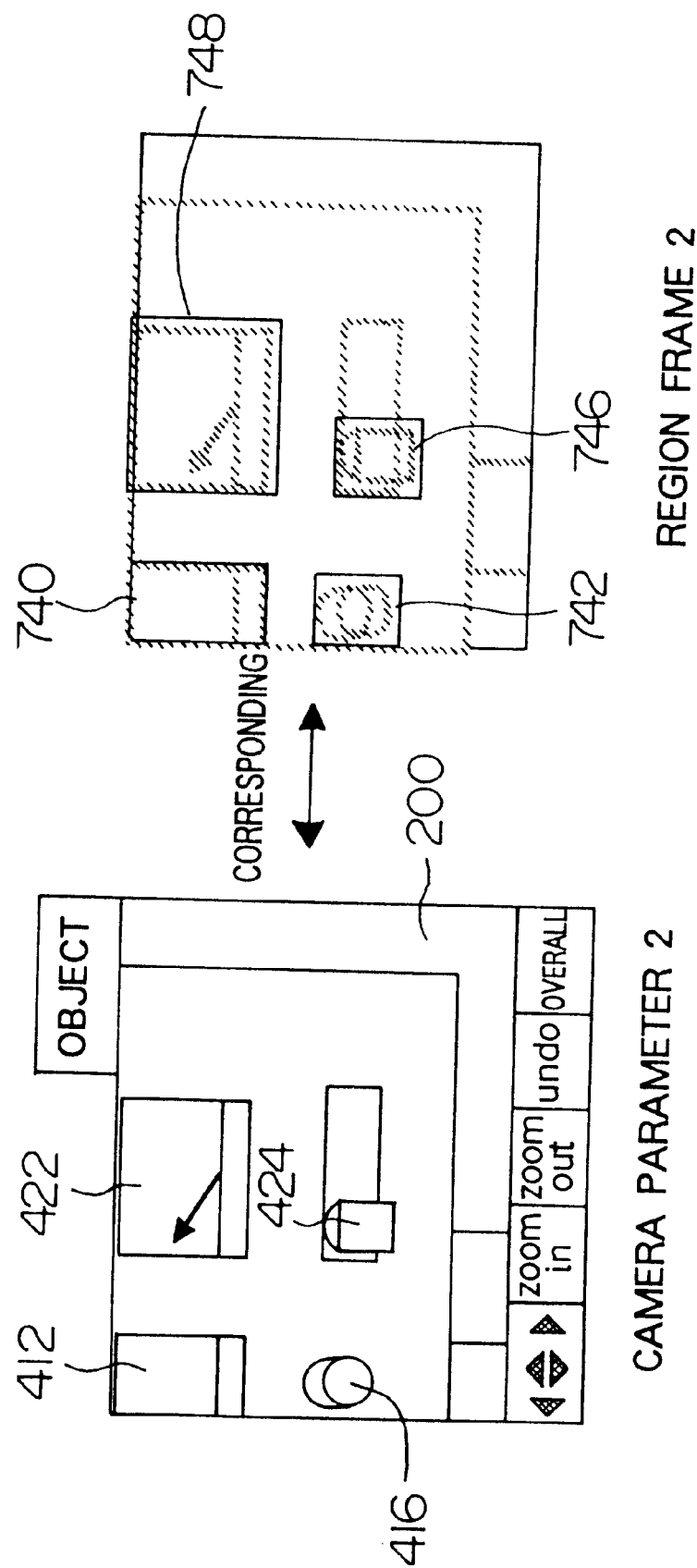

CAMERA PARAMETER 3

REGION FRAME 3

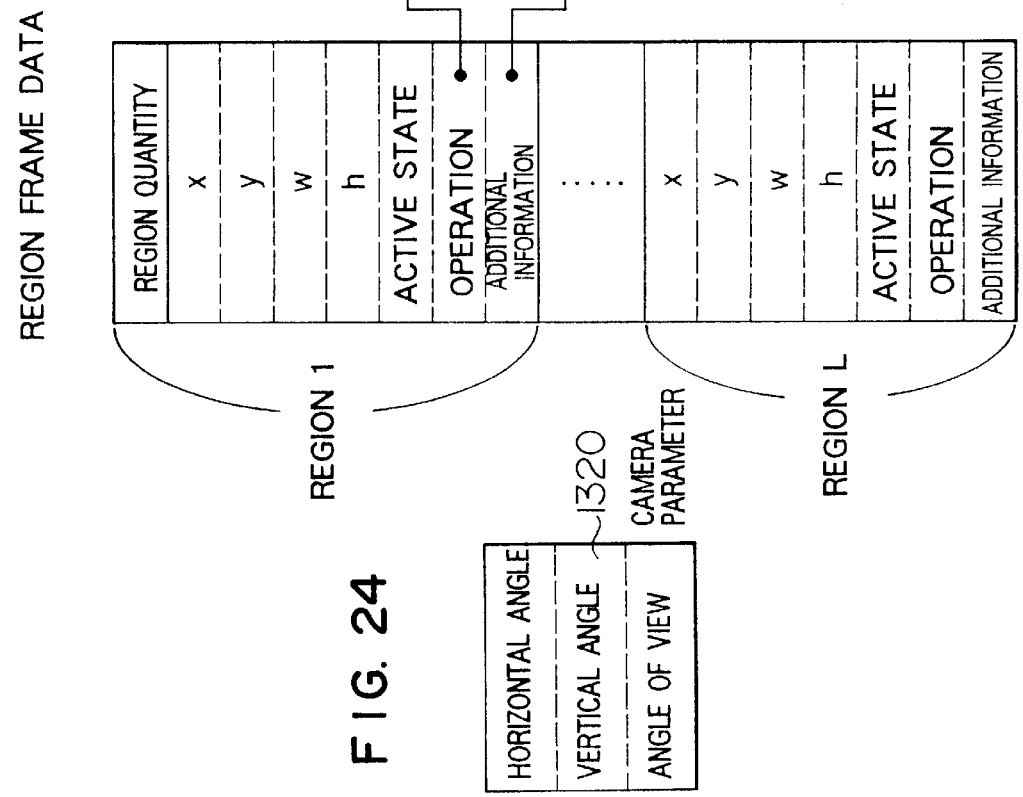
FIG. 25
FIG. 24
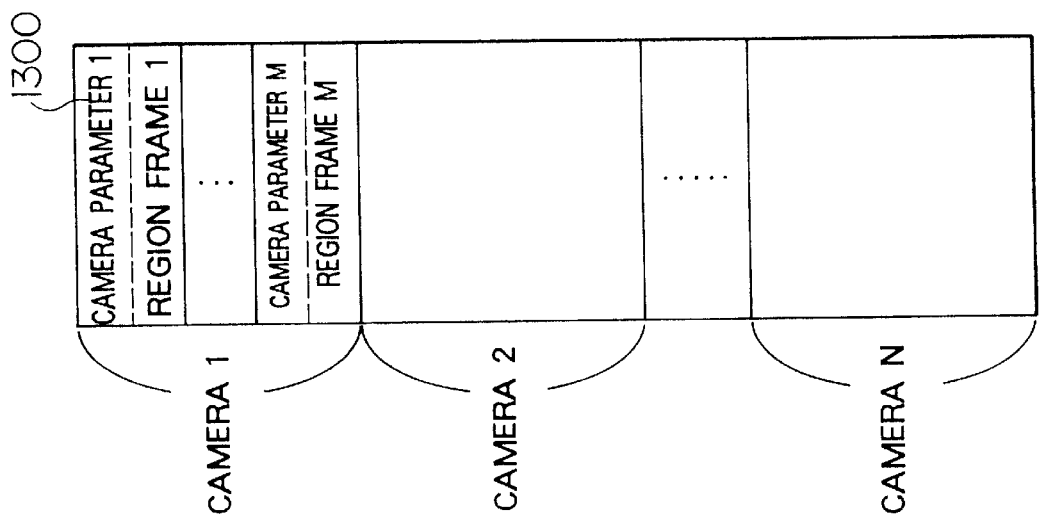
FIG. 23

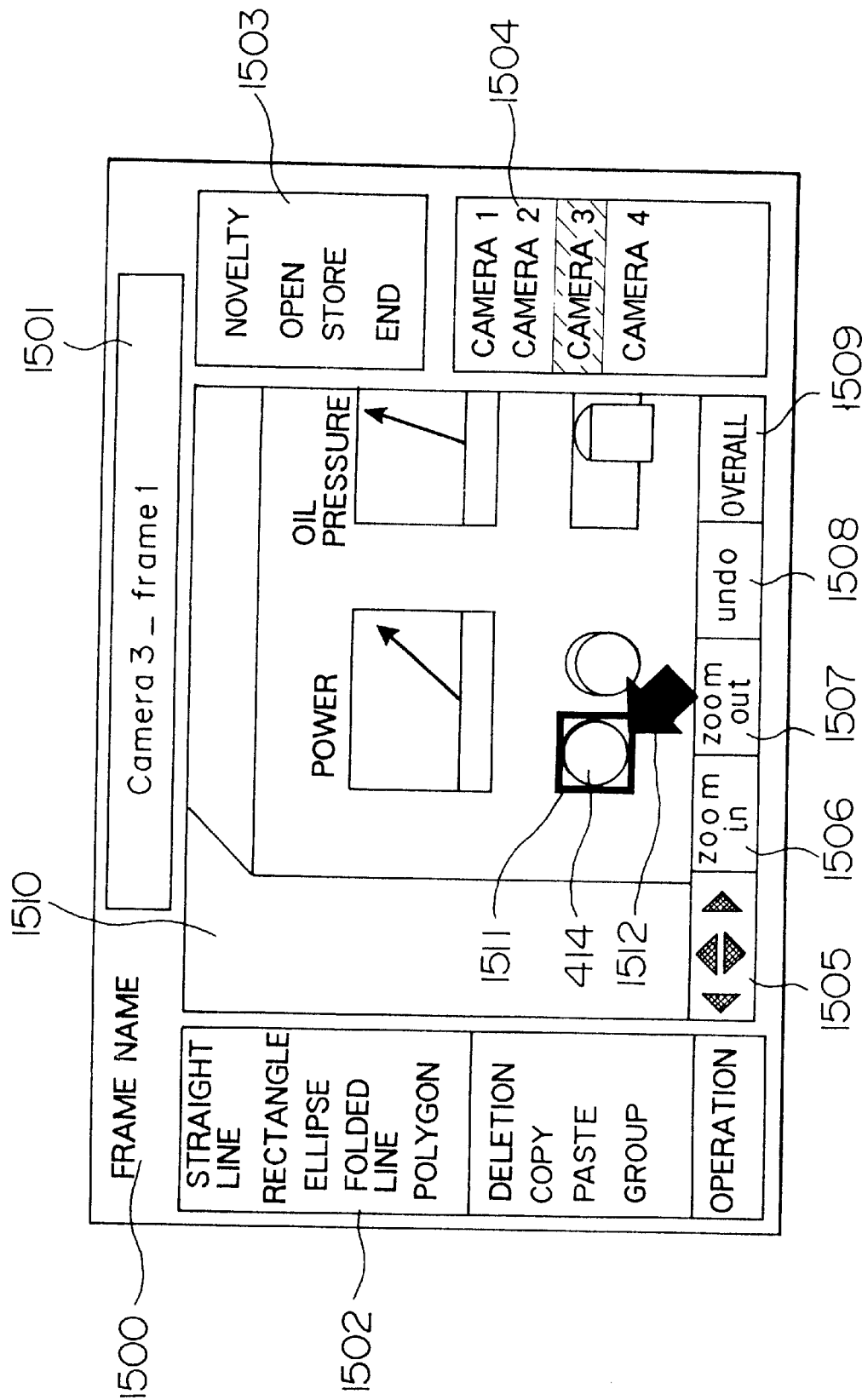

FIG. 36D
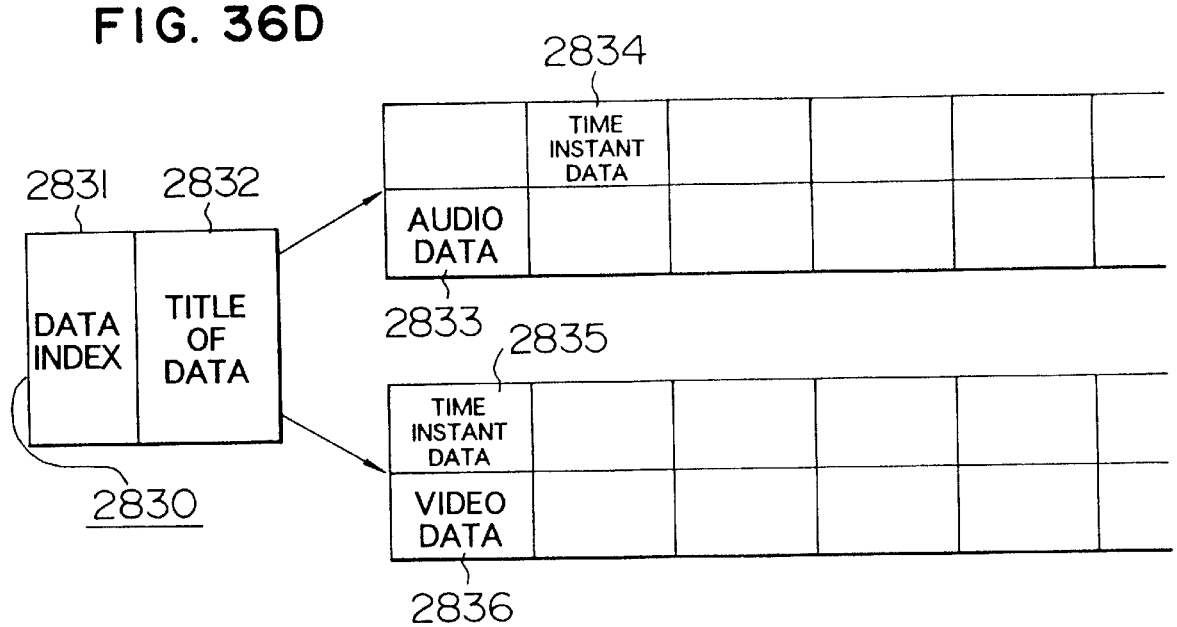
FIG. 36E
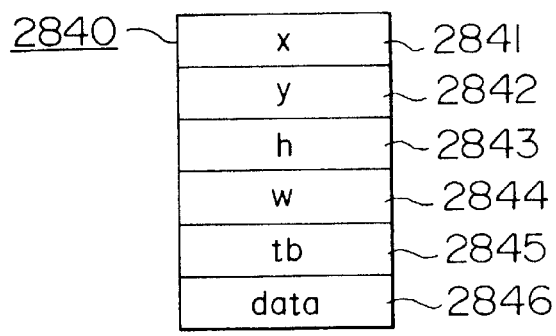
FIG. 36F
| | 2850 | 2857 | |
|---|---|---|---|
| 2851 | TIME INSTANT a | TIME INSTANT b | |
| 2852 | CAMERA 1 | CAMERA 2 | |
| 2853 | DATA 1 | DATA 5 | |
| 2854 | DATA 2 | DATA 2 | |
| 2855 | DATA 3 | DATA 3 | |
| 2856 | DATA 4 | DATA 4 | |
FIG. 36G
| | 2860 |
|---|---|
| 2861 | x |
| 2862 | y |
| 2863 | w |
| 2864 | h |
| 2865 | |
| 2866 | |

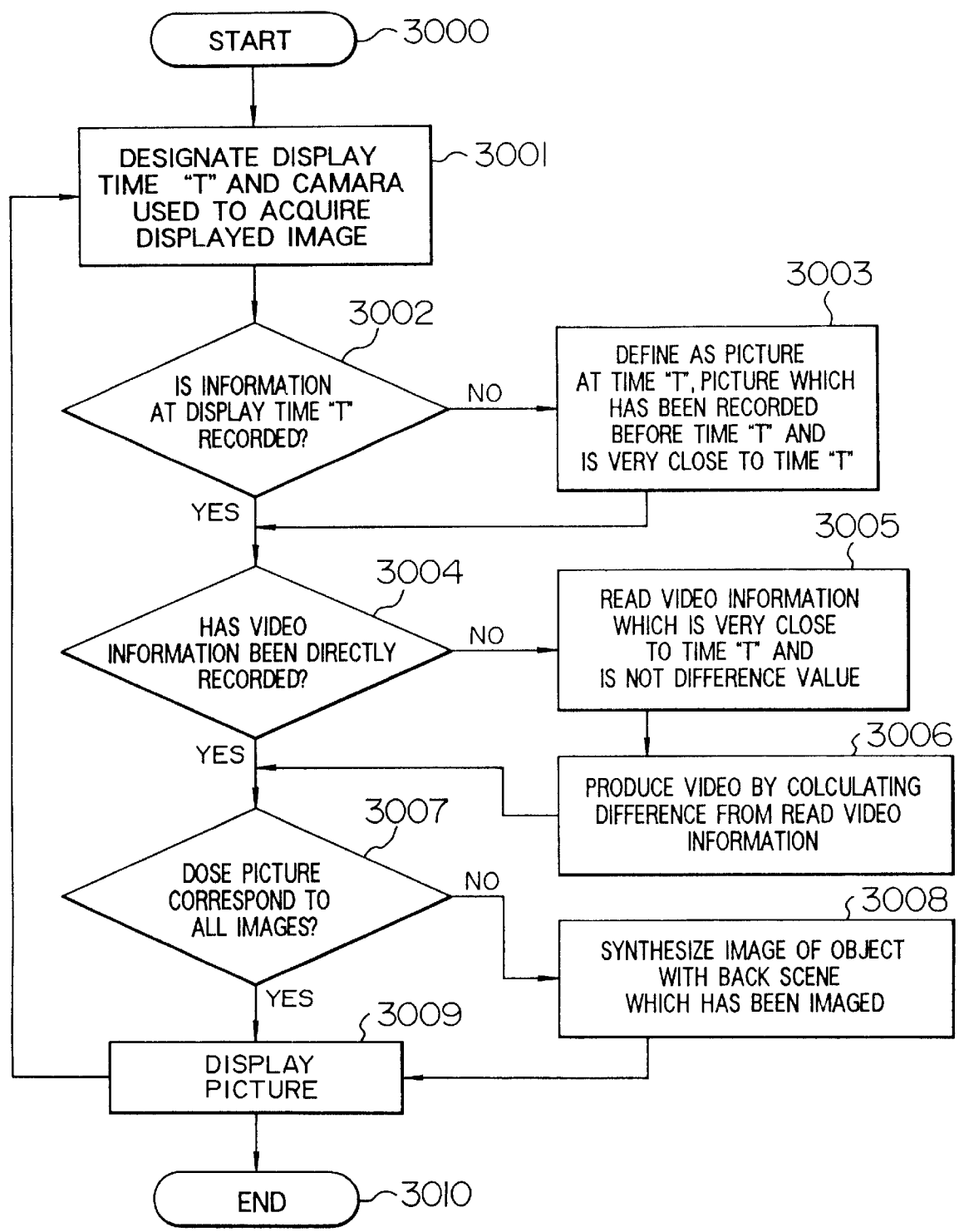
F I G. 38

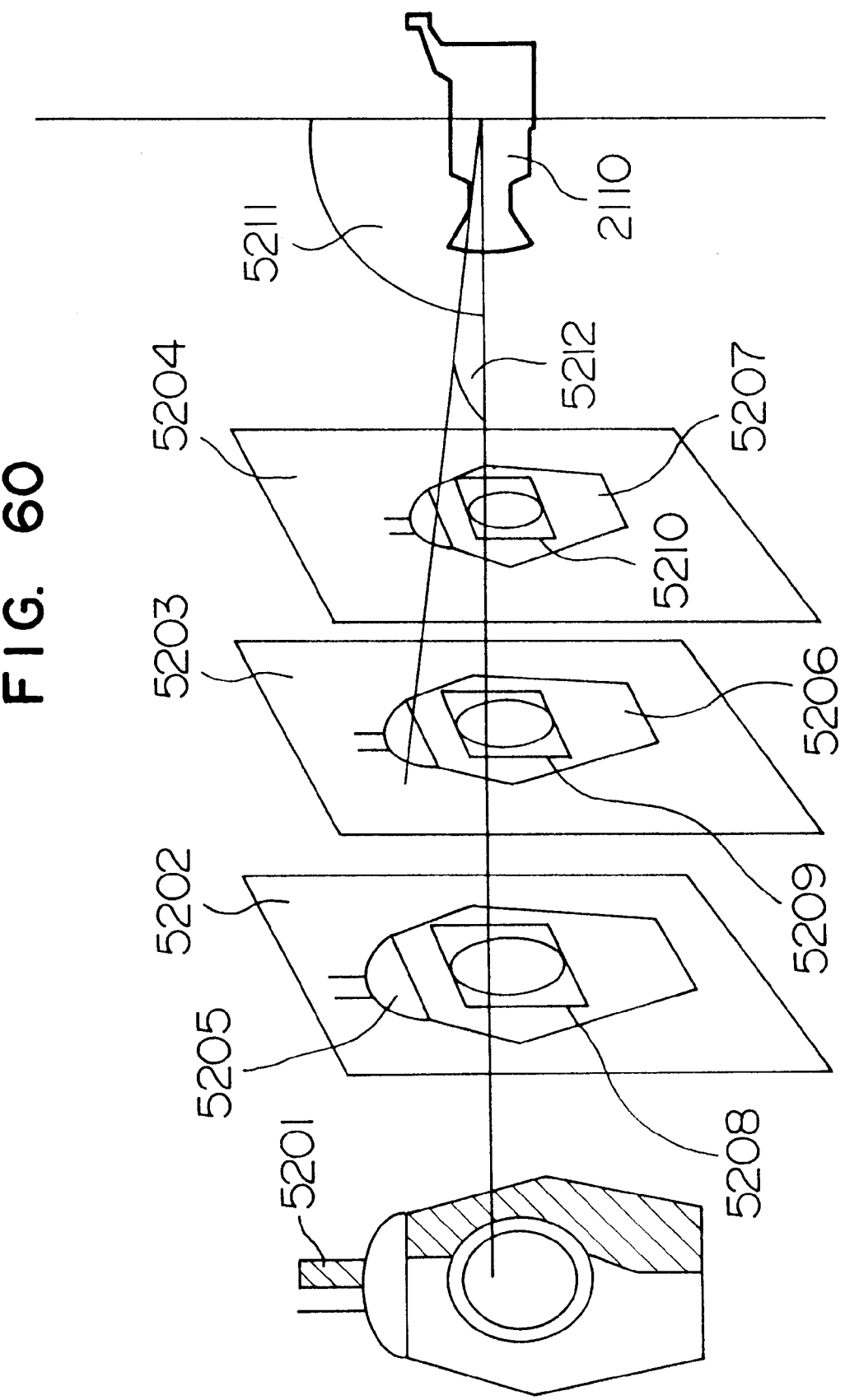

VIDEO OR INFORMATION PROCESSING METHOD AND PROCESSING APPARATUS, AND MONITORING METHOD AND MONITORING APPARATUS USING THE SAME

This application is a continuation of Ser. No. 07/960,442, filed Dec. 8, 1992, now abandoned, which is the U.S. national stage of PCT/JP92/00434, filed Apr. 8, 1992.

TECHNICAL FIELD

The present invention relates to a man-machine interface utilizing sound data or video data (simply referred to a "man-machine interface"), and in particular, to a video or information processing method and a processing apparatus for performing a process for an object with employment of sound data or video data of this object, and also to an object monitoring method and a monitoring method utilizing the processing method/apparatus.

BACKGROUND ART

To safely operate a large-scaled plant system such as a nuclear (atomic) power plant, an operation monitoring system including a proper man-machine interface is necessarily required. A plant is operatively maintained by way of three tasks "monitor", "judgement", and "manipulation" by an operator. An operation monitoring system must be equipped with such a man-machine interface capable of smoothly achieving these three tasks by an operator. In the "monitor" task, the statuses of the plant are required to be immediately, or accurately grasped. During the "judgement" task, a judging material, and information to be judged must be quickly referred to an operator. During the "manipulation" task, such a task environment is necessarily required in which an object to be manipulated and a result of the manipulation can be intuitively grasped, and also the manipulation intended by the operator can be quickly and correctly performed.

The man-machine interface of the conventional operation monitoring system will now be summarized with respect to each of the tasks "monitor", "judgement", and "manipulation".

(1). Monitor

Conditions within a plant may be grasped by monitoring both of data derived from various sensors for sensing pressure and temperatures and the like, and video derived from video cameras positioned at various places of the plant. Values from the various sensors are displayed on a graphic display in various ways. Also, a trend graph and a bar graph are widely utilized. On the other hand, the video derived from the video camera may be displayed on an exclusively used monitor separately provided with the graphic display. More than 40 sets of cameras are installed in a plant, which is not a rare case. While switching the cameras, and controlling the lens and directions of the cameras, an operator monitors various places in the plant. In the normal monitoring task, there is a very rare case that pictures or video derived from the cameras are observed by the operator, and it is an actual case that a utilization factor of the pictures derived from the cameras is low.

(2). Judgement

If an extraordinary case happens to occur in a plant, an operator must immediately and accurately judge what happens to occur in the plant by extensively checking a large amount of information obtained from sensors and cameras. Since the data derived from the various sensors and the pictures or video from the cameras are independently supervised or managed in the present operation monitoring system, it is difficult to reference these data and pictures by giving relationships to them, resulting in a heavy taskload on the operator.

(3). Operation

Operations are done by utilizing buttons or levers provided on an operation panel. Recently, there have been proposed such systems that an operation is performed by combining a graphic display with a touch panel, and by selecting menus and figures displayed on a screen. However, the buttons and levers provided on the operation panel, and also the menus and figures displayed on the display correspond to abstract forms irrelevant to actual objects. There is such a difficult case that an operator supposes or imagines the functions of these objects and the results of the operations. In other words, there are such problems that an operator cannot immediately understand which lever is pulled to perform a desired operation, or cannot intuitively grasp which operation command is sent to the appliance within the plant when a certain button is depressed. Also, there is another problem that since the operation panel is separately arranged with the monitor such as the camera, the bulky apparatus should be constructed.

The below-mentioned prior art has been proposed to simplify the camera switching operations and the camera remote control operations with regard to the monitoring task as described in the above item (1):

(a). Graphics produced by simulating an object to be photographed by a camera are displayed on a graphic display. A photographic place or position is instructed on the above-described graphics. In response to this instruction, the camera is remote-controlled so that a desired picture is displayed on a monitor of the camera. This type of plant operation monitoring system is known from, for instance, JP-A-61-73091.

(b). When a process device for performing either an operation, or a monitoring operation is designated by a keyboard, a process flow chart of the designated process device is graphically displayed, and simultaneously a picture of a camera for imaging the above-described process device is displayed on a screen. Such a sort of plant operation monitoring system is described in, for example, JP-A-2-224101.

(c). Based upon a designated position on a monitor screen of a camera for photographing a plant, panning, zooming and focusing operations of the camera are carried out. For instance, when an upper portion of the monitor screen is designated, the camera is panned upwardly, whereas when a lower portion of the monitor screen is designated, the camera is panned downwardly. Such a sort of plant operation monitoring system is described in, for instance, JP-A-62-2267.

On one hand, generally speaking, in a monitoring system such as a process control monitoring system, a method for visually monitoring conditions of the process has been employed by installing a monitor apparatus in a central managing room and an ITV camera (industrial television camera) at the process side and by displaying situations of the process on a monitor by way of a picture taken by this camera. This picture and sound are recorded on a recording medium such as a video tape. In an extraordinary case, the recording medium is rewound to reproduce this picture and sound.

On the other hand, data which have been sequentially sent from the process and are used as a control (control data), for instance, process data (measurement data) are displayed on either a monitor or a meter and the like of the central managing room, are stored in a database within a system, and derived from the database if an analysis is required, or an extraordinary case happens to occur. This conventional system is introduced in the plant operation history display method as opened in JP-A-60-93518.

SUMMARY OF THE INVENTION

As described above, the following problems are provided in the conventional operation monitoring systems:

(1). Since it is difficult to propagate the feeling of attendance in an actual place by way of the remote controls with employment of the keys, buttons and levers provided on the operation panel, and the menu and icon displayed on the monitor screen, the actual object to be operated and the operation result can be hardly and intuitively grasped. Thus, there are many possibilities of erroneous operations.

(2). The operator must directly switches the cameras and also directly perform the remote control operation, and cannot simply select such a camera capable of imaging a desirable scene in case that a large number of cameras are employed to monitor the scene. A cumbersome task is required to observe the desirable scene by operating the camera positioned at a remote place.

(3). There are separately provided the screen to display the picture or video derived from the video camera, the screen from which other data are referred, and the screen, or the apparatus through which the operation is instructed. Accordingly, the problems are such that the resultant apparatus becomes bulky, and the mutual reference between the video image and the other data becomes difficult.

(4). Although a video image of a camera owns a great effect to propagate the feeling of attendance, since this picture has a large quantity of information and also is not abstracted, there is a drawback that an operator can hardly and intuitively grasp a structure within the camera's picture.

On the other hand, in accordance with a graphic representation, an important portion may be emphasized, an unnecessary portion may be simplified, and then only an essential portion may be displayed as an abstract. However, these graphic representations are separated from the actual object and the actual matter, and therefore there is a risk that an operator cannot readily imagine the relationship among the graphic representations and the actual matter/object.

(5). The video information derived from the camera is entirely, independently managed from other information (for instance, data on pressure and temperatures and the like), so that the mutual reference cannot be simply executed. As a consequence, a comprehensive judgement of the conditions can be made difficult.

On the other hand, the method opened in the above-described JP-A-61-73091 has such a merit that a desired picture can be displayed by simply designating an object to be photographed without any complex camera operations. However, an image related to the picture and control information cannot be referred to by designating a content (appliance and the like being displayed) represented in the video image. As a consequence, when an operator finds out an extraordinary portion on a monitor of a camera and tries to observe this extraordinary portion more in detail, the operator must move his eyes to the graphic screen, and must recheck the portion corresponding to the extraordinary portion on the picture with respect to the graphics.

Also, in accordance with the method described in JP-A-2-224101, there is an advantage that both of the graph representation related to the appliance designated by the keyboard and the camera image can be displayed at the same time. However, the designation of the appliance cannot be directly performed on the screen. As a consequence, when the operator finds out the extraordinary portion on the camera monitor and tries to watch this extraordinary portion more in detail, he must search the key corresponding to the extraordinary portion on the keyboard.

Moreover, in the method disclosed in JP-A-62-226786, although the operation of the camera can be designated on the screen on which the picture is being displayed without using the input device, e.g., the joystick, such a command as the pan direction, zooming-in and zooming-out of the camera is merely selected. The operator must adjust the camera how much the camera should be panned in order to more easily observe the monitoring object, which implies that this complex operation is substantially identical to that when the joystick is used. Further, since the object to be operated is limited to a single camera, the optimum picture cannot be selected from a plurality of cameras.

As described above, in the methods shown in the respective publications, the information related to the contents (graphic representations such as picture and control information) cannot be called out by directly designating the content displayed in the picture (appliances being displayed). As a result, the operator must find out the information related to the contents being represented in the picture by himself.

On the other hand, in the monitoring system such as the above-described process control monitoring system and the like, since the video information, the sound (audio) information and the process data are not mutually related with each other, when they are reproduced, or analyzed, they must be separately reproduced or analyzed in the prior art. For instance, when an extraordinary matter happens to occur, this matter is detected by the measuring device to operate the buzzer. Thereafter, the corresponding appliance is searched from the entire process diagram, and this cause and the solving method are determined, so that the necessary process is executed. In this case, to predict this cause and the failed device, a very heavy taskload is required since a large quantity of related data and pictures are needed. In the analysis with employment of the video, there are utilized the method for checking the area around the extraordinary portion based on the process data after the video is previously observed to search the area near the extraordinary portion, and the method for reproducing the picture by rewinding the video after the extraordinary point has been found out by the process data.

However, generally speaking, there are plural ITV cameras for monitoring the plant and the like. Since the pictures derived therefrom have been recorded on a plurality of videos, all of these videos must be rewound and reproduced until the desired video portion appears in order that the pictures from the respective cameras are observed with having the relationships therewith when the extraordinary matter happens to occur, and the analysis is carried out, which gives a heavy taskload to the operator.

On the other hand, it is difficult to fetch the desired data from the database, and in most case, after a large quantity of information has been printed out, the printed information is analyzed by the operations.

As described above, there are the following problems in the conventional monitoring system such as the process control monitoring system.

(1). When the video information and the audio (sound) information are reproduced, since the process data cannot be referred to at the same time, even if the information is obtained from the picture, cumbersome tasks and lengthy time are required to search the process data thereafter.

(2). Even when the process data is displayed in the trend graph or the like, and the time instant when the picture is desired to be referred to by the operator, can be recognized, both the cumbersome task and the lengthy time are required so as to display the picture. As a consequence, the actual conditions of the field cannot be quickly grasped.

(3). Even when the process data such as the extraordinary value is searched, the cumbersome task is required in order to represent the picture related to this process data.

(4). While the recorded process data is displayed, especially, when a large quantity of recorded data are displayed by the fast forwarding mode, the computer is heavily loaded.

(5). Since there is a limitation in the data display method, such demands that the contents thereof are wanted to be observed in detail, and also are wanted to be skipped, cannot be accepted. In particular, when the contents of the data are analyzed by observing them in detail, if the related picture and also sound are referred in the slow reproduction mode, more detailed analysis can be achieved. However, there is no such function.

(6). There are the operation instructions by the operator as the important element to determine the operation of the process. Since these are not reproduced, no recognition can be made whether or not the conditions of the process have been varied by effecting what sort of operation.

(7). Even when the operator remembers the executed command, since this command could not be searched, eventually prediction must be made of the time instant when the operation instruction is made by analyzing the process data and the like.

(8). As there is no relationship between the process data and the video information, even if the extraordinary matter is found out on the picture, only a skilled operator having much experience can understand what scene is imaged by this picture, and what kind of data is outputted therefrom. Accordingly, any persons who are not such a veteran could not recognize which process device has a relationship with the data.

(9). Since the place to display the video image is separated from the place to represent the process data, the operator must move his eyes and could not simultaneously watch the data and the pictures which are changed time to time.

(10). There is a problem in the reproducibility of the conventionally utilized video tape with respect to the quick access of the video data. On the other hand, if the optical disk is employed, such a quick access may be possible. However, since the video data becomes very large, a disk having a large memory capacity is required in order to record the video data.

A purpose of the present invention is to provide an information processing method and an apparatus capable of executing a process related to sound (audio) data, or video (image) data about an object based on this data.

Another purpose of the present invention is to provide a video processing method and an apparatus capable of performing a process related to a video image of at least one object displayed on a screen of display means based upon information about this object.

A further purpose of the present invention is to provide a monitoring apparatus capable of relating information for controlling a monitoring object with sound data, or video data about this monitoring object to output the related information.

To achieve such purpose, according to one aspect of the present invention, a video processing apparatus for performing a process related to a video image of at least one object displayed on a screen of a display unit, is equipped with a unit for storing information related to said object and a unit for performing a process about this object based upon the above information.

In accordance with another aspect of the present invention, an information processing apparatus for storing both of data (control data) used for controlling an object, and also data on a sound or an image related to this object, comprises a unit for relating the control data with either the sound data or the video data, and also a unit for relating the control data with the sound data or the video data based upon the relating unit to be outputted.

Preferably, an aim of the present invention is to solve the above-described problems of prior art, and to achieve at least one of the following items (1) to (6).

(1). In a remote operation monitoring system and the like, an object to be operated and an operation result can be intuitively grasped by an operator.

(2). A picture of a place to be monitored can be simply observed without cumbersome camera operations and cumbersome remote controls of cameras.

(3). The remote operation monitoring system and the like may be made compact, resulting in space saving.

(4). Merits of a camera picture and graphics are independently emphasized, and also demerits thereof may be compensated with each other.

(5). Different sorts of information can be quickly and mutually referred thereto. For instance, a temperature of a portion which is now monitored by way of a camera image can be immediately referred.

(6). A man-machine interface to achieve the above aims can be simply designed and developed.

According to the present invention, the above-described aims (1) to (5) are solved by a method having the below-mentioned steps:

(1). Object Designating Step

An object within a video image displayed on a screen is designated by employing input means such as a pointing device (will be referred to a "PD"). The video image is inputted from a remotely located video camera, or is reproduced from a storage medium (optical video disk, video tape recorder, disk of a computer). As the pointing device, for instance, a touch panel, a tablet, a mouse, an eyetracker, and a gesture input device and so on are utilized. Before a designation of an object, an object designatable within a picture may be clearly indicated by way of a synthesization of a graphics.

(2). Process Executing Step

Based on the object designated by the above-described object designating step, a process is executed. For example, contents of the process are as follows:

An operation command is sent by which a similar result is obtained when the designated object is operated, or has been operated. For instance, in case that the designated object corresponds to a button, such an operation instruction is sent by which a similar result can be obtained when this button is actually depressed, or has been depressed.

Based on the designated object, a picture is changed. For example, the designated object can be observed under its best condition by operating a remotely located camera. By moving a direction of a camera, a designated object is imaged at a center of a picture, and the designated object is imaged at a large size by controlling a lens. In another example, it is changed into such an image of a camera for imaging the designated object at a different angle, or into an image of a camera for photographing an object related to the designated object.

To clearly display the designated object, a graphics is synthesized with a picture and the synthesized image is displayed.

Information related to the designated object is displayed. For example, a manual, maintenance information and a structure diagram are displayed.

A list of executable process related to the designated object is displayed as a menu. A menu may be represented as a pattern (figure). In other words, several patterns are synthesized with an image to be displayed, the synthesized and displayed patterns are selected by way of PD, and then based upon the selected pattern, the subsequent process is performed.

According to the present invention, the above-described aim (1) may also be solved by a method having a step for graphically displaying a control device to control a controlled object on or near the controlled object represented in a picture.

Also, according to the present invention, the aim (2) may be solved by a method including a search key designating step for designating a search key by inputting either a text or a graphics, and a video searching step for displaying a video image in which an object matched to the search key designated by the above-described search key designating step is being represented.

In accordance with the above-identified aim (6) is solved by a method including an image display step for displaying an image inputted from a video camera, a region designation step for designating a region on the image displayed by the image display step, and a process definition step for defining a process on the region designated by the region designation step.

An object in a video picture on a screen is directly designated, and an operation instruction is sent to the designated object. While observing an actually imaged picture of the object, an operator performs an operation instruction. When the object is visually moved in response to the operation instruction, this movement is directly reflected on the picture of the camera. Thus, the operator can execute the remote operation with having such a feeling that he is actually tasking in a field by directly performing an operation with respect to the actually imaged picture. As a consequence, the operator can intuitively grasp an object to be operated and also a result of the operation, so that an erroneous operation can be reduced.

Based upon the object in the picture designated on the screen, the cameras are selected and the operation instruction is transferred to the camera. As a consequence, an image suitable for monitoring an object can be obtained by only designating the object within the image. That is to say, the operator merely designates an object desired to be observed, and thus need not select the camera but also need not remotely control the camera.

When an operation is directly given to an object within a picture, a graphics is properly synthesized therewith and the synthesized picture is displayed. For instance, once a user designates an object, such a graphic representation for clearly indicating which object has been designated is made. As a result, an operator can confirm that his intended operation is surely performed. Also in case that a plurality of processes can be executed with respect to the designated object, a menu used for selecting a desired process is displayed. This menu may be constructed by a pattern. While selecting the pattern displayed as the menu, the operator can have such a strong feeling that he actually operates the object.

Based on the object within the image designated on the screen, information is represented. As a consequence, the information related to the object within the image can be referred by only designating the object. While referring to an image and other information at the same time, it is easily possible to make a decision on conditions.

Either a text, or a pattern is inputted as a search key, and then a picture is displayed in which an object matched to the inputted search key is being displayed. The text is inputted by way of a character inputting device such as a keyboard, a speech recognition apparatus, and a handwritten character recognition apparatus. Alternatively, the pattern may be inputted by employing PD, or data which has been formed by other method is inputted. Also, the text or the pattern located in the picture may be designated as the search key. In case that the image to be search corresponds to the image from the camera, based on the search key, the camera is selected, and furthermore the direction of the camera and also the lens thereof are controlled, so that the search key can be imaged. It is also possible to clearly indicate where a portion matched to the search key is located with the picture by properly synthesizing the graphics with the image in which the object adapted to the search key is being represented. As described above, the picture is represented based on the search key, and the operator merely represents a desirable object to be seen with a language or a pattern, so that such a desirable image can be obtained for an observation purpose.

A content of a process to be executed is defined when an object within a picture has been designated by displaying the picture, designating a region on this picture, and defining a process with respect to the designated region. As a consequence, a man-machine interface for directly manipulating the object within the picture may be formed.

BRIEF DESCRIPTION OF DRAWINGS

FIG. 1B is a diagram for explaining a relationship among the respective embodiments of the present invention and the conceptional arrangement of FIG. 1A.

FIG. 2 is a schematic diagram for showing an overall arrangement of a plant monitoring system according to one embodiment of the present invention, to which the video or information processing method and apparatus of the present invention has been applied.

FIG. 6 is a diagram for showing a relationship between a field and a screen display mode of the picture display region.

FIGS. 7A and 7B illustrate one example of a camera parameter setting operation by designating the object.

FIG. 9 represents one example of a button operation by designating the object.

FIGS. 11A and 11B show one example of operations by selecting the respective patterns.

FIGS. 20A and 20B are diagrams for indicating a relationship between the two-dimensional model and another camera parameter.

FIG. 23 illustrates a structure of a camera data table.

FIG. 24 represents a structure of a camera data table.

FIG. 25 indicates a data structure of a region frame.

FIG. 26 is an example of a definition tool for a two-dimensional model.

FIGS. 36A to 36G are explanatory diagrams for showing data structures such as process data and video data used in a further embodiment.

FIG. 38 is a flow chart for showing an example of an operation to display the recorded picture.

FIG. 60 is an explanatory diagram for showing a method for selecting an object within a control unit in accordance with another embodiment of the present invention.

DISCUSSION OF THE PREFERRED EMBODIMENTS OF THE INVENTION

Before describing an embodiment of the present invention, a concept of the present invention will now be explained with reference to FIG. 1A. It should be noted that FIG. 1B represents a relationship between a constructive element of this conceptional diagram and constructive elements of first and second embodiments.

Figure 1A:
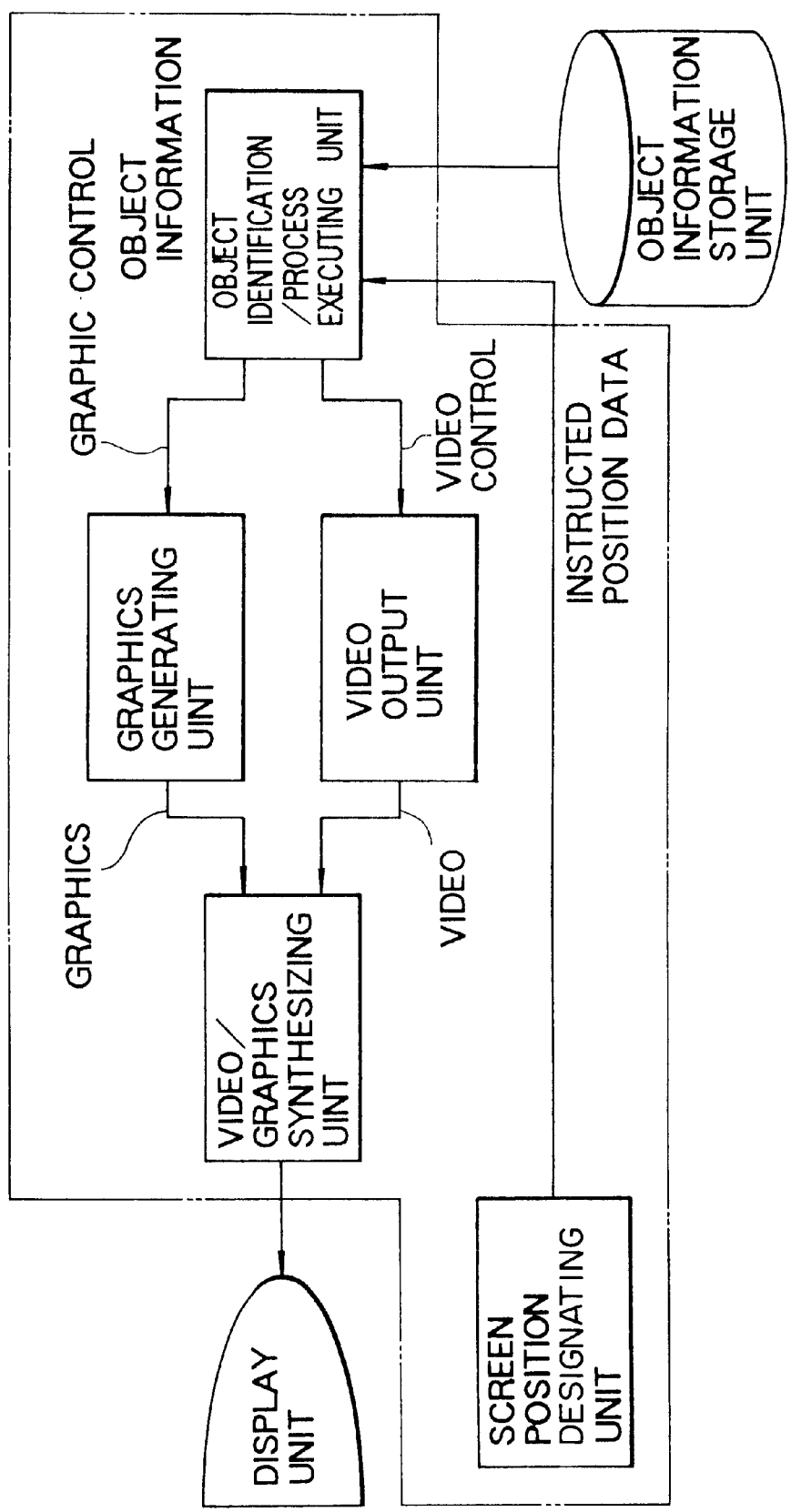
FIG. 1A is a block diagram for explaining a conceptional arrangement of the present invention.

In FIG. 1A, an object information storage unit stores information related to various sorts of apparatuses (objects) (positions of apparatuses, shape information, control information, manual information, design information etc.) within a plant, which are being imaged in a video image outputted by a video output unit (video imaging/recording/reproducing unit). It should be noted that any appliances and apparatuses to be operated and monitored will be referred to as an "object" hereinafter. A video output unit outputs a picture (video) under taking a picture with a plant and also a picture being recorded in the past. A graphics generating unit outputs a systematic diagram of a plant, control information of each object, manual information as graphics and so on. The graphics output from the graphics generating unit is synthesized with a video output from the video output unit by a video/graphics synthesizing unit, and then the synthesized output is displayed on a display unit. When a position on a display unit is designated by a screen position designating unit, an object identification/process executing unit identifies an object displayed on the above-described designated position on the display unit based on both of object information stored in the object information storage unit and the above-described designated position. Subsequently, the object identification/process executing unit executes a process corresponding to the above-explained identified object. For instance, a picture related to the above-described identified object is displayed on the display unit by controlling the video output unit, the control information concerning the object is derived from the object information storage unit, and the above-described derived information is graphically displayed on the display unit by controlling the graphics generating unit.

That is to say, the object information storage unit in FIG. 1A stores therein information about an object displayed on the screen of the display unit, and a portion surrounded by a dot and dash line executes a process related to this object based upon the stored information (for instance, a process to identify the information in the object information storage unit, which corresponds to the information designated by the screen position instruction unit, and a process for displaying graphics based upon this information).

The information related to the object indicates graphic information, positional information and the like related to an object in the first embodiment, and also represents control data (control data, or control information) related to an object, sound or video data related to an object, and furthermore information concerning the control data and the sound, or video data in the second embodiment.

Also, the portion surrounded by the dot and dash line in FIG. 1A establishes a relationship between the control data and the sound or video data based upon the above-described relating information in the second embodiment.

Referring now to drawings, embodiments of the present invention will be explained. First, a plant operation monitoring system corresponding to one embodiment (first embodiment) of the present invention, to which the video or information processing method and apparatus of the present invention have been applied with employment of FIGS. 2 to 28.

An overall arrangement of this embodiment is explained with reference to FIG. 2. In FIG. 2, reference numeral 10 denotes a display functioning as a display means for displaying graphics and video; reference numeral 12 shows a pressure sensitive touch panel functioning as an input means mounted on an overall surface of the display 10; reference numeral 14 is a speaker for outputting a sound; reference numeral 20 indicates a man-machine server used to monitor and operate the plant by an operator; and reference numeral 30 is a switcher for selecting one video input and one sound input from a plurality of video inputs and also a plurality of sound inputs. In FIG. 2, reference numeral 50 shows a controlling computer for controlling appliances within the plant, and for acquiring data derived from sensors; reference numeral 52 shows an information line local area network (will be referred to a "LAN" hereinafter) for connecting the controlling computer 50, the man-machine server 20, and other terminals/computers (for example, a LAN as defined under IEEE 802.3). Reference numeral 54 denotes a control line LAN for connecting the controlling computer 50, various sorts of appliances to be controlled and various sensors (for example, a LAN as defined by IEEE 802.4); reference numerals 60, 70 and 80 industrial video cameras (simply referred to an "ITV cameras" hereinafter) mounted on various places within the plant, imaging an object to be controlled and inputting an imaged object; reference numerals 62, 72, 82 denote controllers for controlling directions and lenses of the respective cameras 60, 70 and 80 in response to an instruction from the controlling computer 50. Reference numerals 64, 74 and 84 show microphones mounted on the respective cameras 60, 70, 80; reference numerals 90 and 92 indicate various sensors used to recognize various states of the plant; and reference numerals 84 and 96 represents actuators for controlling the various appliances in the plant in response to the instruction of the controlling computer 50.

The pressure sensitive touch panel 12 is a sort of PD. When an arbitrary position on the touch panel 12 is depressed by a finger of an operator, both of a coordinate of the depressed position and depressed pressure are reported to the man-machine server. The touch panel 12 is mounted on the entire surface of the display 10. The touch panel 12 is transparent, and a display content of the display 10 positioned behind the touch panel 12 can be observed. As a result, an operator can designate an object displayed on the display 10 with having the feeling of finger touch. In this embodiment, three sorts of operations are employed as the operations of the touch panel 12, i.e., (1) to lightly depress, (2) to strongly depress, and (3) to drag. Dragging the touch panel 12 implies that the finger is moved while depressing the touch panel 12 by the finger. Although the pressure sensitive touch panel has been employed as PD in this embodiment, other devices may be employed. For instance, a not-pressure sensitive type touch panel, a tablet, a mouse, a light pen, an eye trucker, a gesture input device, a keyboard may be utilized.

A plurality of video images taken by the camera 60, 70 and 80 are selected to be a single picture by the switcher 30, which will then by displayed via the man-machine server 20 on the display 10. The man-machine server 20 controls via a communication port such as RS 232C the switcher 30, and selects a picture from the desirable camera. In this embodiment, upon selection of a picture, a sound inputted from the microphones 64, 74 and 84 are selected at the same time. In other words, when a camera is selected the microphone attached to this selected camera is switched to be operated. A sound inputted into the microphone is outputted from the speaker 14. It is of course possible to separately select an input from the microphone and an input from the camera. The man-machine server 20 may synthesize the graphics with the picture derived from the camera. Also, the man-machine server 20 transmits an operation command to the controlling computer via the information LAN 52 so as to designate an imaging direction, attitude, an angle of view, a position of a camera. It should be noted that parameters related to a camera such as the imaging direction, attitude, angle of view and position will be referred to camera parameters.

Furthermore, the man-machine server inputs the data from the sensors 90 and 92 via the controlling computer 50 in accordance with an instruction of an operator, and remote-controls the actuators 94 and 96.

Figure 3:
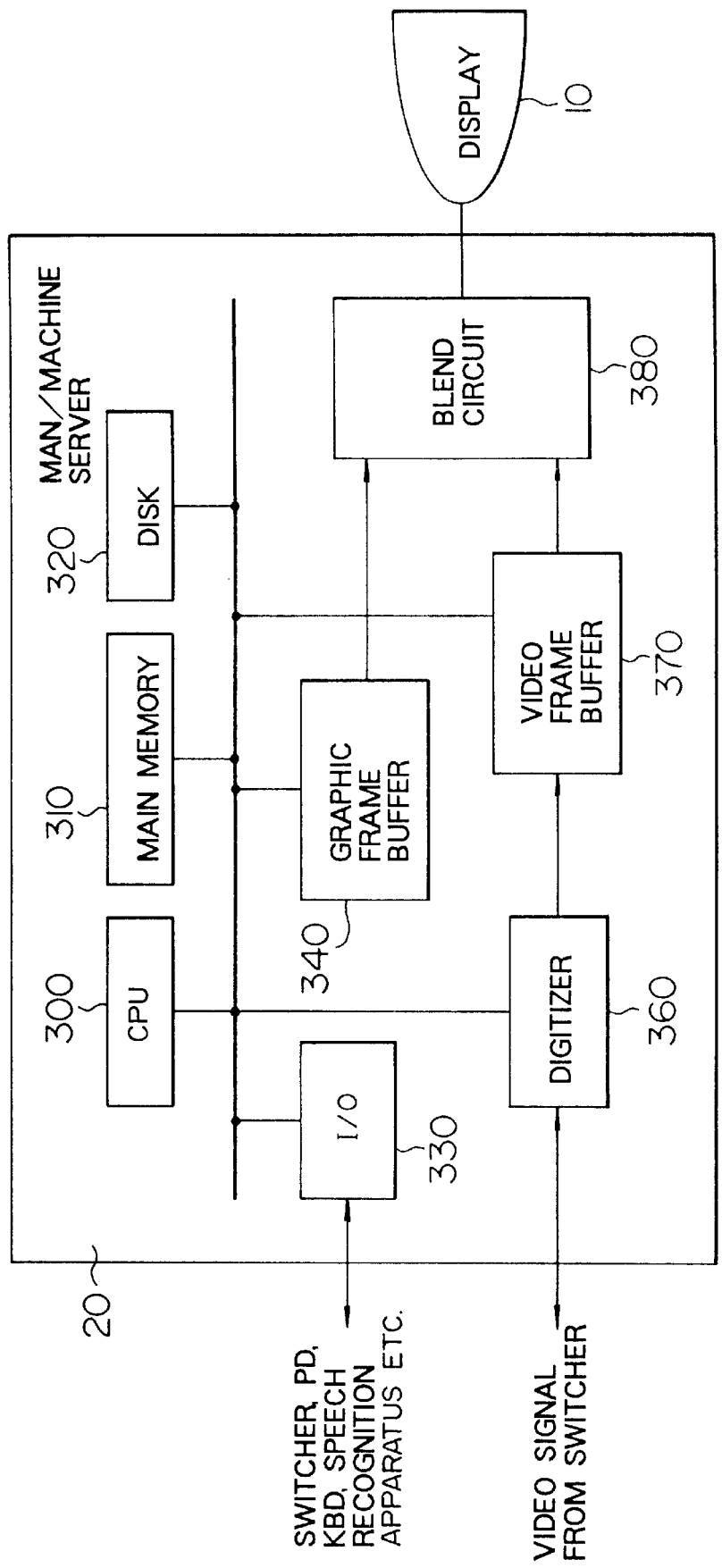
FIG. 3 is a diagram for showing one example of a hardware arrangement of the man-machine server shown in FIG. 2.

An arrangement of the man-machine, server will now be explained with reference to FIG. 3. In FIG. 3, reference numeral 300 indicates a CPU (central processing unit); reference numeral 310 denotes a main memory; reference numeral 320 shows a disk; reference numeral 330 is an input/output device (I/O) for connecting the PD, touch panel 12 and switcher 30; reference numeral 340 denotes a graphics frame buffer for storing display data produced by the CPU 300; reference numeral 360 indicates a digitizer for digitizing analog video information which is inputted. Furthermore, reference numeral 370 shows a video frame buffer for storing therein the digitized video information corresponding to the output from the digitizer 360; reference numeral 380 indicates a blend circuit for blending the content of the graphics frame buffer 340 and the content of the video frame buffer 370 and for displaying the blended contents on the display 10.

After the video information inputted from the camera has been synthesized with the graphics produced from the man-machine server 20, the resultant video information is displayed on the display 10. In the graphic frame buffer 34, there are stored color data for red (R), green (G) and blue (B) and data referred to an $\alpha$ value in accordance with the respective pixels on the display 10. The $\alpha$ value instructs how to synthesize the video information stored in the video frame buffer 370 with the graphic display data stored in the graphic frame buffer 34 with respect to the respective pixels of the display 10. The function of the blend circuit 380 is expressed by as follows:

$$d=f(g, v, \alpha)$$

where symbols "g" and "$\alpha$" indicate color information and an $\alpha$ value of one pixel stored in the graphic frame buffer 340, symbol "v" shows color information of a pixel located at a position corresponding to the color information "g" stored in the video frame buffer 370, and symbol "d" is color information of a pixel of the synthesized color information "g" and "v". In this system, the following equation is employed as the function "f":

$$f(g, v, \alpha)=[\{g+(255-\alpha)V\}/255],$$

where symbols f, g, v, $\alpha$ are an integer, and $0 \leq f,g,v,\alpha \leq 255$. A blank [ ] indicates a symbol for counting fractions over ½ as one and disregarding the rest with respect to a number less than a decimal point. It is of course possible to employ other values as the function "f".

The graphic frame buffer 340 is constructed of a so-called "double buffer". The double buffer owns buffers used to store two screen image data, and the buffer displayed on the display 10 is arbitrarily selected. One buffer displayed on the display 10 will be referred to a front buffer, whereas the other buffer not displayed on the display 10 will be referred to a rear buffer. The front buffer and the rear buffer can be instantaneously changed. The graphics is represented in the front buffer, when the graphic representation is accomplished, the rear buffer is changed into the front buffer so as to reduce fluctuation occurring in the graphic representation. The content of either buffer maybe arbitrarily read out and written by the CPU.

As described above, after the video information has been digitized within the man-machine server 20, the digitized video information is synthesized with the graphics in this embodiment. Alternatively, an external apparatus for synthesizing both of the video information and the graphics at the level of the analog signal is employed, and the video signal outputted from the man-machine server 20 is synthesized with the television signal derived from the camera 60, and the synthesized signal may be displayed on the display 10. An apparatus (will be referred to a video synthesizing apparatus) for synthesizing a computer such as the man-machine server 20 with the television signal derived from the camera 60 is commercially available.

Although the graphics and the video are displayed on the same display (display 10) in this embodiment, these graphics and video may be represented on separate display units. For instance, a graphic terminal is connected via the information line LAN 52 to the man-machine server 20, and the video information derived from the camera is displayed in a full screen with employment of the above-described video synthesizing apparatus. The graphics generated from the man-machine server 20 is mainly displayed on the display 10. To the graphic terminal, a pointing device such as a touch panel, or a mouse similar to the pressure sensitive touch panel 12 is mounted. In accordance with a predetermined protocol, the man-machine server 20 outputs the graphic information to the graphic terminal, so that the graphics can be superimposed and displayed on the video displayed on the graphic terminal. As described above, since the video information is represented on the graphic terminal separately provided with the display 10, much graphic information may be displayed on the display 10.

Figure 4:
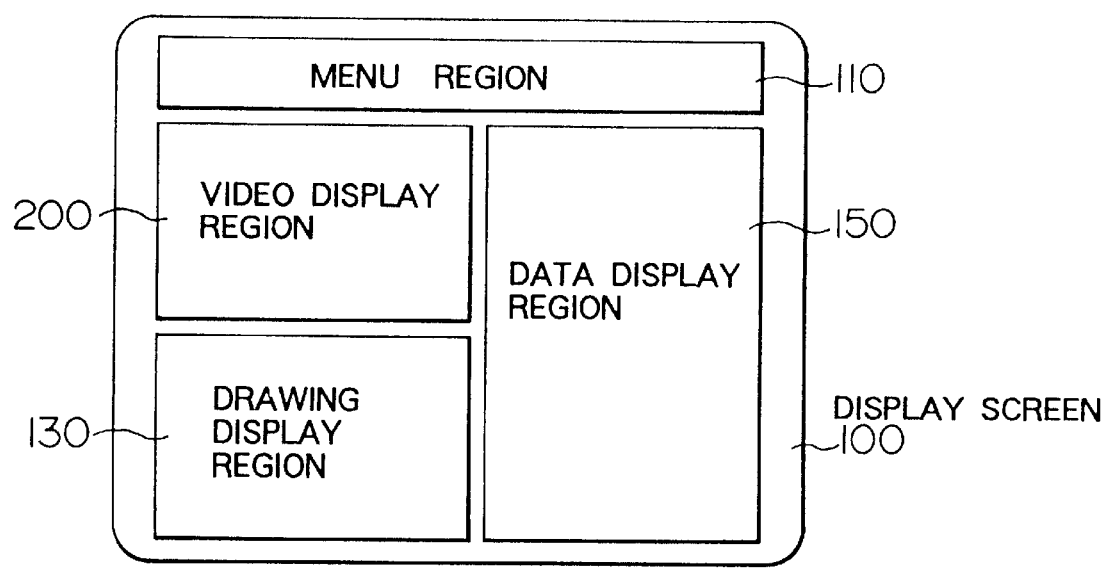
FIG. 4 is a diagram for indicating a constructive example of a display screen in the plant operation monitoring system of the present embodiment.

In FIG. 4, there is shown one example of a display screen arrangement of the display 10. In FIG. 4, reference numeral 100 denotes a display screen of the display 10; reference numeral 110 shows a menu region for designating a command related to an overall system; reference numeral 150 represents a data display region for displaying the data from the sensors, various documents and data related to the plant; reference numeral 130 is a drawing display region for displaying arrangement constructive, and design drawings of the overall plant and the respective portions of the plant; and reference numeral 200 is a video display region for displaying the video or picture inputted from the camera.

Figure 5:
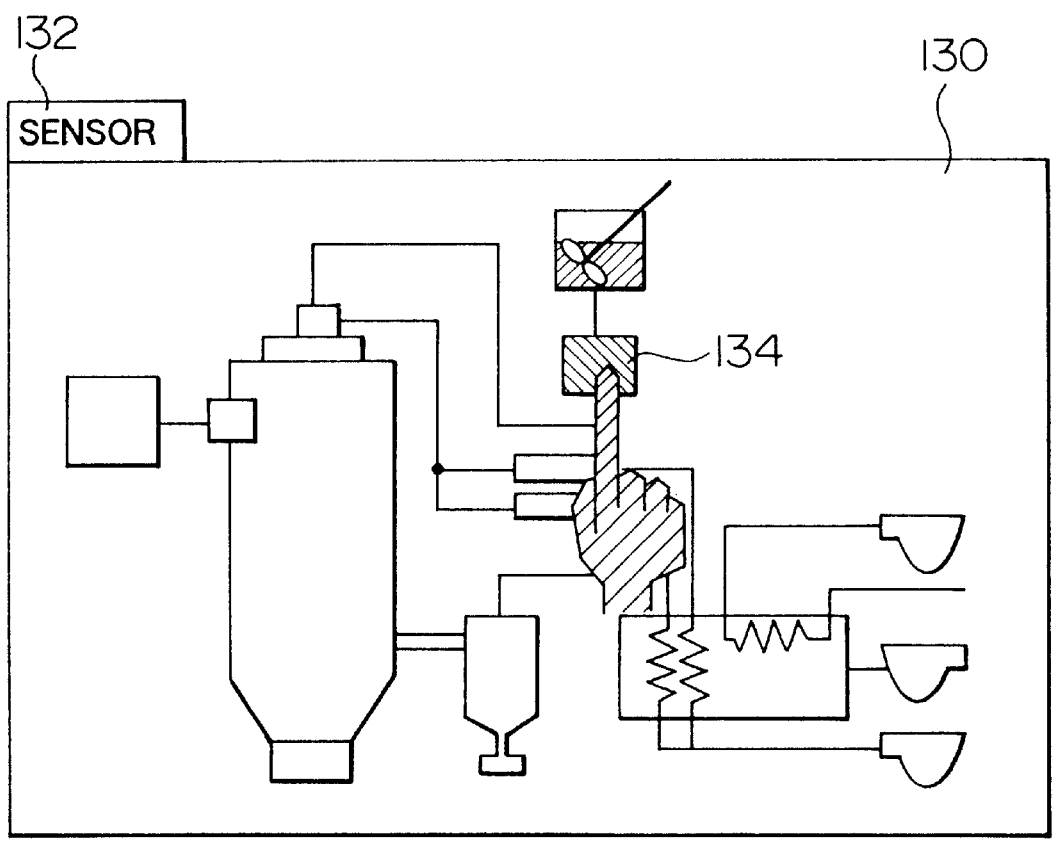
FIG. 5 is a diagram for representing an example of a screen display mode of a figure display region of a display screen.

FIG. 5 shows one example of display modes of the drawing display region 130. In FIG. 5, reference numeral 132 shows a menu for issuing a command used to clarify a place where a sensor is installed, and reference numeral 134 denotes one object shown on a drawing designated by an operator. When the object within the drawing displayed in the drawing display region 130 is selected by the operator, the information about this selected object, derived from the sensor is represented on either the data display region 150, or the video display region 200. For example, when a camera is defined as a sensor related to the designated object, a picture inputted from this camera is displayed in the video display region 200. Also, for instance, in case that an oil pressure sensor is defined as a sensor related to the designated object, either a graphics for clearly displaying the present oil pressure value, or a trend graph indicative of variations in the oil pressure values which have been measured up to now is displayed in the data display region 150. If a position on the touch panel 12 is strongly depressed by a finger, an object displayed on the drawing, which is represented at the depressed position is designated. If no definition is made of the sensor related to the designated object, nothing happens to occur. In FIG. 5, there is shown that the display position of the object 134 is strongly depressed by the finger. When the object is depressed by the finger, the representation is emphasized in order that the designation of the object can be recognized by the operator. In the example shown in FIG. 5, both of the camera 60 for imaging the object 134 and the microphone 64 for entering sounds around the object 134 have been defined as the relevant sensors in the object 134. Upon designation of the object 134, an image of the object 134 is displayed on the video display region 200 and the sounds around the object 134 are outputted from the speaker 14.

In FIG. 6, there are shown one display mode of the video display region 200 when the object 134 is designated on the drawing display region 130, and also a relationship between this display mode and the object 134 positioned in the plant. In FIG. 6, reference numerals 202 to 210 indicate means for setting a camera parameter of a camera which photographs or takes a picture of a presently displayed picture; and reference numeral 220 denotes a menu for clearly indicating an object suitable in the picture. Reference numeral 202 is a menu for setting a direction of a camera. When the menu 202 is selected, the camera may be panned in right and left direction, and may be panned in upper and lower directions. Reference numeral 204 shows a menu for controlling an angle of view of a camera to zoom-in a picture. Reference numeral 206 shows a menu for controlling the angle of view of the camera to zoom-out the picture. Reference numeral 208 indicates a menu for correcting the present camera parameter to substitute it by the camera parameter set during one step before. Reference numeral 210 is a menu for correcting the present camera parameter to substitute it by the first camera parameter.

Reference numerals 400 to 424 indicate various sorts of objects which belong to the object 134, or are located around this object. Reference numeral 400 denotes a valve; reference numerals 400 and 420 show character representation written on the object 134; reference numeral 412 is a meter to indicate a voltage; reference numeral 414 denotes a button to turn on a power source; reference numeral 416 shows a button to turn off the power source; reference numeral 422 is a meter indicative of oil pressure; and reference numeral 424 indicates a knob of a slider for controlling oil pressure. The valve 400, buttons 414, 416 and knob 424 correspond to actually manually-operable control devices, and also such control devices remote-controlled in response to the operation command issue from the man-machine server 20.

When an operator lightly depress a position within the video display region 200 by his finger, the camera task is set in such a manner that the object displayed on the position depressed by the finger can be easily observed. In FIGS. 7A and 7B, there are shown such a condition that the camera parameter is set in such a way that when the meter 412 is slightly touched by the finger at the video display region 200, the meter 412 is positioned at a true center of the picture. When the meter 412 is designated by the operator as represented in FIG. 7A, the direction of the camera 60 is set in such a manner that the meter 412 is imaged at the center of the picture, and furthermore the lens of the camera 60 is controlled in a way that the meter 412 is zoomed in, and then the picture is changed into FIG. 7B. Only when the operator merely touches the object on the screen, the camera parameter can be set in such a manner that this object can be clearly observed, and the operator is not bothered by the remote control of the camera. In FIG. 7A, reference numeral 502 shows a graphic echo for clearly indicating that the meter 412 has been designated. The graphic echo 502 is erased when the finger of the operator is released, or separated from the touch panel 12. As described above, the man-machine interface can be improved by synthesizing the graphic representation with the picture of the camera.

Figure 8B:
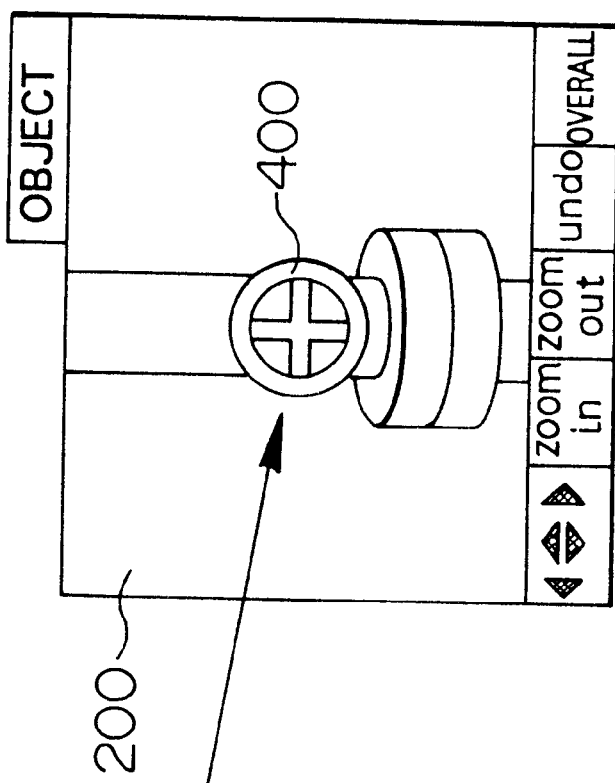
FIGS. 8A and 8B show an example of a camera parameter setting operation by designating the object.
Figure 8A:
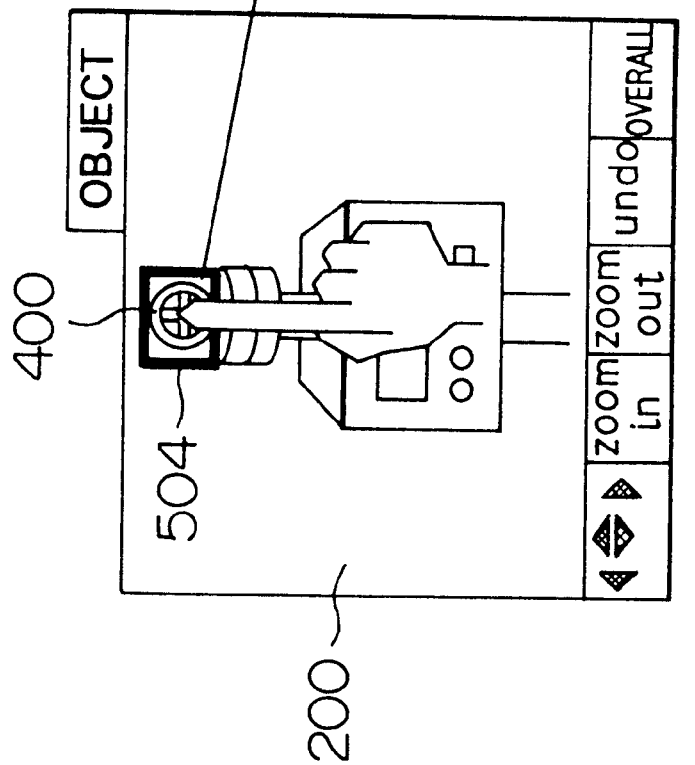

FIGS. 8A and 8B represent such a condition that when the valve 400 is lightly touched by the finger within the video display region 200, the camera task is set in such a manner that the valve 400 is located at a center of the picture. When the valve 400 is designated by the operator as shown in FIG. 8A, the picture is changed in such a way that the center of the picture shown in FIG. 8B. In FIG. 8A, reference numeral 504 denotes a graphic echo for clearly displaying that the valve 400 is designated. The graphic echo 504 is erased when the finger of the operator is released from the touch panel 12. Also, with respect to other objects 410, 414, 416, 420, 422 and 424, similar operations may be applied.

Figure 10:
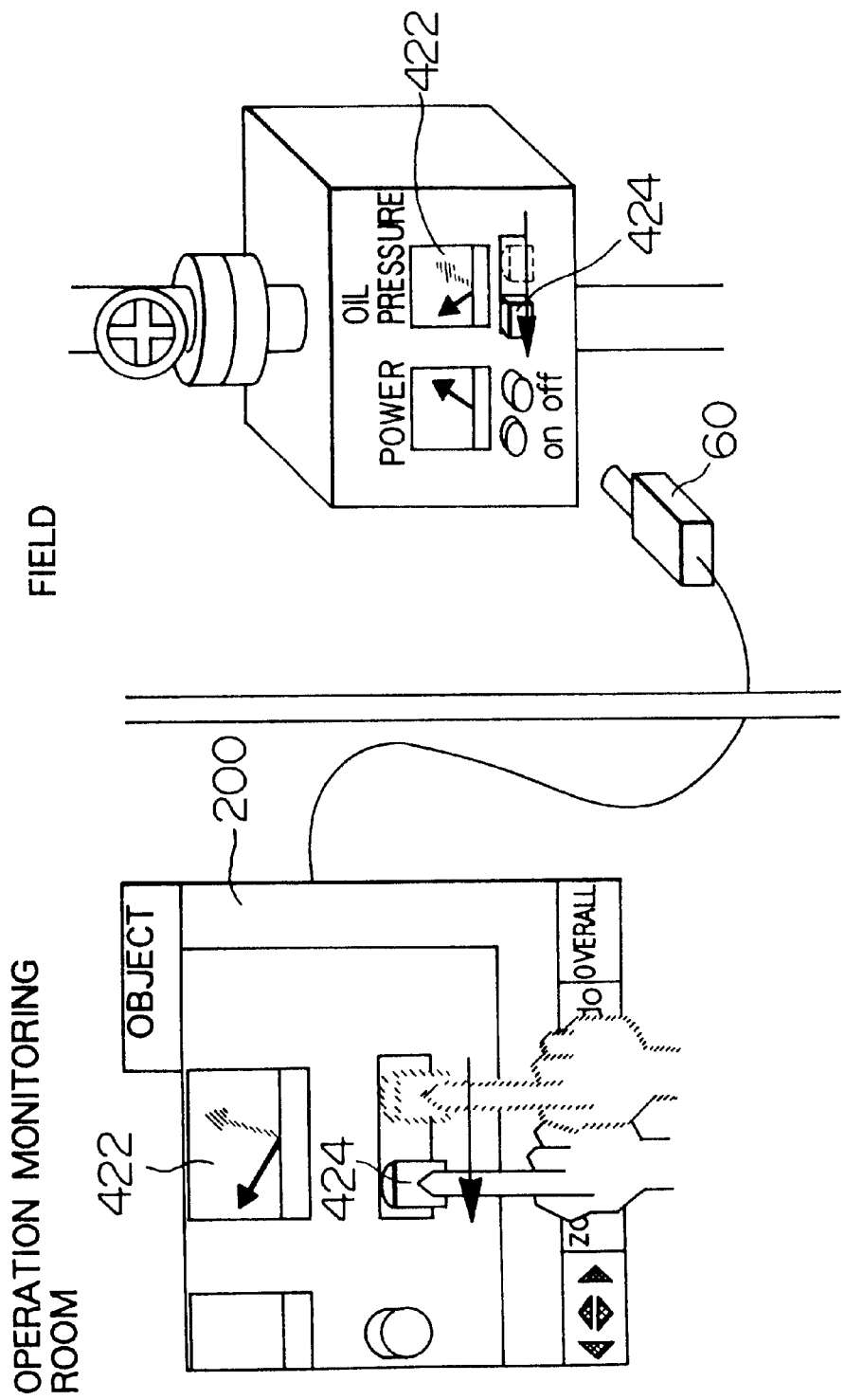
FIG. 10 indicates an example of a slider operation by designating the object.

If a position within the video display region 200 is strongly depressed by an operator, an object displayed at the position of the finger may be operated. In FIG. 9 to FIG. 11, there are shown examples where objects are operated.

FIG. 9 represents an example in which the button 414 is operated. When the position on the video display region 200, in which the button 414 is displayed, is strongly depressed by the finger, such an operation instruction that the button 414 is depressed is transferred from the man-machine server 20 via the controlling computer 50 to the actuator for actuating the remote-located button 414, and then the button 414 present at the remote field is actually depressed. A situation that the button 414 is depressed and as a result, a pointer of the meter 412 is swung, is displayed in the video display region 200 by the camera 60. As a consequence, the operator can obtain on the video screen such a feeling that the button is actually depressed.

FIG. 10 represents such an example that the knob 422 of the slider is manipulated by the drag of the finger on the touch panel 12. When the finger is moved along the horizontal direction while strongly depressing the position where the button 414 is displayed on the video display region 200, the knob 424 being displayed on the picture is moved in conjunction with the movement of the finger. As a result of movement of the knob 424, the pointer of the meter 422 is swung. At this time, the man-machine server 20 sends out an instruction via the controlling computer 50 to the actuator for controlling the knob 424 every time the finger is moved, so that the knob 424 is actually moved in conjunction with movement of the finger. As a consequence, the operator can obtain such a feeling that the knob 424 is actually manipulated by his finger.

As represented in FIGS. 9 to 10, advantages that the operator devices 414 and 412 being displayed in the picture are directly manipulated on the picture is given as follows:

(1). An operator can have such a feeling that he is located at a field, while he is present at an operation room. A picture can directly transmit an arrangement an atmosphere (shape, color and so on) of the device. As a consequence, prediction, learning and imagination can be readily achieved with respect to the functions of the respective appliances and the results of the operations there of. For instance, if the button 414 is depressed in FIG. 9, it may be easily predicted that the power source of the appliance 134 is turned on.

(2). An observation by an operator can be done what happens at a field as a result of operation made by the operator. For instance, when the button 414 is depressed, if smoke appears from the appliance 134, an operator can immediately observe this smoke, and can become aware of his misoperation.

In accordance with the conventional graphical man-machine interface, control devices are graphically represented. When the graphic representation is performed, since abstract, simplification, and exaggeration are carried out, it becomes difficult to establish a relationship between the actual devices and the graphic representations. Since the size of the display screen is limited to a certain value, the graphics is arranged irrelevant to the actual arrangements of the devices. As a consequence, an operator can hardly, intuitively grasp how to control the devices in the field by operating the graphic operator. Since the operation results are graphically displayed, it is difficult to intuitively grasp the extraordinary case.

FIG. 11A represents an example in which an object is operated by operating a graphics displayed on, or near the object to be operated in a synthesized form. In FIG. 11A, reference numerals 510 and 520 indicate graphics represented in a synthesized form on the picture when the display position of the valve 400 is strongly depressed by a finger of an operator. When the operator strongly depressed a pattern 51 by his finger, the man-machine server 20 send out an operation instruction via the controlling computer 50 to the actuator to rotate the valve 400 in the left direction. Conversely, when the graphics 512 is strongly depressed by the finger, the man-machine server transfers an operation command to the actuator to turn the valve 400 in the right direction. A situation of rotations of the valve 400 is imaged by the camera 60 to be displayed on the video display region 200. In conjunction with rotations of the valve 400, representations of the graphics 510 and 512 may be rotated. The graphics displayed on the screen for manipulation, as represented in the patterns 510 and 512, will now be referred to a "graphic control device", respectively.

Figure 11B:
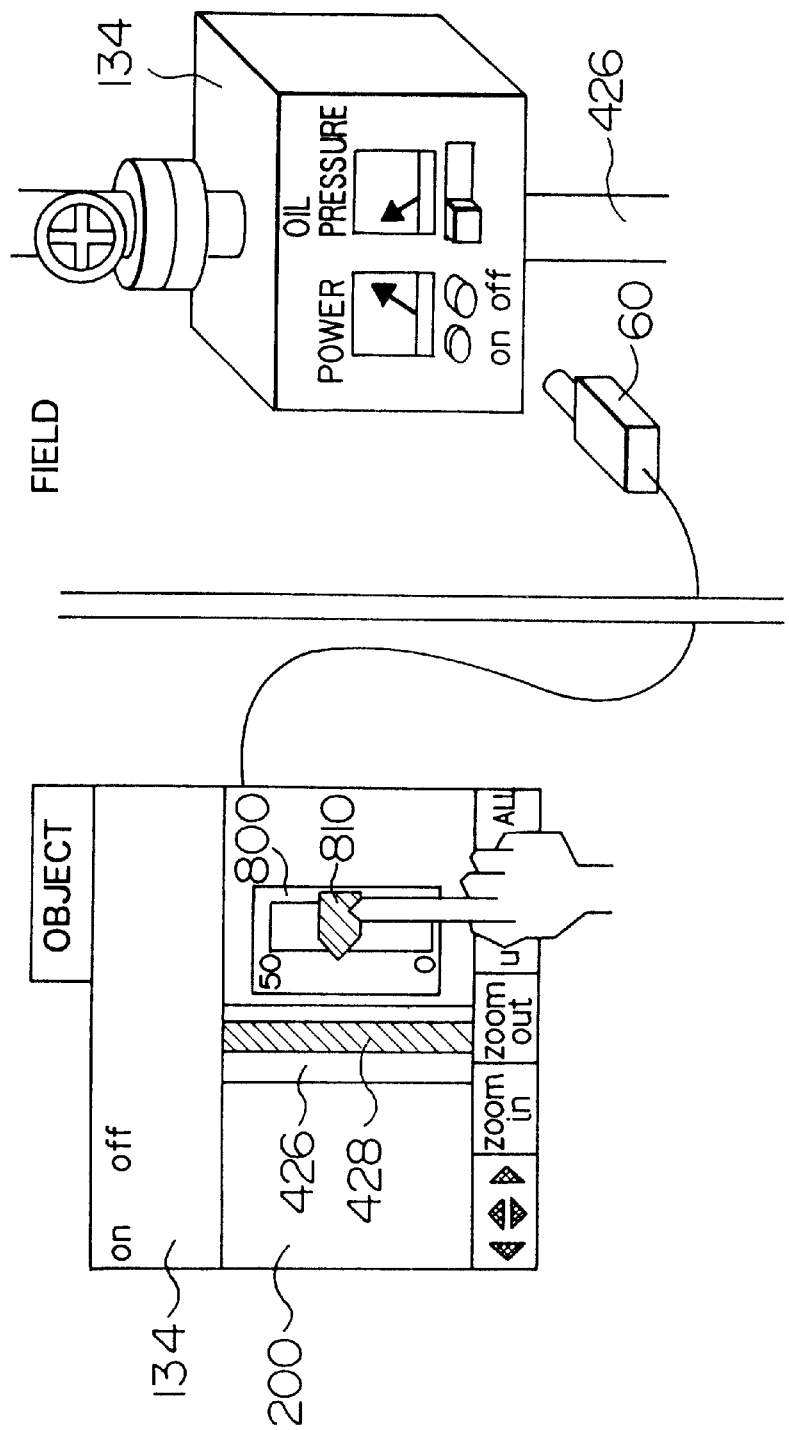

Another example of the graphic control device is shown in FIG. 11B. In FIG. 11B, reference numeral 426 shows a pipe connected to a lower portion of the object 134; reference numeral 800 denotes a slider displayed as the graphics on the picture in the synthesized form; reference numeral 810 indicates a knob of the slider 800; and reference numeral 428 shows a variation in a flow rate within the pipe 426 which is displayed as the graphics on the pipe 426 in the synthesized form. When the pipe 426 is strongly depressed on the video display region 200 by the operator, the slider 800 is displayed near the pipe 426 in the synthesized form. Furthermore, the graphics 428 indicative of the present flow rate of the pipe 426 is displayed on the pipe 426 in the synthesized form. The graphics 428 will change, for instance, a width and color thereof in response to the flow rate within the pipe 426. When the flow rate becomes high, the width of the graphics becomes wide, whereas when the flow rate becomes low, that of the graphics become narrow. When the knob 810 of the slider 800 is dragged by his finger of the operator, an instruction to control the flow rate within the pipe 426 in response to the movements of the knob 810 is transferred from the man-machine server 20 to the controlling computer 50. Furthermore, the operation command is issued from the computer to the actuator, for instance, the pump, and this pump is controlled. As a result, when the flow rate within the display condition of the graphics 428 is changed in response to this variation.

As shown in FIGS. 11A and 11B, advantages that the graphic control device is displayed on, or near the appliance imaged on the monitor picture in the synthesized form, is given as follows:

(1). A hint is given to an operator by the graphic control device which appliance actually controlled corresponds to which device present in a field. In the example of FIG. 11A, the operator can simply and easily predict and also remember that the graphic control devices 510 and 512 control the valve 400 displayed in the synthesized form. In the example of FIG. 11B, it is easily conceived that the slider 1800 controls the flow rate within the pipe 426 which is photographed near this slider 1800.

(2). An operation can be carried out while observing a condition of an appliance to be controlled. In the example of FIG. 11B, if a crack is made in the pipe 426 and a fluid is leaked therein during operations of the graphic control device 1800, an operator can recognize it by his eyes, and can immediately recognize such an error operation and also such an extraordinary case.

In the conventional graphic man-machine interface, since the graphic control device is arranged on the screen irrelevant to the appliances in the field, it is difficult to recognize which appliance in the actual field is controlled by the graphic control device. Also, since the place where the graphic control device is displayed is positioned apart from the place where the monitored picture of the field is displayed, an operator must move his eyes several times in order to execute the operations while observing the situations of the field.

In FIG. 11B, there is shown that the flow rate of the pipe 426 is indicated by representing the graphics 426 on the picture of the pipe 426 in the synthesized form. As described above, the graphics is synthesized on the appliance which is being displayed in the picture, so that information such as internal conditions of the appliance which is not displayed in the picture can be supplemented. As a consequence, for instance, both of the internal situation of the appliance and the external situation thereof can be referred at the same time, the entire situations of the appliance can be comprehensively monitored and judged.

Figure 12:
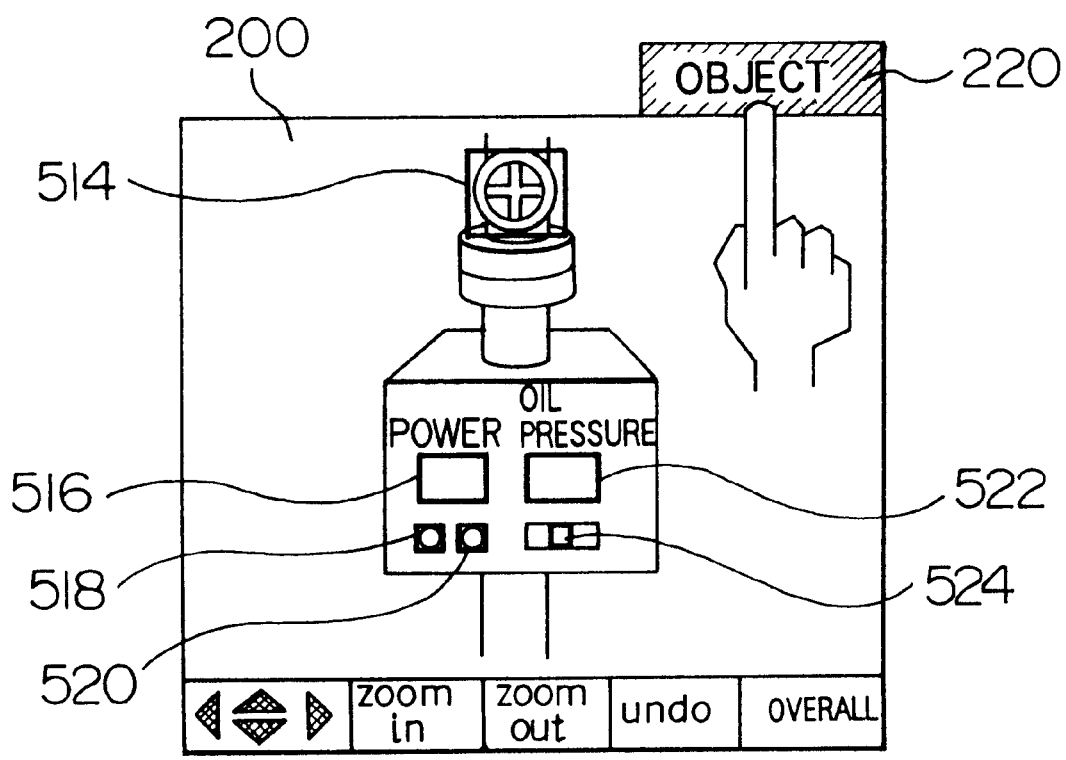
FIG. 12 is a diagram for showing an example of clearly indicating an operable object.

FIG. 12 represents a method for clearly indicating an operable object. Since all of objects represented in a picture are not always operable, a means for clearly indicating operable objects is required. In FIG. 12, when a menu 220 is lightly or softly touched by a finger, graphics 514 to 524 are represented. The graphics 514 to 524 clearly indicate that the objects 400, 412, 414, 416, 422 and 424 are operable, respectively. In case of the present embodiment, an expolated rectangle of an object is represented. It is of course possible to conceive other various display methods in order to clearly indicate the object such as graphic representations of real objects.

Furthermore, a means for clearly indicating not only such operable objects, but also any objects may be employed. For instance, when the menu 220 is strongly depressed by the finger, all of the objects being represented in the picture may be clearly indicated. The above-described object clearly indicating means can clearly indicate the operable objects, but also can represent the operation and the cause of failure even when, for instance, a substance to disturb a view field, such as smoke and steam happens to occur. Since even if the object to be operated is covered with the smoke, the object to be operated is clearly indicated by the graphics, operation can be performed. Also, since it can be seen where and which appliance is located, a place where the smoke is produced can be found out.

Figure 13:
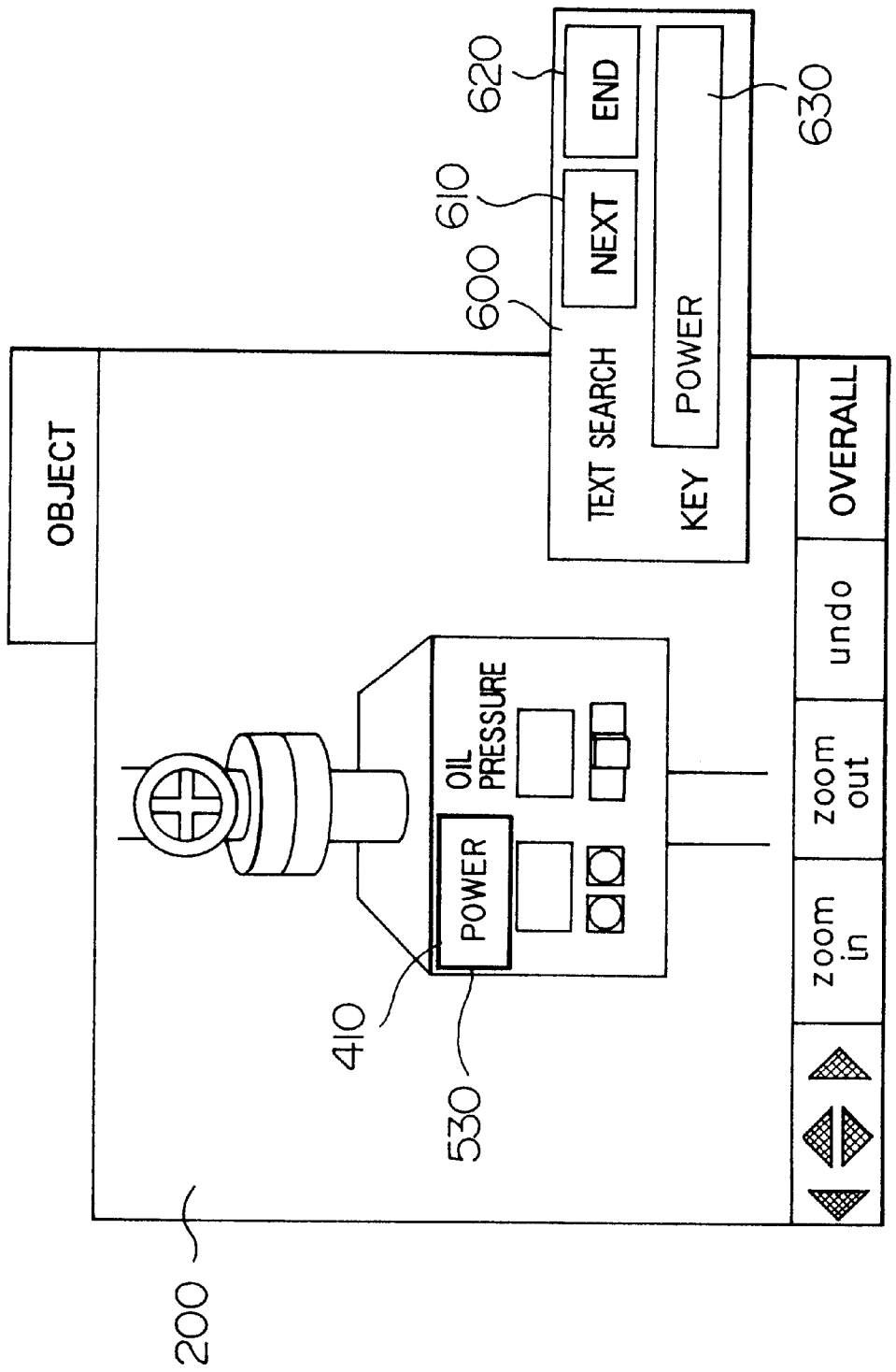
FIG. 13 is a diagram for indicating an example of a picture search by a search key.

In FIG. 13, there is shown an example in which a text is inputted and a search is made in a picture where this text is displayed. In FIG. 13, reference numeral 530 denotes a graphics displayed on a picture in a synthesized form; reference numeral 600 indicates a search sheet for executing a text search; reference numeral 610 shows a next menu for searching another adaptable picture by the search key; reference numeral 620 is an end menu for designating an end of a search; and reference numeral 630 denotes a text input region for inputting to the search key. When a selection is made of designating a search in the menu region 110, the search sheet 600 is displayed on the display screen 100. When a text corresponding to the search key is entered from the keyboard into the text input region 630 and the return key is depressed, the search is commenced. The man-machine server searches such a camera capable of photographing a matter containing the search key, sets the searched camera to such a camera task that the search key can be clearly seen, and displays the picture derived from the searched camera on the video display region 200. The graphics 530 is displayed in the synthesized form on the portion matched to the search key within the picture, and the portion matched to the search key within the picture, and the portion matched to the search key is clearly indicated. The object to be monitored can be pictured by the operator with his language by the picture search where the text is used as the search key. According to this method, the object to be monitored can be quickly found out by not changing the cameras and not controlling the cameras in the remote control manner. In this embodiment, the keyboard is employed to input the text. Alternatively, other input means such as a speech recognition apparatus, and a hand-writing character recognition apparatus may be utilized. Although the text is utilized as the search key in this embodiment, a pattern is employed as the search key and such a picture that a pattern matched to the pattern of the search key is represented may be searched.

Figure 16:
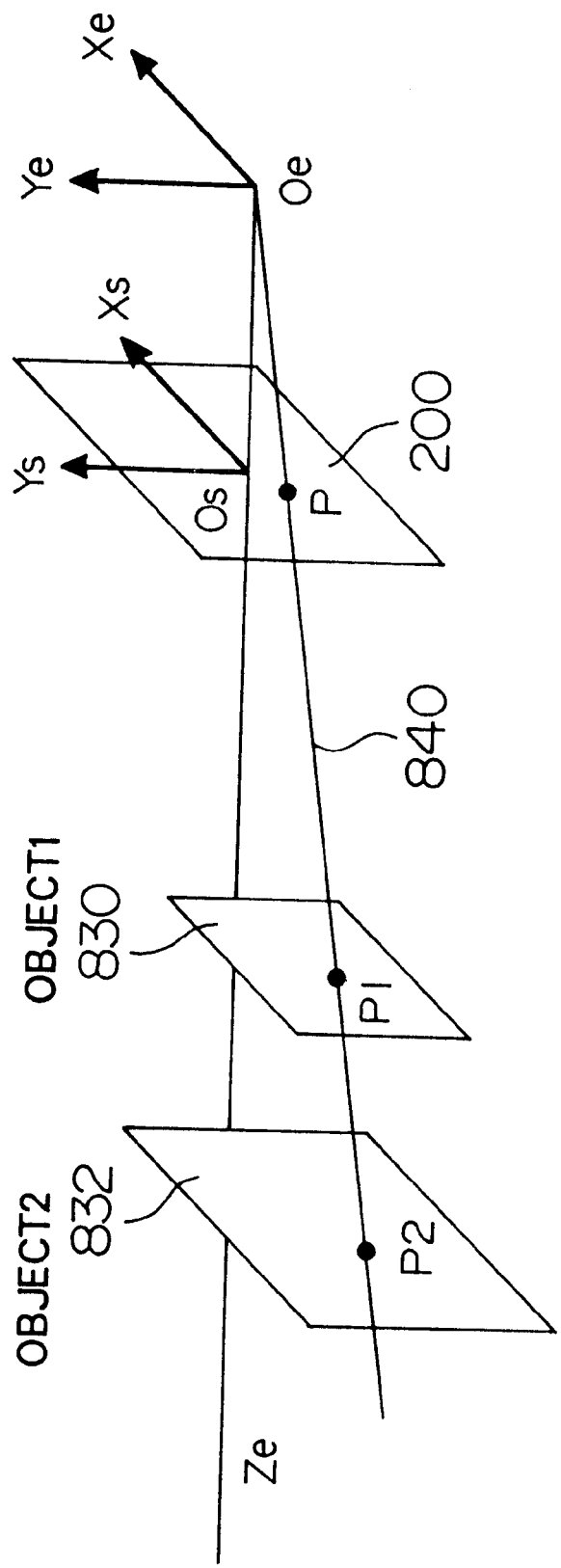
FIG. 16 is a diagram for showing a relationship between an object and a point on a screen.
Figure 17:
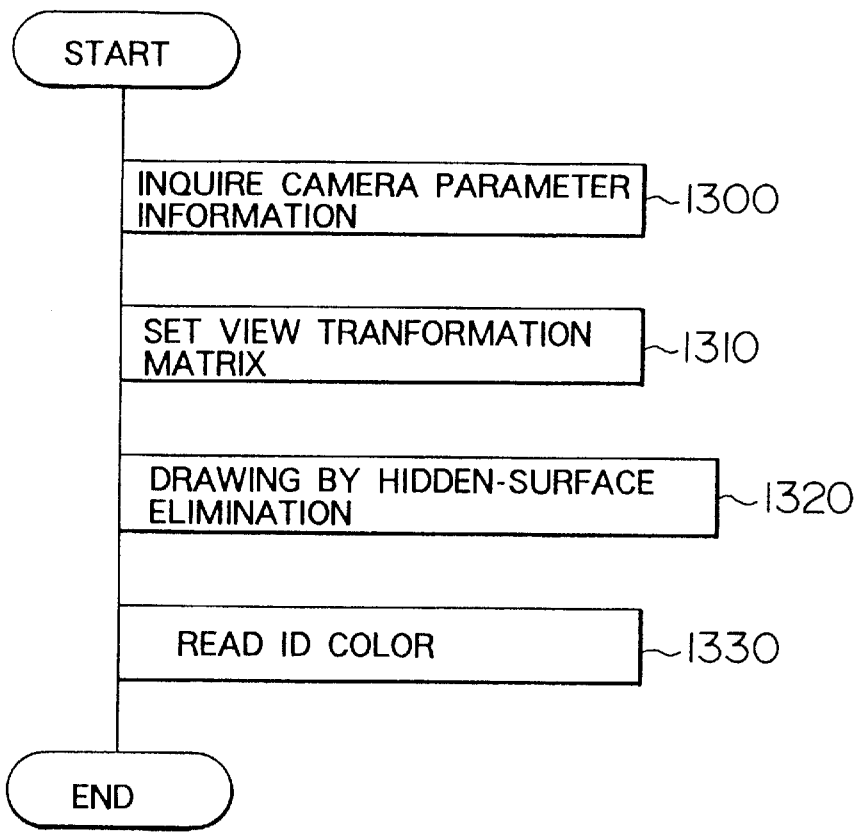
FIG. 17 is a flow chart for showing a sequence of an object identifying process with employment of the three-dimensional model.
Figure 18:
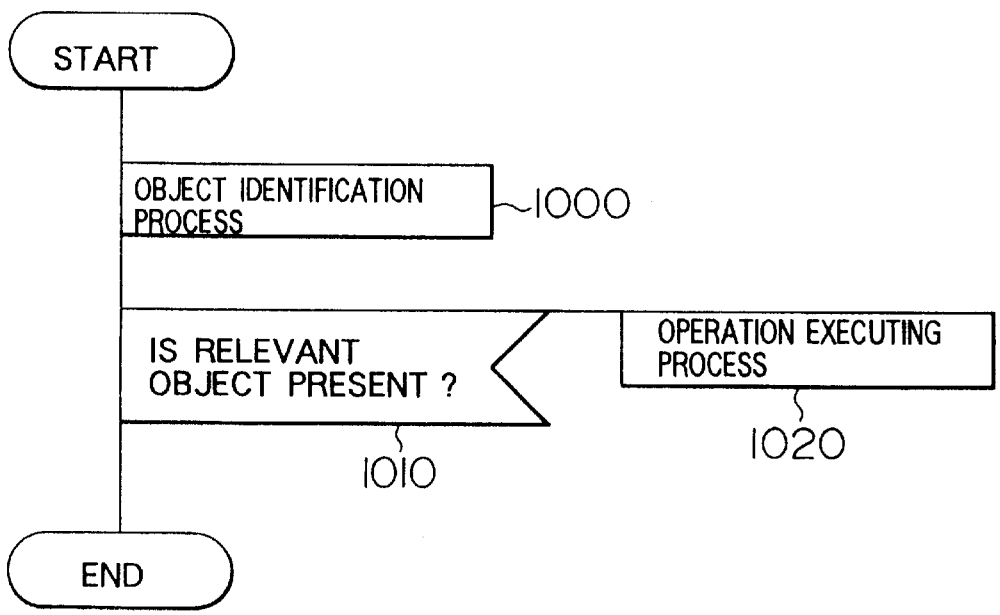
FIG. 18 is a flow chart for indicating a sequence of a realizing method according to the embodiment.

A realizing method of this embodiment will now be explained with reference to FIGS. 14 to 25. A major function of this embodiment is such a function that an object within a picture is designated and an operation based on this object is executed. A flow chart of a program to realize this function is represented in FIG. 18. When the touch panel 12 on the video display region 200 is depressed, an object imaged at this depressed position (a position on a screen designated by an operator by use of a PD such as a touch panel will be referred to an "event position") is identified (step 1000). When the object can be identified (in case that the object is present at the event position) (step 1010), an operation defined in accordance with this object is executed (step 1020).

The object pictured at the event position is identified with reference to the model of an object to be photographed and a camera parameter. The model of an object to be photographed corresponds to the shape of an object to be photographed and data about the position thereof. The model of an object to be photographed is stored in the disk 320 of the man-machine server 20, and read into the main memory 310 when the plant operation monitoring system is operated. The camera parameter implies how to photograph an object to be photographed by a camera, namely data about a position of a camera, an attitude, an angle of view, and a camera direction. A value of a camera parameter which has been set to a camera may be recognized if an interrogation is made to a camera controlling controller. Of course, the camera parameter may be supervised by the man-machine server 20. In other words, a region for storing the present value of the camera parameter is reserved in the main memory 310 of the man-machine server 20, and the values of the camera parameter stored in the main memory 310 are updated every time the camera is remote-controlled by the man-machine server 20. The parameters of all cameras are initialized by the man-machine server 20 when the plant operation monitoring system is operated.

Various methods for modeling an object to be photographed may be conceived. In this embodiment, (1) a three-dimensional model, and (2) two-dimensional models are combined. The summary of the above-described two models, and merits and demerits thereof will now be explained.

(1) Three-Dimensional Model

A model in that the shape and the position of an object to be photographed are defined by a three-dimensional coordinate system. As a merit, an object in accordance with an arbitrary camera parameter can be identified. In other words, an object can be operated while a camera is freely operated. As a demerit, since a model must be defined in the three-dimensional space, a model forming process and an object identifying process become complex, as compared with those for the two-dimensional (2D) model. Very recently, it should be noted that since there are many cases that CAD (computer aided design) is utilized in designing a plant, and in designing/positioning devices employed in the plant, if these data are applied, the three-dimensional model may be easily formed.

(2). Two-Dimensional Model

A model in that the shape and the position of an object are defined by a two-dimensional coordinate system (display plane) with respect to a specific camera parameter. As a merit, a model can be easily formed. A model may be defined in such a manner that a pattern is drawn on a screen. As a demerit, only an operation is carried out with respect to a picture of a camera parameter in which a model is previously defined. To increase a free degree of a camera task, a shape and a position of an object must be defined on a corresponding plane for each of the camera parameters greater than those of the three-dimensional model. In most operation monitoring system, there are many cases that several places which are to be monitored have been previously determined. In such a case, since several sorts of camera parameters are previously determined, the demerit of the two-dimensional model does not cause any problem.

Figure 14:
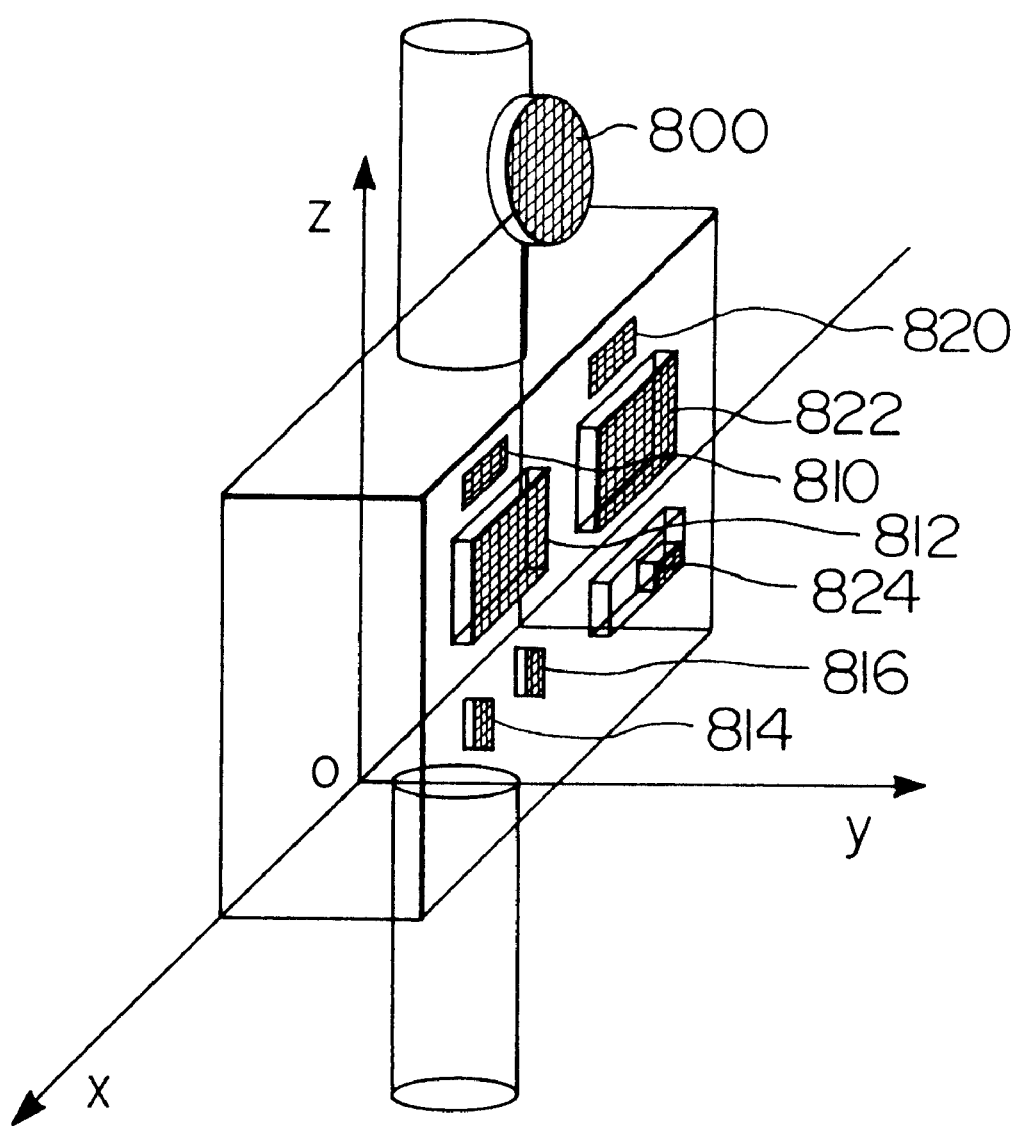
FIG. 14 illustrates an example of a three-dimensional model.

A method for identifying an object based on the 3-D (dimensional) model will now be explained with reference to FIGS. 14 to 17. In FIG. 14, there is shown such an example that the object to be photographed by the camera 60 shown in FIG. 6 is modeled in the 3-D rectangular coordinate system x, y, z (will be referred to a "world coordinate system"). In this drawing, the shape of each object is modeled by a plane, a rectangular parallelepiped, and a cylinder and the like. Many other 3-D basic forms than a cube and a tetrahedron may be, of course, employed. Also, not only the basic shapes are combined with each other, but also models having more precise shapes than those of the basic shapes may be utilized. Objects 400, 410, 412, 414, 416, 420, 422 and 424 to be operated are modeled on models as planes 800, 810, 812, 814, 816, 820, 822 and 824, respectively.

Figure 15:
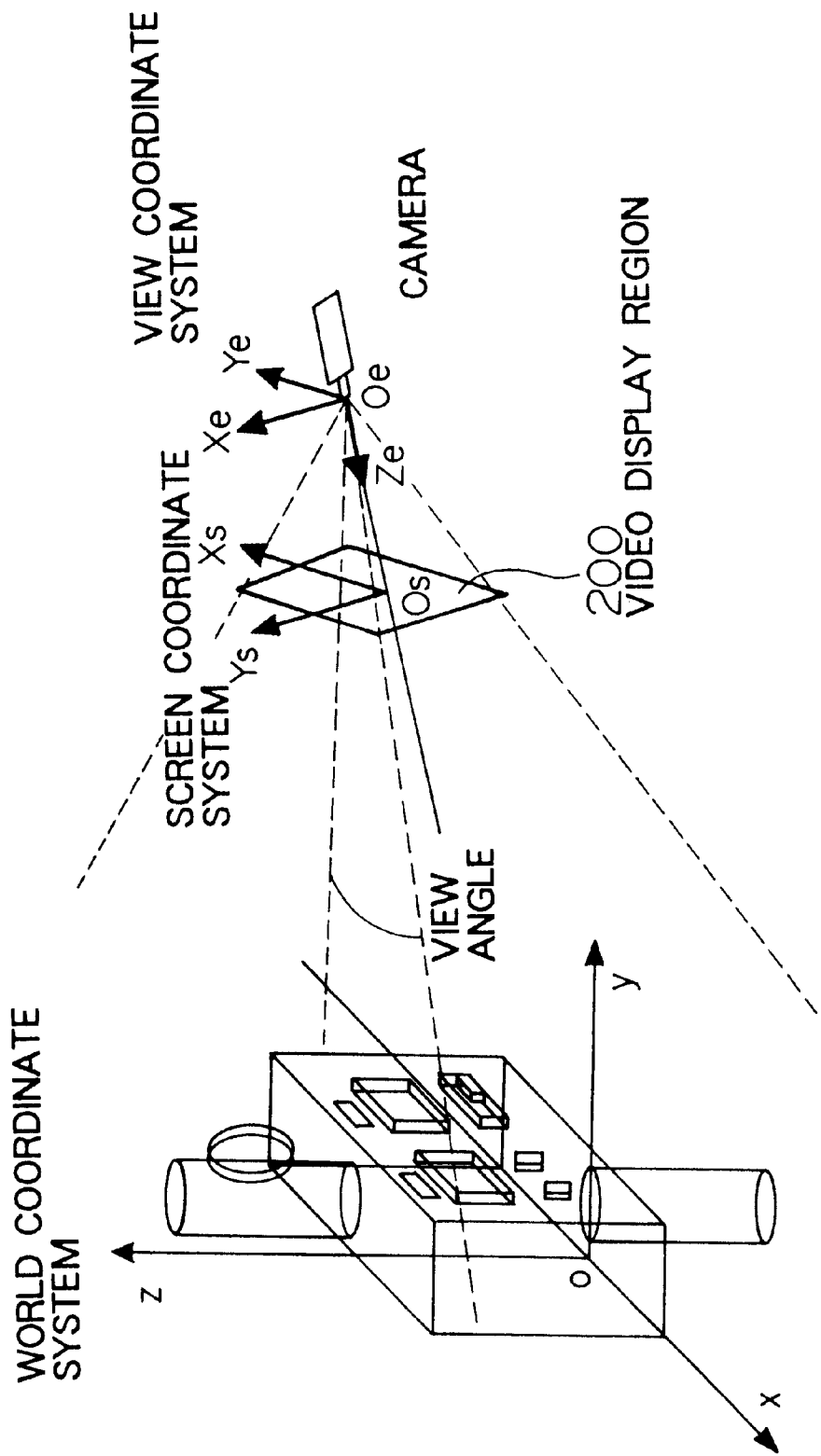
FIG. 15 is a diagram for indicating a relationship between the three-dimensional model and the picture displayed on the screen.

Referring now to FIG. 15, a relationship between a picture photographed by a camera and a 3-D model will be explained. A photographing operation by a camera corresponds to such an operation that an object arranged within a three-dimensional space is projected onto a two-dimensional plane (video display region 200). That is to say, the picture displayed in the video display region 200 corresponds to such a picture that the object positioned in the 3-D space is projected onto a two-dimensional plane by the persective projection. Assuming now that the 2-D orthogonal coordinate system Xs, Ys defined on the screen is called as the screen coordinate system, the photographing operation by the camera may be formulated as a formula (1) for imaging one point (x, y, z) in the world coordinate system onto one point (Xs, Ys) in the screen coordinate system:

$$\begin{bmatrix} Xs \\ Ys \\ 1 \end{bmatrix} = T \begin{bmatrix} x \\ y \\ z \\ 1 \end{bmatrix} = \begin{bmatrix} t11 & t12 & t13 & t14 \\ t21 & t22 & t23 & t24 \\ t31 & t32 & t33 & t34 \end{bmatrix} \begin{bmatrix} x \\ y \\ z \\ 1 \end{bmatrix} \quad (1)$$

A matrix T in the above formula (1) will now be referred to a view transformation matrix. The respective elements in the view transformation matrix may be determined if the camera parameters (position, attitude, direction and view angle of camera) and the size of the video display region 200 are given. The camera parameters are given in the world coordinate system. In FIG. 15, the position of the camera corresponds to a coordinate of a center "Oe" of the lens, the attitude of the camera corresponds to a vector OeYe, and the direction of the camera corresponds to a vector OeZe.

An identification process of an object corresponds to a process for determining which point in the world coordinate system has been projected onto a point "p" in the screen coordinate system when one point "p" is designated in the screen coordinate system. As shown in FIG. 16, all of points present on an extended straight line for connecting a center Oe of the lens of the camera with the point "p" on the screen coordinate system are projected onto the point "p". A point among the points on this straight line, which is actually projected onto the video display region 200 by the camera, corresponds to a cross point between the straight line and the object 1 positioned nearest the center Oe of the lens. In FIG. 16, a cross point P1 between the object 1 and the straight line 840 is projected onto one point "p" in the video display region 200. In other words, assuming now that the event position is located at the point "p", the object 1 is identified.

The technique for obtaining the view transformation matrix T from the camera parameter and the technique for displaying the model defined in the world coordinate system based on the view transformation matrix T by the perspective projection onto the screen coordinate system, are well known techniques in the graphic field. The process for projecting a surface of an object positioned near a camera and for not projecting a surface onto a screen, which is hidden by another object with respect to the camera during the perspective projection, is referred to either a hidden-surface elimination, or a visible-surface determination. A large number of alogrorithms have been developed. The techniques are described more in detail in, for instance, "Computer Graphics Principles and Practice" written by Foley, vanDam, Feiner, and Hughes issued by Addison Wesley (1990), and "Principles of Interactive Computer Graphics" written by Newman, Sproull issued by McGraw-Hill (1973). In most graphic work station, the graphic functions such as setting of the view transformation matrix, perspective projection, and hidden-surface elimination from the camera parameter, have been previously installed by way of the hardware and software, and these can be processed at a high speed.

In this embodiment, the process for identifying the object is performed by utilizing these graphic functions. In a 3-D model, a surface of an object to be processed is previously colored, and discrimination can be done which color of the surface belongs to which object. For instance, in FIG. 14, different colors are set to the planes 800, 810, 812, 814, 816, 820, 822 and 824. The colors set to the respective objects will now be referred to ID (identifier) colors. A sequence of identification process with employment of a 3D model with this ID color is shown in FIG. 17. First, a present camera parameter is inquired (step 1300), and the view transformation matrix is set based upon the inquired camera parameter (step 1310). In the man-machine server 20, the present camera condition is continuously managed, and when an inquire is made of the camera parameter, the camera parameter is returned in response to the present camera condition. The present camera condition may be managed by the camera controlling controller. At a step 1320, based upon the view transformation matrix set at the step 1310, the colored model is drawn into a rear buffer of the graphic frame buffer 340. In this drawing operation, both of the perspective projection process and the hidden-surface elimination process are carried out. Since the colored model are drawn into the rear buffer, the drawn result does not appear on the display 10. When the drawing operation is completed, the pixel values of the rear buffer corresponding to the event position are read out (step 1330). The pixel values are the ID color of the object projected onto the event position. The ID color corresponds to the object in an one-to-one relationship, and the object may be identified.

Referring now to FIGS. 19A to 25, a method for identifying an object based on a 2D (dimensional) model will be explained. In the 2D model, a shape and a position of the object after being projected from the world coordinate system to the screen coordinate system is defined. If the direction or the angle of view of the camera is changed, the position and the shape of the object projected onto the screen coordinate system are varied. Therefore, the 2D model must own the data about the shape and position of the object with respect to each camera parameter. In this embodiment, the object is modeled by a rectangular region. That is to say, an object under a certain camera parameter is represented by a position and a size of a rectangular region in the screen coordinate system. The object may be modeled with employment of other patterns (for instance, a polygon and a free curve).

Figure 19B:
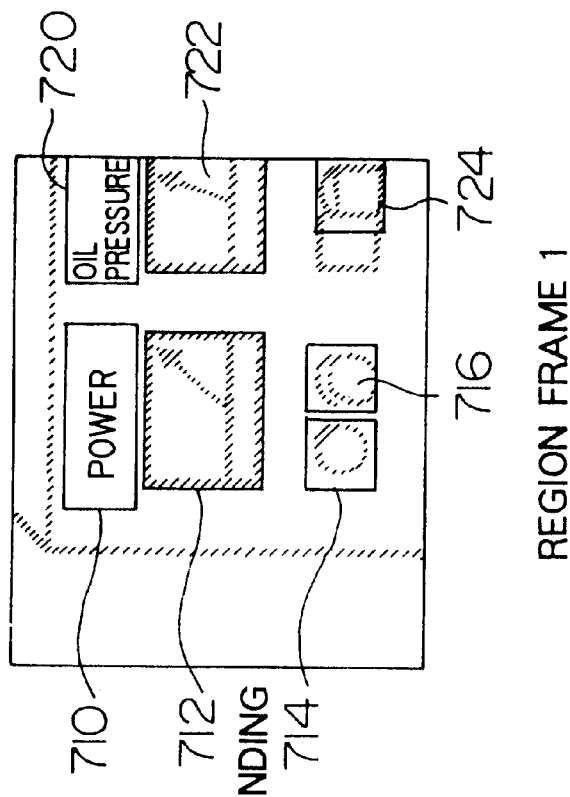
FIGS. 19A and 19B are diagrams for showing a relationship between a two-dimensional model and a camera parameter.
Figure 19A:
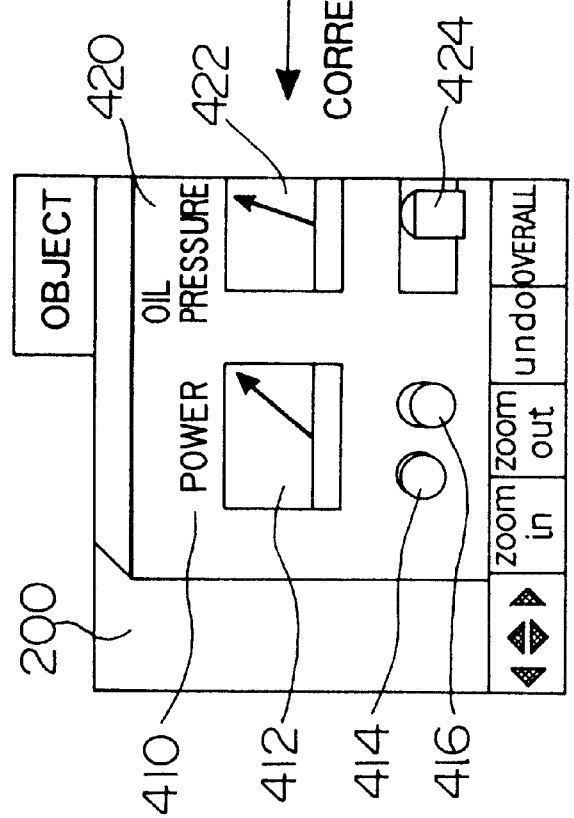
Figure 21A:
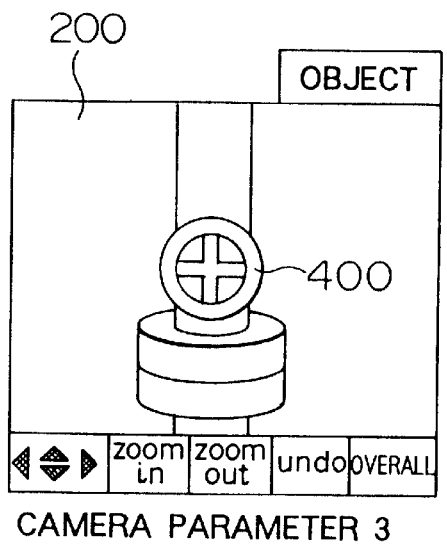
FIGS. 21A and 21B are diagrams for representing a relationship between the two-dimensional model and a further camera parameter.
Figure 21B:
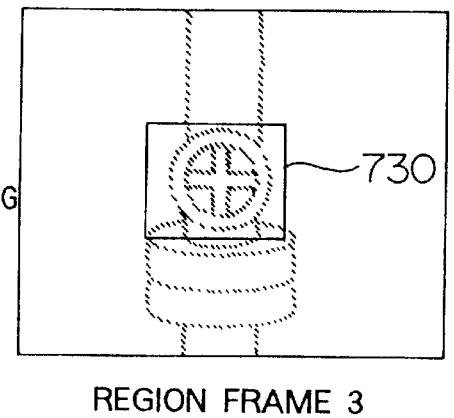

FIGS. 19A, 19B, 20A, 20B, 21A and 21B indicate relationships between camera parameters and two-dimensional models. FIGS. 19A, 20A and 21A show display modes of the video display region 200 with respect to the respective camera parameters. FIGS. 19B, 20B and 21B indicate the two-dimensional models of the object corresponding to the respective camera parameters. In FIG. 19A, objects 410, 412, 414, 416, 420, 422 and 424 on a picture are represented as rectangular regions 710, 712, 714, 716, 720, 722, 724 in the two-dimensional models of FIG. 19B. A rectangular group of the objects modeled in response to a single camera parameter is called as a region frame. A region frame 1 corresponding to the camera parameter 1 is constructed of rectangular regions 710, 712, 714, 716, 720, 722 and 724. FIGS. 20A, 20B, 21A, 21B represent examples of region frames corresponding to the different camera parameters. In FIGS. 20A and 20B, a region frame 2 corresponding to the camera parameter 2 is composed of rectangular regions 740, 742, 746, 748. These rectangular regions 740, 742, 746 and 748 correspond to the objects 412, 416, 424 and 422, respectively. Similarly, in FIGS. 21A and 21B, the region frame 3 corresponding to the camera parameter 3 is constructed of a rectangular region 730. The rectangular region 730 corresponds to the object 400. One object can correspond to different rectangular regions if the camera parameters thereof are different from each other. For instance, the object 416 corresponds to the rectangular region 716 in case of the camera parameter 1, whereas this object 416 corresponds to the rectangular region 742 in case of the camera parameter 2.

In FIGS. 23, 24 and 25, there are shown data structures of a two-dimensional model. In FIG. 23, reference numeral 1300 is a camera data table for storing data corresponding to each camera. In the camera data table 1300, both of data about camera parameters operable for an object within a picture, and data about region frames corresponding to the respective camera parameters are stored.

In FIG. 24, reference numeral 1320 shows a data structure of a camera parameter. The data of the camera parameter is constructed of a vertical angle corresponding to the camera direction in the vertical direction, a horizontal angle corresponding to the camera direction in the horizontal direction, and an angle of view indicative of a degree of zooming. In this example, it is assumed that the attitude of the camera and the position of the camera and the position of the camera are fixed. When the attitude of the camera and the position of the camera can be remote-controlled, data used to control these items may be added to the camera parameter 1320. The camera parameter 1320 is used to set the camera to a predefined camera parameter. In other words, the man-machine server 20 transfers the camera parameter to the camera controlling controller, thereby remote-controlling the camera. It should be noted that the camera parameter 1320 is not directly needed in performing the process for identifying the object.

FIG. 25 represents a data structure of a region frame. The region frame data is arranged by the number of regions for constituting the region frame and data related to the respective rectangular regions. The region data are constructed of a position (x, y) of a rectangular region in the screen coordinate system; a size (w, h) of a rectangular region; an active state, operation, and additional information of an object. The active state of the object is such a data for indicating whether or not the object is active, or inactive. When an object is under the inactive state, this object is not identified. Only an object under the active state is identified. A pointer to an event/operation corresponding table 1340 is stored in the operation field. The operation to be executed when the object is designated by a PD, is stored with forming a pair with the event into the event/operation corresponding table 1340. It should be noted that an event is to designate an operation sort of PD. For instance, an event when the pressure sensitive touch panel 12 is strongly depressed is different from an event when the pressure sensitive touch panel 12 is lightly depressed. Upon generation of an event, an object located at the position of this event is identified, and then the operation corresponding to the event matched to the generated event is executed among the event/operation pairs defined to this object. To the additional information of the region frame, a pointer to the additional information 1350 of the object, which cannot be expressed only as the rectangular region is stored. There are various types of additional information. For instance, there are a text, color, and a title of an object drawn in an object, and related information (e.g., a manual of an apparatus, maintenance information, design data). As a result, based upon the text drawn in the object, the object is searched and the related information of the designated object is represented.

Figure 22:
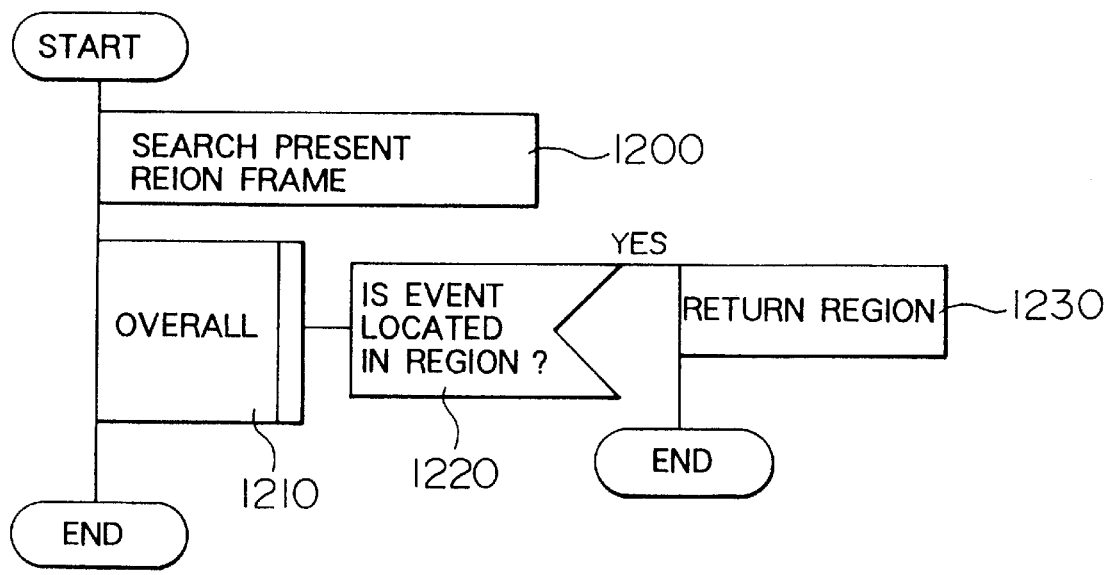
FIG. 22 is a diagram for showing a sequence of an object identifying process with employment of the two-dimensional model.

In FIG. 22, there is shown a sequence to identify an object by using a two-dimensional model. First, a region frame corresponding to the present camera parameter is retrieved from the camera data table 1300 (step 1200). Subsequently, a region containing an event position is retrieved from the region for constituting the region frame. In other words, data about the position and size of the respective regions stored in the region frame data is compared with the event position (step 1220), and if the region located at the event position is found out, this number is returned to the host processing system. The host processing system checks whether or not the found region corresponds to the active state. If it becomes the active state, then the operation defined in accordance with the event is performed. A step 1220 is repeated until either the region containing the event position is founded, or all regions within the region frame have been checked (step 1210).

A two-dimensional model is defined by utilizing a two-dimensional model definition tool. The two-dimensional model definition tool is constructed of the following functions.

(1). Camera Selecting Function

This function implies that an arbitrary camera arranged in a plant is selected and then a picture derived from this selected camera is displayed on a screen. There are the following camera selecting methods:

A camera for imaging an object is designated by designating this object on an arranging diagram of a plant displayed on a screen.

A place where a camera is arranged is designated on an arranging diagram of a plant displayed on a screen.

Identifiers for the number and a name of a camera are designated.

(2). Camera Work Setting Function

This function implies that the above-described camera selected by the camera selecting function is remote-controlled, and a direction and an angle of view of the camera are set.

(3). Pattern Drawing Function

This function means that a pattern is drawn on a picture displayed on a screen. A pattern drawing is performed by combining basic pattern elements such as a rectangle, a circle, a folded line, and a free curve. An approximate shape of an object is drawn by underlying a picture of an object by way of this function.

(4). Event/Operation Pair Definition Function

This function implies that at least one pattern drawn by the pattern drawing function is designated, and a pair of event/operation with respect to this designation is defined. An event is defined by either selecting a menu, or inputting a title of the event as a text. An operation is described by selecting a predefined operation from a menu, or by using an entry language. As such an entry language, for instance, the description language UIDL is employed which is described in the transaction of Information Processing Society of Japan, volume 30, No. 9, pages 1200–1210, User Interface Construction Supporting System Including Meta User Interface.

This description language UIDL (User Interface Definition Language) will now be summarized as an example.

In UIDL, the event/operation pair is defined by the following format.

event title (device) (operation)

An "event title" designates a sort of operation performed to a region on a screen defined by a pattern. The event title in case that the pressure sensitive touch panel 12 is employed, and a content of an operation corresponding to this event title are represented as follows. Another event title is designated when other devices such as a mouse are employed as a pointing device.

soft-touch: this event is produced when the touch panel 12 is lightly touched by a finger.

hard-touch: this event is produced when the touch panel 12 is a strongly touched by a finger.

soft-off: this event is produced when a finger is detached from the touch panel 12 after this panel is lightly touched by the finger.

hard-off: this event is produced when a finger is detached from the touch panel 12 after this panel is strongly touched by the finger.

soft-drag: this event is generated when a finger is moved while the touch panel 12 is lightly touched by the finger.

hard-drag: this event is generated when a finger is moved while the touch panel 12 is strongly touched by the finger.

A "device" is to designate from which apparatus, the event has been produced in case that there are plural apparatuses for generating the same events. For example, when there are two buttons on a mouse in right and left sides, a designation is made from which button, this event is generated. In this embodiment, since the apparatus for producing the above-described event corresponds to only the pressure sensitive touch panel 12, no designation is made of the event.

An "operation" is to define a process which is executed when an operation corresponding to the "event title" is performed to a region defined by a pattern. The "operation" is defined by combining prepared basic operations with each other by employing syntax (branch, jump, repeat, procedure definition, procedure calling etc.) similar to the normal programming language (for instance, C-language etc.). An example of a basic operation will now be explained.

activate ( ):
  Activating an object.
deactivate ( ):
  Deactivating an object.
appear ( ):
  Displaying a pattern for defining a region of an object.
disappear ( ):
  Erasing a display of a pattern for defining a region of an object.
SwitchCamera (camera, region):
  Displaying a picture of a camera designated by an argument camera in a region on the display screen 100 designated by an argument region.
setCameraParameter (camera, parameter):
  Setting a camera parameter to a camera. The argument camera designates a camera to be set. An argument parameter designates a value of a camera parameter to be set.
getCameraParameter (camera, parameter):
  Returning a value of a present camera parameter. A camera parameter of a camera designated by an argument camera is set to an argument parameter.
call external-procedure-name (argument-list):
  Calling a procedure formed by other programming language (e.g., C-language). Both of the calling procedure and the arguments thereof are designated by "external procedure name", and "argument-list", respectively.
send object-name operation-name (argument-list):
  Either basic operation of another object, or a procedure is called out. Either the basic operation to be called out, or the procedure and arguments thereof are designated by "operation name" and "argument-list", respectively.

In the above-described 2-D model definition tool, a two-dimensional model is produced by way of the following steps.

Step 1
Designation of Camera and Camera Task
  A camera is selected with employment of the above-described camera selection function, and then a picture obtained by the selected camera is displayed on a screen. Next, a camera task is set by utilizing the above-described (2) camera task setting function, to obtain a picture of a desirable place.

Step 2
Definition of Outline of Object
  An outline of an object defined as an object among objects on a picture displayed by the step 1 is drawn by utilizing the above-described (2) pattern drawing function.

Step 3
Definition of Pair of Event and Operation
  At least one of patterns drawn by the procedure 2 is selected by employing the above-described (4) event/operation pair definition function, to define a pair of event and operation.

Step 4
Storage of Definition Content
  A content of definition is stored, if required. The definition contents are stored in the data structures as shown in FIGS. 23, 24 and 25. When a 2-dimensional model is wanted to be formed with respect to another camera and another camera task, the step 1 to the step 4 are repeated.

The 2-D model definition tool may be installed on the man-machine server 20, may be displayed on the display 10, or may be installed on a completely different work station and personal computer, so that the defined 2-D model may be transferred to the man-machine server 20.

An example of the above-described 2-D model definition tool is represented in FIG. 26. In FIG. 26, reference numeral 1500 indicates the two-dimensional model definition tool; reference numeral 1501 shows a text input field for inputting a title of a region frame; reference numeral 1502 is a menu for producing/editing a region frame by combining basic patterns (straight line, rectangle, ellipse, arc, folded line, polygon), and for defining an operation thereto. Reference numeral 1503 shows a management menu for storing and changing the produced region frame; reference numeral 1504 is a menu for selecting a camera; reference numerals 1505 to 1509 denote menus for remote-controlling the camera selected by the menu 1504 so as to pan/zoom the camera. Reference numeral 1510 shows a region for displaying a picture of a camera selected by the menu 1504 and also a region in which a region frame is superimposed on the picture; reference numeral 1511 is a rectangle drawn in the region 1510 in order to model the object 414; and reference numeral 1512 denotes a pointer move in conjunction with an input of a positional coordinate value from a pointing device such as a mouse and a touch panel. In the following example, a mouse equipped with two buttons at right and left sides is used as the pointing device. Moving the mouse while depressing the buttons of the mouse is referred to "drag". Depressing a button of the mouse and releasing it while the mouse is not moved is referred to "click". Continuously performing the "click" operation twice is referred to "double click".

Functions of the respective items of the menu 1502 are as follows:

Straight Line

A function to draw a straight line. After this item is selected, when the mouse is dragged within the region 1510, a straight line is drawn which connects the position of the pointer 1512 when the drag is started, and the position of the pointer 1512 when the drag is ended.

Rectangle

A function to draw a rectangle. After this item is selected, if the mouse is dragged within the region 1510, a rectangle is drawn in such that both of the position of the pointer 1512 when the drag is started, and the position of the pointer 1512 when the drag is ended constitute diagonal vertexes.

Ellipse

A function to draw an ellipse. After this item is selected, when the mouse is dragged within the region 1510, an ellipse is drawn which is inscribed with a rectangle wherein both of the position of the pointer 1512 when the drag is started and the position of the pointer 1512 when the drag is ended constitute a diagonal line.

Folded Line

A function to draw a folded line. After this item is selected, when the movement of the pointer 1512 and the click of the mouse (button) are repeated within the region 1510, and finally the mouse is clicked twice at the same position, a folded line is drawn which is made by sequentially connecting the positions of the pointer 1512 when the mouse is clicked by straight lines.

Polygon

A function to draw a polygon. After this item is selected, when the movement of the pointer 1512 and the click of the mouse are repeated within the editing region 1510, and finally the mouse is clicked twice at the same time, a polygon is drawn which is made by sequentially connecting the positions of the pointer 1512 when the mouse is clicked by straight lines, and by connecting the final point with the start point.

Deletion

A pattern designated by the pointer 1512 is deleted, and at the same time, this pattern is stored into a buffer (will be referred to a "paste buffer").

Copy

The pattern designated by the pointer 1512 is copied into the paste buffer.

Paste

A content of the paste buffer is drawn at the position of the pointer 1512 when the latest mouse is clicked.

Group

A plurality of patterns designated by the pointer 1512 are grouped. A plurality of grouped patterns will be handled as a single pattern. To model a single object by utilizing a plurality of pattern, these patterns are grouped. When this item is selected in case that only one grouped pattern is designated, the designated group is released and returned to a plurality of original drawings.

Operation

An operation definition sheet for defining an event/operation pair to the pattern designated by the pointer 1512 is called out.

Functions of the respective items of the menu 1503 are given as follows:

New

A region frame is newly defined.

Open

A name of a region frame designated at the input field 1501 is called out and then displayed at the region 1510. At the same time, the camera parameter is set which corresponds to the camera related to the called region frame, and a picture of this camera is displayed at the region 1510.

Store

The defined region frame is stored in the name designated by the input field 1501 with a pair of camera/camera parameter.

End

The model definition tool is ended.

Functions of menus 1505 to 1509 are as follows:

Menu 1505

A camera is panned in upper/lower directions and right/left directions.

Menu 1506

A camera is zoomed in.

Menu 1507

A camera is zoomed out.

Menu 1508

A camera is set to one preceding camera parameter.

Menu 1509

A camera is set to a value of a camera parameter when being finally stored (select the item "store" of the menu 1503).

When the menu 1504 is selected, a picture of the selected camera is displayed in the region 1510. A camera is remote-controlled by utilizing the menus 1505 to 1509, and set to a desirable camera parameter. In the model definition tool 1500, the camera is selected by the menu 1504. Alternatively, an icon may be displayed in the plant systematic diagram to clearly indicates an arrangement of a camera, and the camera may be selected by way of a method for selecting the icon.

In accordance with the model definition tool 1500, the object is modeled by combining the basic drawings (straight line, rectangle, ellipse, arc, folded line, polygon). That is to say, an object projected onto a screen coordinate system by way of a certain camera parameter, is expressed by a position and a size of a single basic pattern, or plural basic patterns. A model of an object is defined in such a manner that a picture displayed in the region 1510 is underlaid and an outline of an object being displayed therein is drawn. The outline of the object is drawn by way of such a manner similar to the drawing method with employment of the normal pattern drawing tool. When a desirable basic pattern is selected by the menu 1502, and a size and a position of the selected basic pattern are designated by using the pointer 1512 on the region 151, the basic pattern is drawn on the region 1510. In FIG. 26, the object 414 is modeled by the rectangle 1511. A single, or plural drawings in which a certain object has been modeled, will now be referred to a model object.

Figure 27:
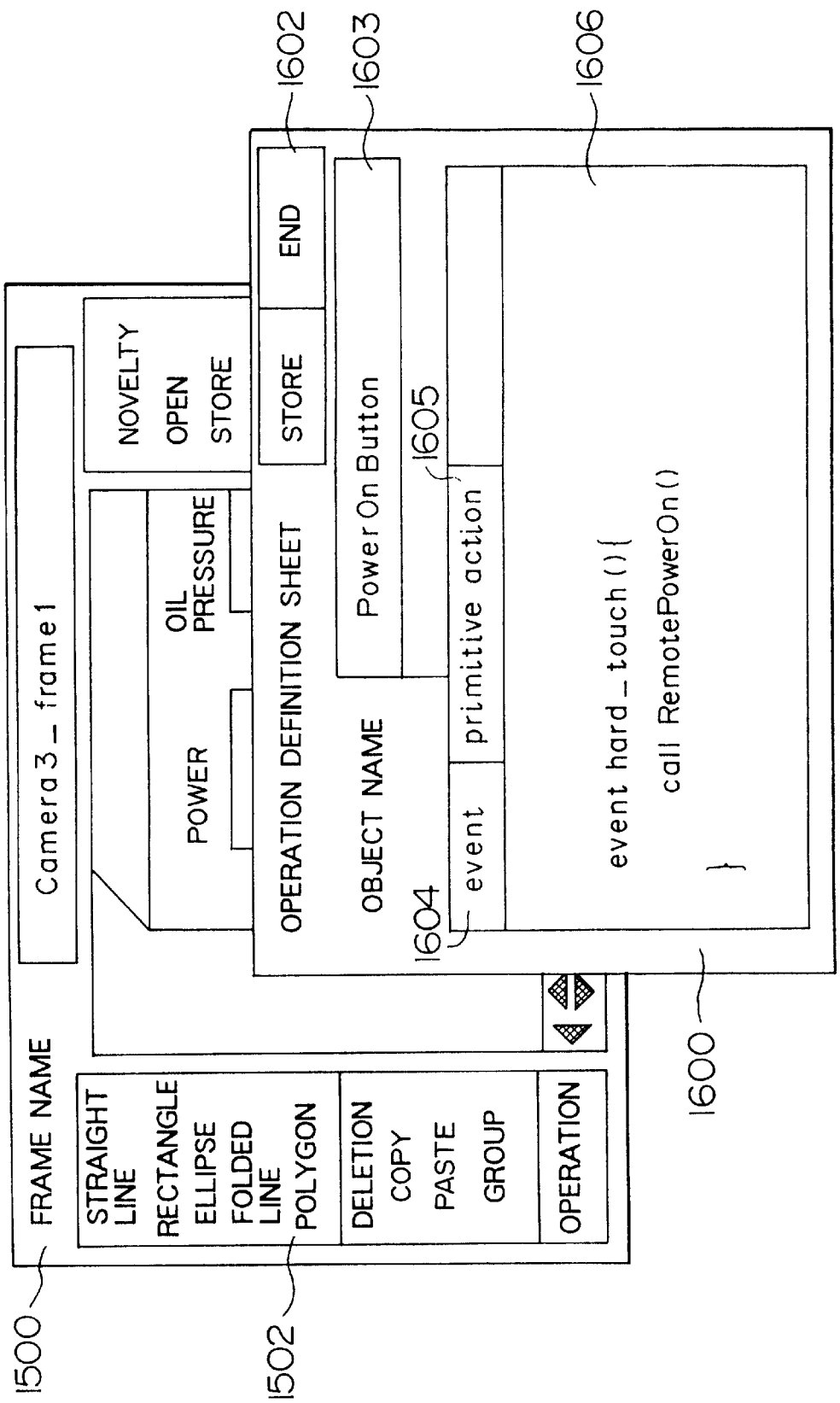
FIG. 27 is an example of a operation definition sheet for a model object.

When the outline of the object is drawn, an operation is defined to the subsequently drawn pattern, namely the model object. The operation is defined by employing the operation definition sheet. When the item "definition" of the menu 1502 is selected, an operation definition sheet 1500 is opened as shown in FIG. 27. In FIG. 27, reference numeral 1602 denotes a menu to manage the sheet 1600; reference numeral 1603 indicates a field to input an object name; reference numeral 1604 shows a menu to select a sort of events; reference numeral 1605 denotes a menu to select a basic operation which has been previously defined to an object; and reference numeral 1606 denotes a region in which an event/operation pair is described by using the above-described description language UIDL.

When the event/operation pair is entered, the sort of events and the basic operation of the object can be selected from the menus 1604 and 1605. Upon selection of the menus 1604 and 1605, either the selected even name, or the selected basic operation name is inputted into the input position of the region 1606. As a consequence, the task for inputting the event name or the basic operation name from the keyboard can be omitted, so that the taskload of the operation entry can be reduced.

Functions of the respective items of the menu 1602 are given as follows:

Store

A defined operation/definition pair is stored as an event operation/corresponding table of region frame data.

End

An operation definition sheet is ended and a control is returned to the model definition tool 1500.

FIG. 27 represents such a situation that an operation is defined to a pattern 1511 in which the object 414 is modeled. In an input field 1603 "PowerOnButton" is inputted as the object name of the pattern 1511. Then, in a region 1606, an even/operation pair of "if an object is hardly touched, then a procedure of "RemotePowerOn 0" is called" has been entered.

After the model definition is completed, an item "store" of the menu 1503 is selected to store the content of the definition in the data structures as shown in FIGS. 23 to 25. When the model definition tool 1500 is operated on the man-machine server 20, the definition content is stored into the main memory 310 and the disk 320.

Since a model of an object is owned, it can be recognized where and how an object is represented within a picture. As a result, the information related to the object may be graphically displayed based upon the position and the shape of the object within the picture, and the picture of the object can be retrieved. Examples are given as follows.

A name of an object, and function, operation manual, maintenance method and the like of the object are synthesized on, or near the object to be displayed.

Figure 28:
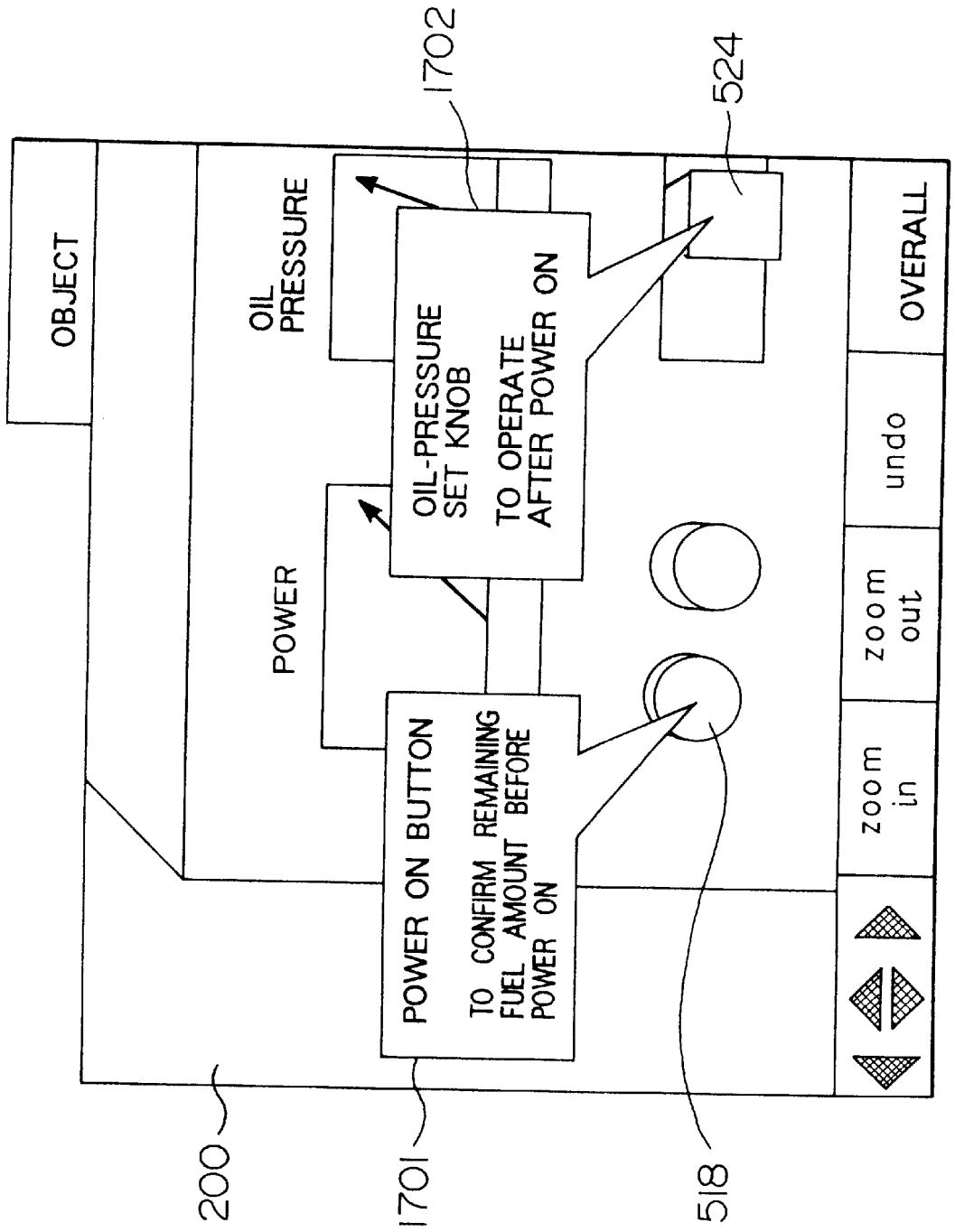
FIG. 28 is an example of an object definition display.

In FIG. 28, there is shown an example that an explanation related to an object is displayed adjacent to the object. In this figure, reference numerals 2201 and 2202 denote graphic indicative of the device of the objects 518 and 524, respectively.

An object formed by graphics is synthesized with an actually imaged picture to be displayed in such a manner that this object is actually photographed by a camera, as it were.

Searching additional information of an object based on a key word inputted, and setting a camera and a camera parameter in order to image the relevant object.

An internal structure of an object which cannot be photographed by a camera, is synthesized with an object shown in a picture to be displayed. For instance, for example, a condition of a water flow in a pipe is simulated, based on data obtained from another sensor, and then the simulation result is synthesized with the pipe viewed in the actual image for display purpose. Similarly, graphics for indicating a condition of flames within a boiler (for example, a temperature distribution diagram produced from information obtained from a sensor) is superimposed on the boiler displayed in the picture for display purpose.

An object to be attentioned at this time is clearly indicated by graphics. For example, when an extraordinary matter is sensed by a sensor, graphics is synthesized with an object in a picture for display purpose. Graphics are synthesized with an object in a picture related to data represented in a trend graph, so that a relationship between the data and the object in the picture can be immediately recognized.

Although the pictures photographed by the normal camera are utilized in the above-described embodiment, the present invention may be, of course, applied to either an image photographed by a specific camera (infrared camera, fisheye lens mounted camera, thermography), or an image which has been image-processed.

As an effect of the present embodiment, at least one of the following items (1) to (6) can be achieved.

(1). In a remote operation monitoring system, an operator can intuitively grasp an object to be operated and an operation result, resulting in less error operation.

(2). A desirable monitoring picture can be simply observed without bothering an operator with camera selection, or camera remote control.

(3). An operation can be executed on a monitoring picture. As a consequence, there is no necessity to separate a monitoring monitor from an operation panel. A remote operation monitoring system can be made compact and therefore space saving can be achieved.

(4). Graphics are combined with a camera picture and the combined picture is displayed, so that merits of these graphics and camera picture can be achieved and demerits of each items can be compensated with each other. In other words, an important portion can be emphasized while the feeling of attendance in a field is coveyed.

(5). A representation by which different sorts of information can be mutually referred at once. For instance, by only designating a portion being monitored on a camera picture, a trend graph indicative of a sensor value related to this designated portion can be displayed. Thus, conditions of a field can be comprehensively judged.

(6). A man-machine interface by which an operation can be directly given to a picture, can be directly given to a picture, can be simply designed and developed.

It should be noted that although a plurality of camera video have been used in this embodiment, pictures derived from a plurality of disk reproducing apparatuses (e.g., optical disk) may be employed.

Referring now to FIGS. 29 to 60, a plant control monitoring system according to another embodiment (second embodiment) of the present invention will be described.

In the below-mentioned embodiment, relating either video or sound with data (control data) used to control means the synchronous reproduction of either video or sound with control data, the mutual reference of either video or sound and control data, and synthesizing either video or sound with control data.

Figure 29:
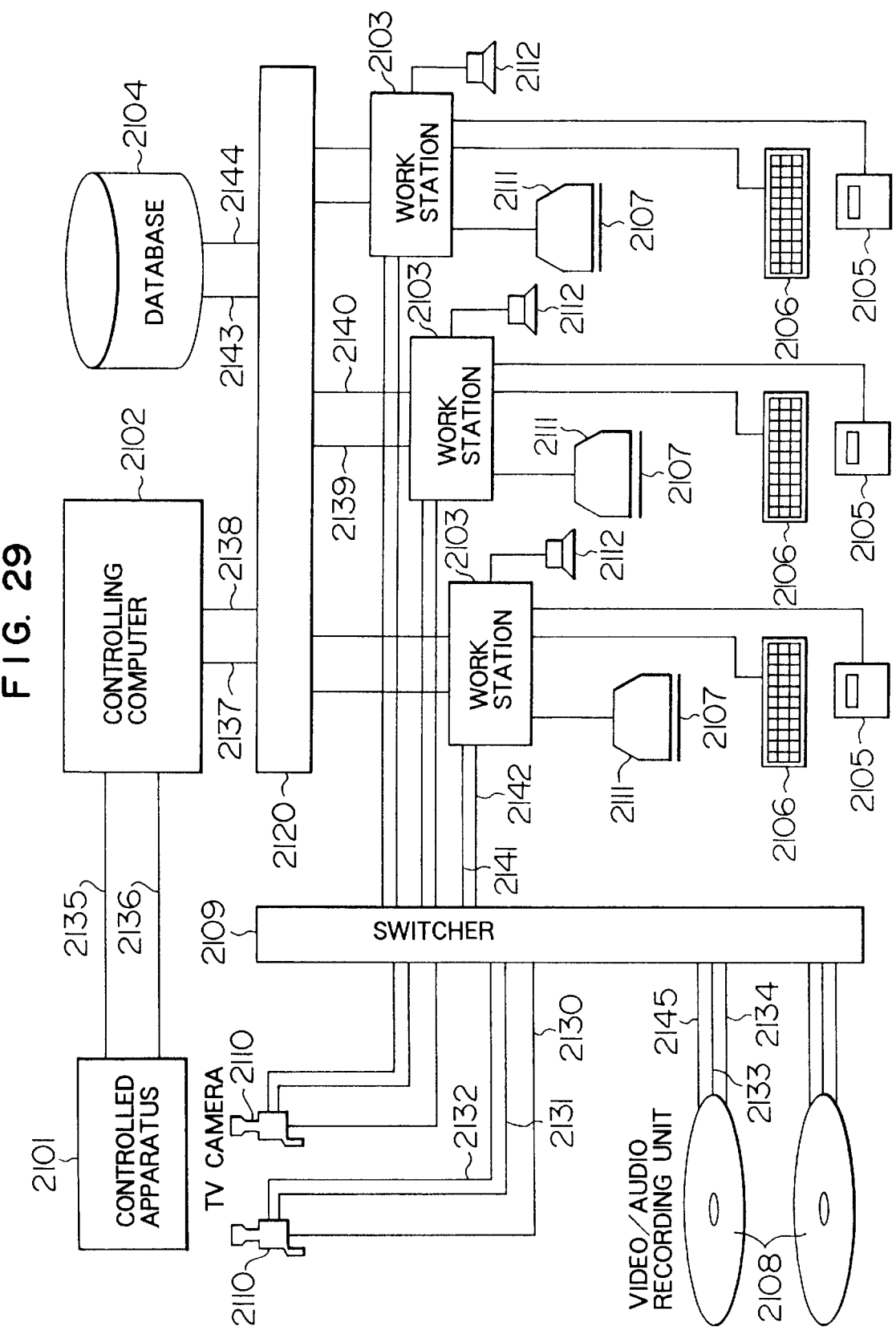
FIG. 29 is a diagram for indicating an arrangement of a monitoring system according to another embodiment of the present invention.

FIG. 29 shows an arrangement of the plant control monitoring system according to the present embodiment. An apparatus to be monitored in a field of a factory (will be simply referred to a "controlled apparatus") 2101 transfers process data indicating operation conditions via a cable 2135 to a controlling computer 2102 functioning as a first input means at each time instant. In the controlling computer 2102, the process data is analyzed, and control signals are sent via a cable 2136 to the controlled apparatus 2101. Also, the process data is flown via a cable 2137 into a LAN 2120, and operator commands which are flown via a cable 2138 from the LAN 2120, are received and then processed in the controlling computer 2102. As described above, a major function of the controlling computer 2102 is to acquire the process data, to output the process data to the LAN, to input the operator commands from the LAN, and to output the process control signals to the controlling apparatus 2101.

The LAN 2120 is of a cable "Ethernet", through which the signals such as the operator commands and the process data are flown. The LAN 2120 is connected to the respective devices by way of an output cable 2137 from the controlling computer 2102, an input cable 2138 to the controlling computer 2102, an output cable 2143 from the database 2104, an input cable 2144 into the database 2104, an output cable 2140 from the work station 2103, and an input cable 2139 into the work station 2103.

The database 2104 corresponding to first and third storage units and a first reproducing unit, fetches the process data and the like flown into the LAN 2120 via the cable 2144, and records the process data and the like together with a time instant "t" outputted from a clock internally provided therein. When a data read command is inputted via the cable 2144, the data designated by this data read command is transferred via the cable 2143 to the LAN 2120.

A plurality of ITV cameras 2110 are equipped with camera control devices capable of remote-controlling the ITV cameras in control modes of pan, tilt, and zoom upon receipt of control signals, and also microphones movable in conjunction with the cameras. The cameras 2110 send video images and sound of the controlled apparatus 2101 via the cables 2130 and 2131 to the switcher 2109. The switcher 2109 transfers the camera control signal inputted from the work station 2103 via the cable 2132 to the cameras 2110. The ITV cameras 2110 correspond to a second input unit.

As the video/audio recording unit 2108 corresponding to the second storage unit and the second reproducing unit, a random accessible unit such as an optical disk is utilized. Although a video tape may be employed as this random accessible unit, since the data search of a video tape is carried out sequentially, its data search and display are time-consuming. All of the video images and sounds derived from the ITV cameras 2110 are passed through the switcher 2109 and inputted from the cable 2133. When the work station 2103 corresponding to the control unit inputs the read command via the switcher 2109 by way of the cable 2145, the designated video/audio information is outputted via the cable 2134 to the switcher 2109.

The switcher 2109 is such a switch for selecting the video and sound information when a plurality of inputted videos and sounds are sent via the cable 2141 to the work station 2103, and also corresponds to a switch for selecting a signal destination when a camera control signal and a recorded video calling signal which are outputted from the work station 2103 via the cable 2142, are sent to the cameras 2110 and the video/audio recording unit 2108.

The work station 2103 is connected to a display 2111 and a speaker 2112, which correspond to the first and third output units as output units to the operator, and also connected to input devices such as a keyboard 2106, a mouse 2105, and a touchpanel 2107 as an input unit from the operator (a measurement data output designating unit, an unit for selecting an object to be selected, and an unit for designating a search value of measurement data). Also, the LAN 2120 is connected by the cables 2139 and 2140, and the switcher 2109 is connected by the cables 2141 and 2142. The work station 2103 processes the process data inputted from the cable 2139 to form a display screen, and represents the process data together with the video data inputted from the cable 2141 on the display 2111. On the other hand, the sound data inputted from the cable 2141 is outputted from the speaker 2112. Both of the speaker 2112 and the display 2111 corresponds to the second output unit. The key input from the keyboard 2106 by the operator and also the inputs from the input devices such as the mouse 2105 and the touch panel 2107 are processed in the work station 2103, and also are outputted as the control code of the controlled apparatus 2101 by the cable 2140, and further are outputted as the changing command to the video/audio changing switcher 2109, as the control code of the camera 2110, and as the calling code to the video/audio recording unit 2108.

The operator monitors the situations of the system indicated by the video, characters and graphics on the display 2111, and executes necessary operation and command by employing the mouse 2105, keyboard 2106 and touch panel 2107. For the sake of explanation, the touch panel 2107 is utilized as the input device from the operator. Other devices may be, of course, employed as this input device.

Figure 30:
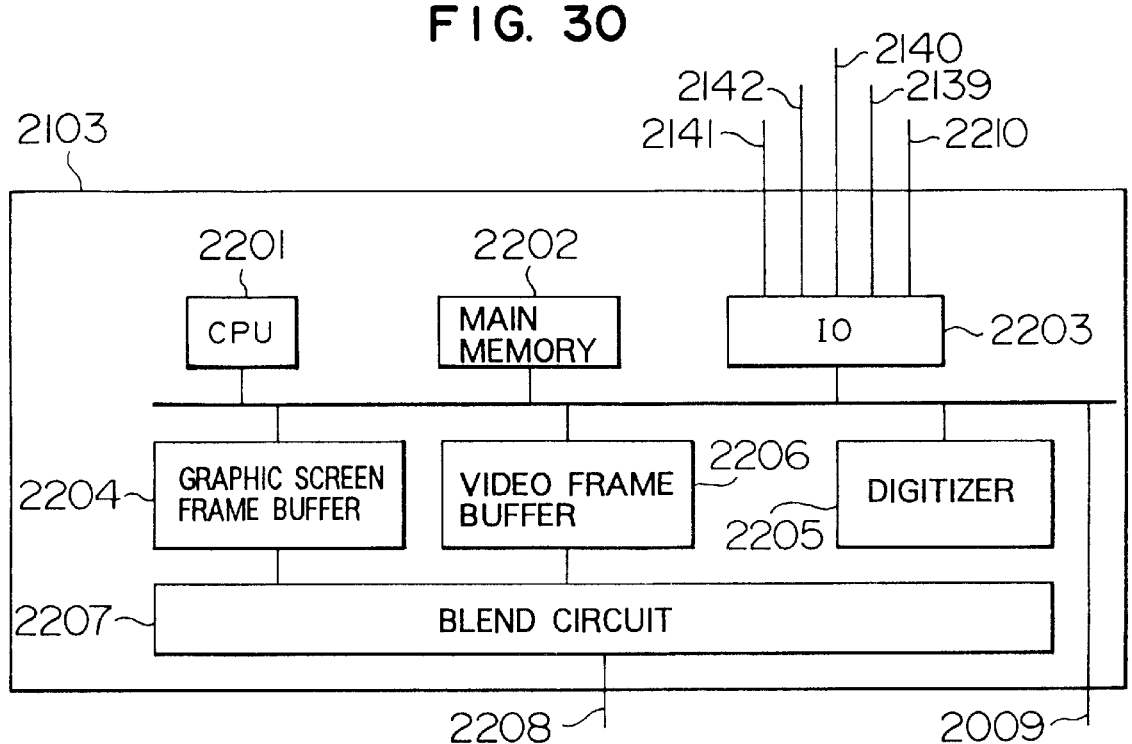
FIG. 30 is a diagram for showing a constructive example of a work station shown in FIG. 29.

Next, an internal structure of the work station 2103 is shown in FIG. 30. Reference numeral 2201 indicates a CPU (central processing unit); reference numeral 2202 is a main memory; reference numeral 2203 denotes an I/O (input/output); reference numeral 2204 shows a graphic screen frame buffer for displaying process data on the display 2111; reference numeral 2205 denotes a digitizer for converting an inputted video signal into a digital signal; reference numeral 2206 shows a video buffer frame; and reference numeral 2207 is a blend circuit for blending a graphic screen with a video image.

Figure 31:
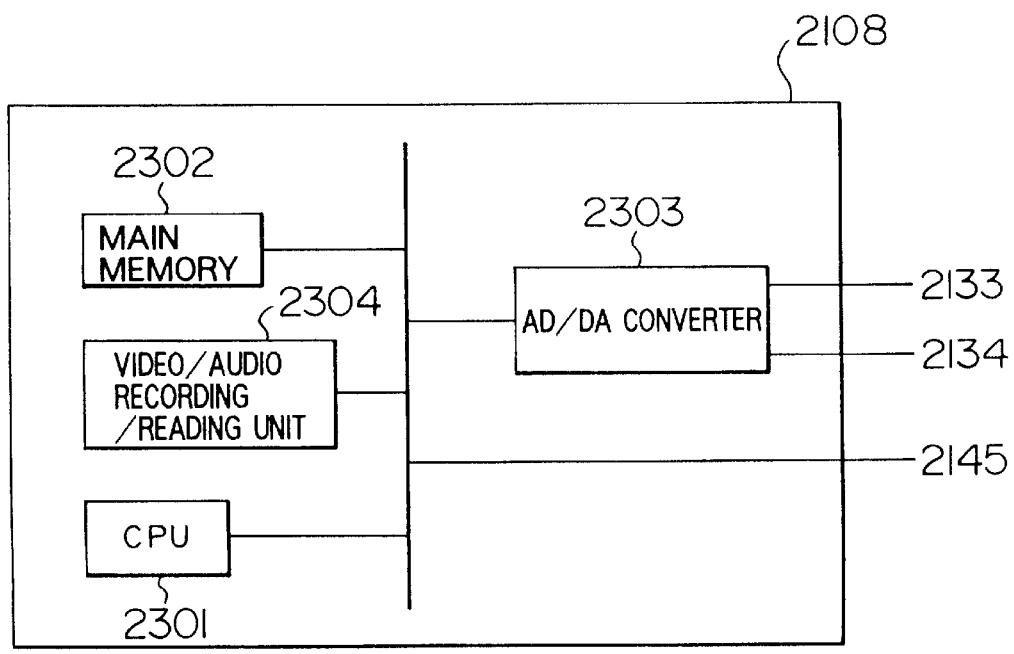
FIG. 31 is a diagram for representing an constructive example of a picture/sound recording unit.

In FIG. 31, there is represented an arrangement of the video/audio recording unit 2108. This video/audio recording unit 2108 is constructed of a CPU 2301 for fetching various instructions derived from the task station 2103 to process these instructions, and also for issuing recording/reproducing commands; a main memory 2302 used to buffer the video; an AD/DA (analog-to-digital/digital-to-analog) converter 2303 for digitizing a signal from the ITV camera 2110, and for converting a digital signal into an analog signal to be transferred to the work station; and furthermore a video/audio recording/reading unit 2304.

Figure 32:
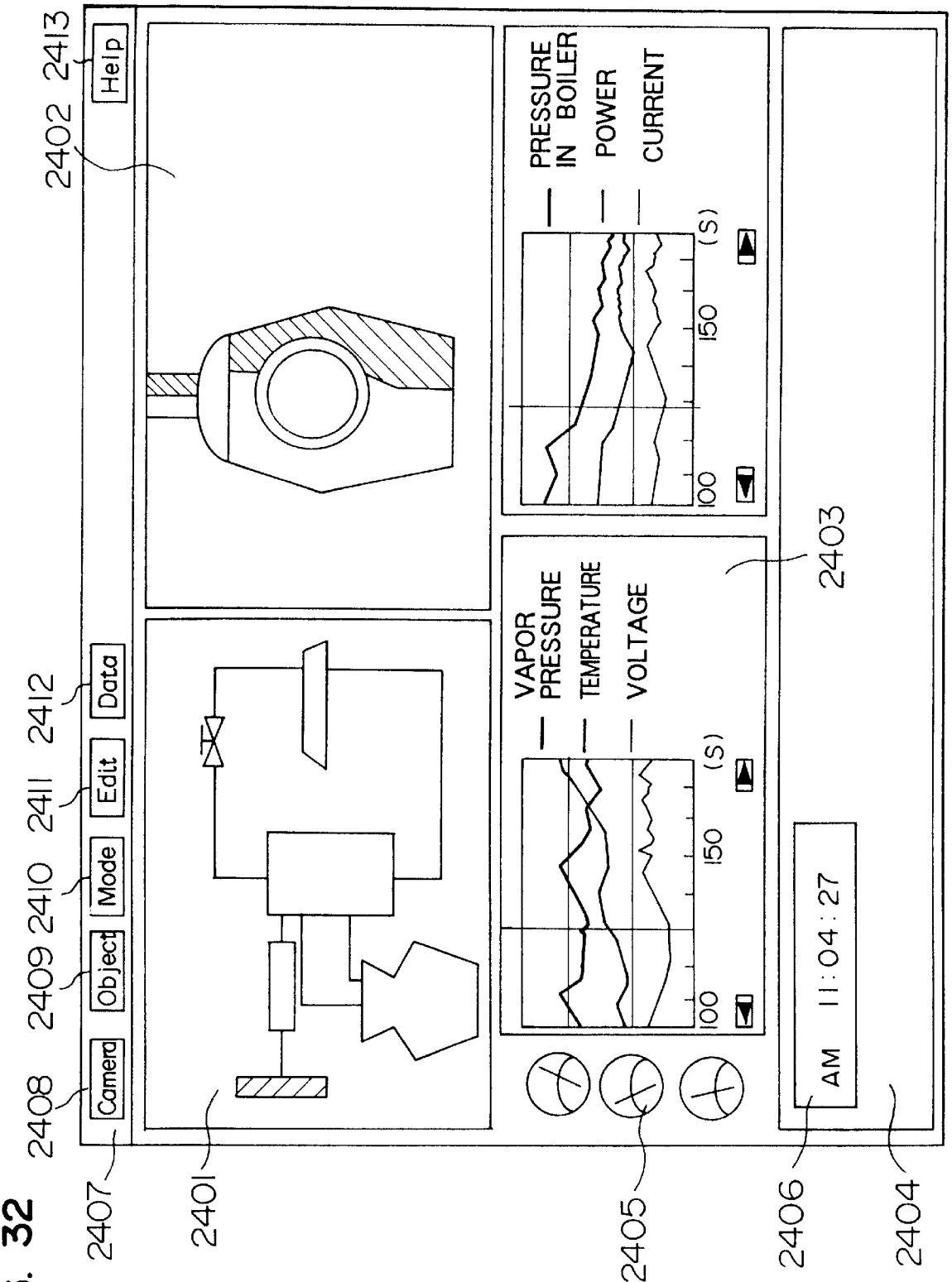
FIG. 32 is an explanatory diagram of one example of a display screen.

FIG. 32 represents a display screen in the process control monitoring system. The display screen is arranged by a process overall arrangement diagram 2401, a motion picture display region 2402 for mainly displaying video images from the ITV cameras, a trend graph 2403 for displaying the process data from the controlled apparatus 2101; a clock 2406; a task region 2404 for displaying switch, help information and the like; a process data displaying meter 2405; and also a menu region 2407. Within the menu region 2407, there are represented a camera changing button 2408; a button 2409 for designating an object to be selected within a video image and process data; a mode button 2410 for selecting a monitor mode and a reproduction mode, a standard reproduction and a slow reproduction; a selecting button 2411 for selecting a simple editor calling operation, and a graph to be displayed; Assuming now that the process data from the controlled apparatus 2101 is displayed in this menu region 2407, other data list and scalar may be displayed. Also, a plurality of data display means which has been explained above may be provided on the display.

Figure 33:
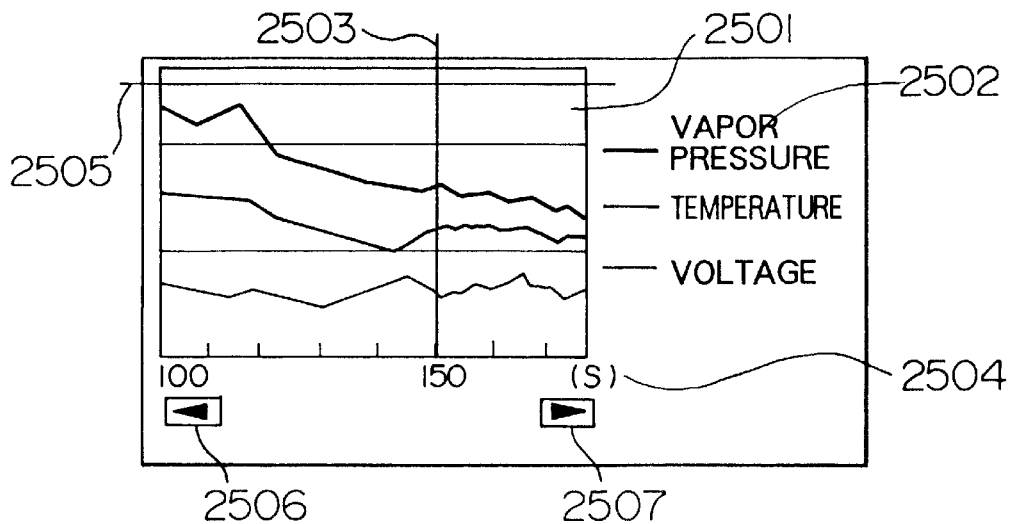
FIG. 33 is an explanatory diagram of one example of a trend graph represented on the display.

FIG. 33 shows more in detail the trend graph 2403 for showing the process data. The trend graph 2403 is constructed of a data display unit 2501, a data item display unit 2502, a time cursor 2503, a temporal axis 2504, a data value cursor 2505, and temporal axis moving buttons 2506 and 2507.

The process data is displayed as a graph on the data display unit 2501, and also a title thereof is displayed on the data item display unit 2502. A relationship between data and a title thereof is achieved by a width of a line, and color or sort of lines.

The time cursor 2503 represents by employing the temporal axis 2504, the recorded time instant, or generations of all data (for instance, a data value indicated by the meter 2405, a picture 2402, a time instant of the clock 2406, a point on the tie cursor 2503 of the trend graph 2403) being displayed on the present display. In other words, the time cursor 2503 of the trend graph 2403 corresponds to a time display unit for indicating the time instant recorded by the presently displayed data.

The temporal axis 2504 displays a value of a present time instant if a time instant when data to be displayed is produced is not present within the temporal axis 2504 under display, by moving the value of the time instant under display along a right direction (namely, a time returning direction, which will be referred to a "reverse direction"), or a left direction (namely, a time leading direction, which will be referred to a "positive direction"). The temporal axis 2504 may be expanded or reduced, and a section thereof may be expanded or reduced. As a result, a section of the temporal axis 2504 which is desired to be observed in detail is expanded, whereas another section thereof which is not desired to be observed in detail, is reduced.

The temporal axis moving button 2507 is to move a value of a time instant displayed on the temporal axis 2504 along the right direction, so that a time instant preceding the present time under display is represented. On the other hand, the button 2508 is to move the value of the time instant along the left direction so as to represent a time instant succeeding the present time under display.

The data value cursor 2505 is to search the process data. After the process data to be searched has been selected, when the data value cursor is brought to a search value, both of the temporal axis 2504 and the time instant cursor 2503 are moved, and then the time instant cursor 2503 approaches a time instant when the selected data indicates the search value.

In the following example, a trend graph is employed as the data display unit for displaying the process data on the display. Any other data display units than the trend graph may be employed.

There are the following functions in the process monitoring system according to the present embodiment:

(1). The operation for reproducing the recorded video images can not only reproduce the video images and the sound, but also can retrieve the process data at the time instant when this video image was taken and can display this process data.

(2). With employment of the time display unit such as the time instant cursor 2503 of the trend graph, the time instant is designated, whereby both of the video image and the sound at the time instant when this data was recorded, and also the process data at this time instant is retrieved to be displayed.

(3). The process data is searched by designating this process data and the search value thereof. This data is called out and displayed, and furthermore both of the video image at the time instant when this data was recorded and other process data at this time instant are called out to be represented.

(4). When the recorded video image is reproduced, the display frequency of the process data with respect to the time is varied by this reproducing speed.

(5). The display frequency related to the time instant of the process data is previously designated, so that the reproducing speeds for the video and the sound in conformity to this display frequency are determined when the video is reproduced, and then the video and the sound are reproduced and displayed.

(6). The operation information from the operator is recorded, and also the operation by the operator is also reproduced when the video image is reproduced.

(7). The operation information from the operator is recorded and the operation data of the operator is designated, whereby this operation is searched, and the video and the process data when the operation was performed are called out and displayed.

(8). In a video image, objects to be selected by the operator using the touch panel have been defined. When the video image is reproduced, the operator selects this object to display the related process data.

(9). In a video image, objects to be selected by the operator using the touch panel have been defined. When the operator selects one of the objects during the reproduction of the video image, the related process data is displayed in the emphasized mode.

(10). In a video image, objects to be selected by the operator using the touch panel have been defined. When the operator selects one of the objects when the picture is reproduced, whereby the selection menu concerning the related process data is displayed. When one item is selected from this menu, the process data of the selected item is displayed.

(11). In a video image, objects to be selected by the operator using the touch panel have been defined. When the operator selects one of the objects when the video image is reproduced, whereby the related process data is displayed on the selected object within the video image.

(12). In a video image, objects to be selected by the operator using the touch panel have been defined. When the operator selects one of the objects when the video image is reproduced, whereby the related process data is displayed by computer graphics and superimposed on the picture.

(13). In a video image, objects to be selected by the operator using the touch panel have been defined. When the operator selects one of the objects when the video image is reproduced, whereby another object to be selected within the related video image is displayed in the emphasized mode.

(14). In a video image, objects to be selected by the operator using the touch panel have been defined. When the operator selects one of the objects when the video image is reproduced, whereby the additional information of this selected object is displayed.

(15). In a video image, objects to be selected have been defined in a video image. When the operator selects one of the process data when the picture is reproduced, whereby the present picture is changed into the video image related to the selected process data and also objects to be selected within the video image is displayed.

(16). In a video image, objects to be selected have been defined in a video image. When the operator selects one of process data when the picture is reproduced, whereby the present video image is changed into the video image related to the selected process data and also the selected object within the picture is displayed, and further the data value thereof is superimposed on the selected object for display purpose.

(17). Object to be selected have been defined in a video image, whereby the present video image is changed into the video image related to the selected process data and also the selected object within the video image is displayed, and further the data value thereof is superimposed on the video image with using the computer graphics for display purpose.

The above-described functions will now be explained more in detail with respect to the productions of the recorded process data, picture data and audio data.

Referring now to FIGS. 29 to 39, the function 1 will be described. A recorded information standard reproducing mode is set by selecting the mode changing button 2410 with employment of the touch panel. While an optical disk is reproduced, a recording operation is carried out for another optical disk different from the former optical disk. As shown in FIG. 32, the video controller 2603 is displayed in the task region 2404. As shown in FIG. 35A, the video controller includes: a reproducing button 2705 with a double reproducing speed in a forward direction; a reproducing button 2704 with a standard reproducing speed in a forward direction; a reproducing button 2701 with a double reproducing speed in a reverse direction; a reproducing button 2702 with a standard reproducing speed in a reverse direction; and a picture stop button 2703. When a slow mode reproduction is selected by a mode selection button 2410, as shown in FIG. 35B, a reproducing button 2706 with a ½ double reproducing speed in a reverse direction; and a reproducing button 2707 with a ½ double reproducing speed in a forward direction are displayed instead of the reproducing button with a double reproducing speed in a reverse direction and the reproducing button with a double reproducing speed in a forward direction. It should be noted that a reproducing operation of picture and sound information at a standard speed implies that such a reproduction is carried out at the same speed as in a recording operation, and a forward direction corresponds to a direction of time elapse. Accordingly, for instance, a reproduction with a double reproducing speed in a reverse direction implies that a reproducing operation is carried out at a double recording speed in a direction reverse to the time elapse direction. In this example, although the reproducing mode is divided into the standard mode and the slow mode when the recorded information is reproduced, the present invention is not limited to these two modes.

When the reproducing button 2704 with the standard reproducing speed in the forward direction is depressed on the touch panel, both of the video data and the audio (sound) data are reproduced at the standard speed in the forward direction, and the reproduced video data is displayed on the video display unit 2402. At this time, the time cursor 2503 within the trend graph is moved in conformity with this picture, and the process data at the time instant when the displayed picture was recorded, appears on the time cursor 2503. When the time cursor 2503 comes to a certain place, the process data is called from the database 2104, and then the time instant value being displayed on the time axis 2504 is moved to the left direction (right direction), so that process data at a new time instant which is not present at the present time axis 2504 is displayed. When other pictures are imaged, data about values at these picture imaging operations are sequentially displayed on other process data display units such as the meter 2405. As previously explained, not only the video and audio information is reproduced, but also the process data acquired at the time instant when this video information is obtained are called from the database so as to be displayed by operating the above-described picture reproducing operation.

As a consequence, the process data acquired at the time instant when the picture is photographed can be observed while watching this picture. Also, since other reproducing buttons are used, the fast forward, reverse reproduction, slow reproduction and the like may be performed with respect to the video information, which is useful to discover/ analyze, extraordinary matters, by which an operation condition is diagnosed and also a control instruction for the operation condition is issued.

A method for realizing the present example will now be represented.

Figure 36A:
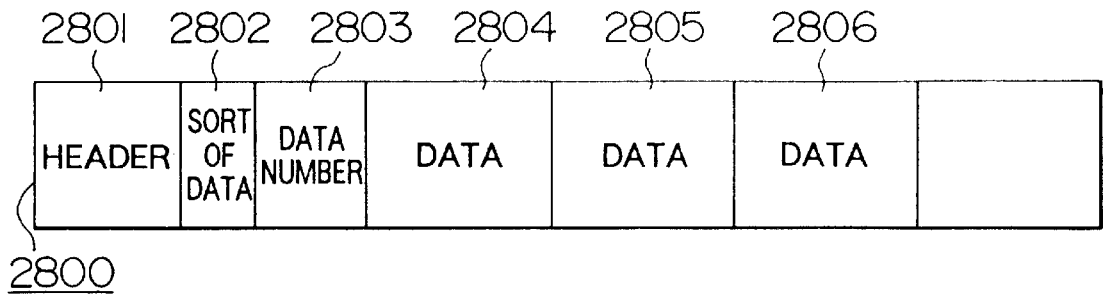

First, data structures and recording methods of video and audio (sound) data and also process data in this example. In FIG. 36A, data 2800 indicates a structure of process data which is transferred from the control apparatus 2101 to the controlling computer. In general, since a plural sort of data are inputted by way of a single cable, this structure is made of a header 2801 indicating a start of the process data; a sort of data 2802; the number of data 2803, and data from 2804 to 2806 corresponding to the process data. The controlling computer 2102 outputs a plurality of data with this format inputted from the respective cables into the LAN 2120. In the database 2104, the supplied process data are factorized, and recorded with such an arrangement having the structure of the data 2820 (FIG. 36B) together with a time instant "t" of a clock present in the database 2104. Here, reference numeral 2821 indicates a data index, reference numeral 2822 shows a title of data, reference numeral 2823 is a time instant, and reference numeral 2824 denotes process data. As described above, the database 2104 includes a table corresponding to a sort of process data, and the latest data is recorded together with the time instant "t" after the final element of the arrangement that is the element of this table.

Figure 36B:
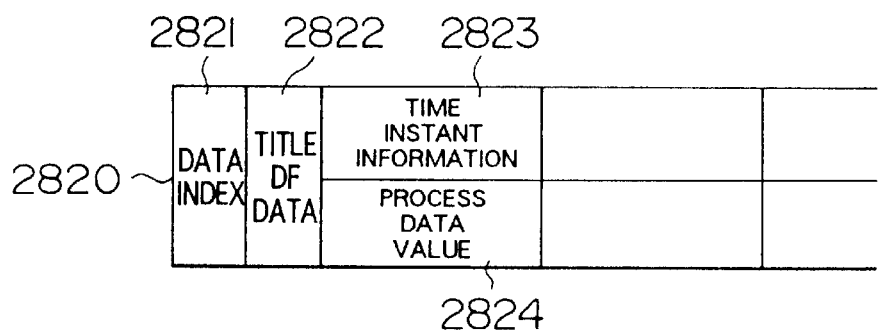
Figure 36C:
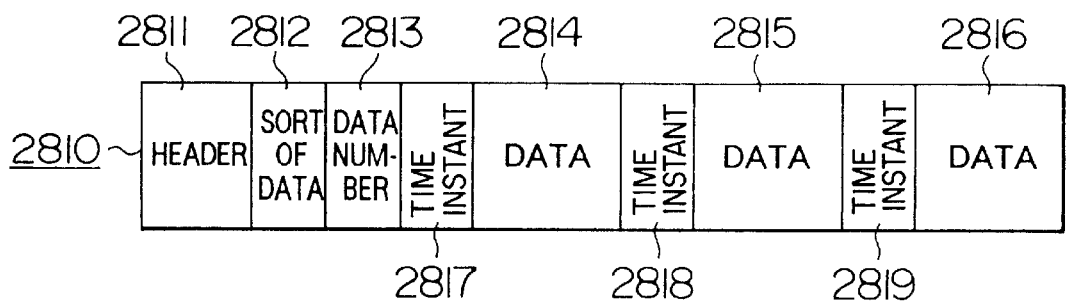

On the other hand, when an instruction to call a block of the process data is inputted from the work station 2103 to the database 2104, data having a structure as shown in data 2810 of FIG. 36C is transferred to 2103. This data 2810 is constructed of a header 2811 indicating a start of the process data, a sort of data 2812, a data number 2813, data 2814 to 2816 corresponding to the process data, time instant data 2817 of the data 2814 and time instant data 2819 of the data 2816. Depending upon the sorts of block calling instruction, data lengths and intervals of the time instant data may be, of course varied.

Subsequently, a recording operation of video and sound data will now be explained. First, as indicated in FIG. 36D, 2830 shows the structures for video/audio data to be recorded. Generally speaking, since video data derived from a plurality of cameras are recorded, the respective video/audio data owns an index 2831 (disk No.) and a title of data 2832 (camera No., or boiler No.). In this drawing, reference numeral 2834 indicates a time instant when a sound is recorded; reference numeral 2833 represents an audio (sound) information; reference numeral 2835 shows a time instant when video is recorded, and reference numeral 2836 denotes video information. It should be noted that the video information and the audio information are separately recorded as shown in this figure, but alternatively, both of the video information and the audio information may be recorded in combination therewith. In case of such a combination recording operation, the time instant information is commonly utilized.

Figure 37:
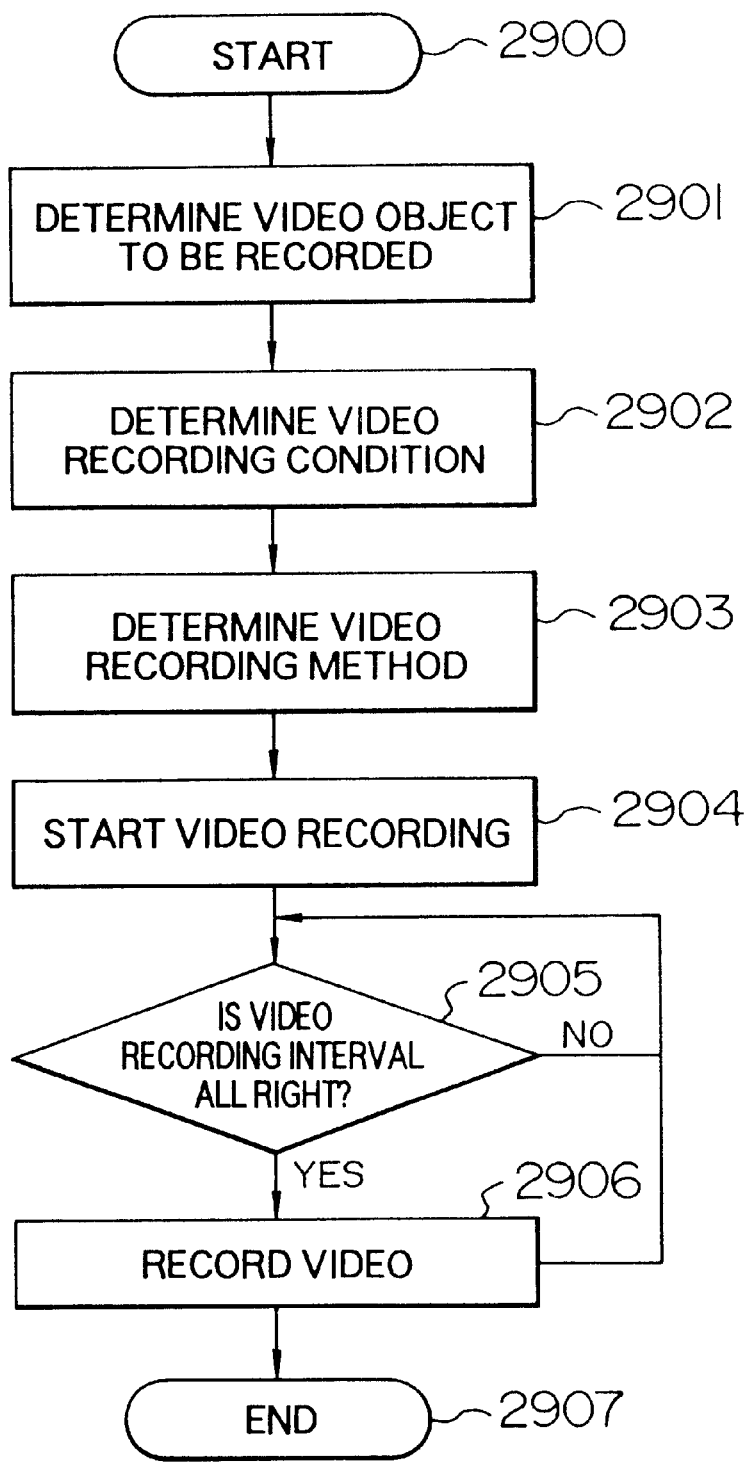
FIG. 37 is a flow chart for representing examples of operations to record the picture and sound on the picture/sound recording unit.

Referring now to FIG. 37, a description will be made of a method for recording the above-described video and audio data, and also a method for reproducing the video and audio data. In this embodiment, as to the video recording operation, a 3-staged sequence (steps) as indicated by 2901 to 2903 is performed in the CPU 2201 of the work station 2103. After this sequence has been executed, the recording operation is commenced at a step 2904. In the video recording operation, when the system is initiated, and when the reproduction mode is accomplished and then the operation mode is returned to the recording mode, all of video screens are first recorded. Subsequently, as shown in a step 2905, the video information is recorded at a step 2906 only when the recording condition is satisfied. With respect to the audio information, since a capacity required for recording the audio information is relatively smaller than a capacity required for recording the video information, the audio information is recorded at any time. Both of the recording/reproducing operations only for the video information will now be described.

At a step 2901 for determining a video object to be recorded, a determination is made which object is to be recorded. As a concrete method, any one of the following method is employed.

(1). All of camera picture screens are set to be recorded. As an implementation method, all of the video signals derived from the cameras are to be recorded.

(2). Regions containing a portion outputting process data, a moving portion, and a changing portion are previously designated. Only these regions are to be recorded. Data 2840 shown in FIG. 36E correspond to a data structure of the video data 2836 in this case. An element of the data 2840 is arranged by image data 2846 to be recorded, and positional information thereof, namely coordinate values 2841 and 2842 of this image data, sizes of image data (spatial dimension of a screen) 2843, 2844, and a time instant (or index) 2845 when the latest all screen data have been recorded. As an implementation method, when an ITV camera is zoomed, titled, and panned, all screens are recorded. After such a camera operation, when the camera operation is stopped, the video data 2836 is sent to the work station 2103, so that an image analysis is carried out and then a region containing an object to be recorded is defined. For the sake of simplicity, this region may be a rectangle, for example. Once this region is determined, positional information of this region such as a coordinate value and a size is sent to the video/audio recording unit 2108, and subsequently, only this region sent from the camera is picked up and recorded by the CPU 2301. During the reproducing operation, the video data at the time instant 2845 is called and then blended with the recorded data 2846 by the CPU 2301, so that all screens are produced.

At a step 2902 for determining a video recording condition, a condition for recording a picture is determined. As a concrete condition, any one of the following conditions is employed.

(1). A recording operation is performed at a predetermined time interval. This is performed that the CPU 2201 and 2301 within either the work station 2103, or the video/audio recording unit 2108 include clocks. In the former case, an instruction for recording video data for each constant time is sent to the video/audio recording unit 2108. In the latter case, only an instruction to commence a recording operation is transferred to the video/audio recording unit 2108. Thereafter the CPU 2301 manages the recording time.

(2). When the difference between the present video image and the last recorded video image from each camera becomes higher than a certain threshold value, the present picture is recorded. This is performed that the difference value between the video information of the screen which has been recorded in the main memory 2302 within the video/audio recording unit 2108 and the video information at the present time, is calculated in the CPU 2301, and the recording instruction is sent to the video/audio reading unit 2304 in response to this value.

(3). When each of the process data exceeds a constant value specific to this process data, video images related to the data are recorded. This is done that the process data entered into the work station 2103 is processed in the CPU 2201, and an instruction is issued to the video/audio recording unit 2108 in such a manner that a video image of a camera taking such an image related to extraordinary data is recorded.

(4). When the difference between the present value and the preceding value of each process data exceeds a constant value specific to this process data, video images related to this process data are recorded. This implementation method is similar to the item (3).

(5). When a weighted average of the respective process data exceeds a constant value, video images related to this data is recorded. In other words, assuming now that a weight is wi(wi$\geq$0) and the respective process data is di, the following value exceeds this constant value:

$$e = \Sigma wi * di$$

An implementation method is the same as the above item (3).

(6). A recording operation is carried out at a predetermined time interval, and another recording operation is performed at a shorter time interval when any one of the above-described conditions is satisfied, and then if the condition is not satisfied, this shorter time interval is returned to the original time interval.

The step 2903 for determining a video recording method define a recording method. As a concrete example, there is any one of the following concrete conditions:

(1). Video information derived from an ITV camera is directly recorded.

(2). The difference between a present screen and a previous screen is recorded. This implies that the difference between the present picture and the buffered picture is calculated by the CPU 2301 and the calculated difference is stored in the main storage unit 2302. During the reproducing operation, a video image of an object to be recorded is formed by adding/subtracting the differences between the all recorded objects from a certain time instant to the present time instant.

The video data at a time instant "t" which have been recorded in the above-described manner, is displayed with the sequential steps as indicated in FIG. 38. The step 3001 designates an index 2821 and a time instant "t" of video data. It should be noted that the designation of the video index is carried out by the work station 2103, whereas the designation of the time instant "t" is performed by either the work station 2103, or the CPU 2301 employed in the video/audio recording unit 2108. In case that the video at the time instant "t" is not recorded as represented in steps 3002 and 3003, the video/audio recording/reading unit 2304 reads out the video data which has been acquired at a time instant "s" which corresponds to the nearest time instant to the time instant "t". At the step 3004, if the video data corresponds to such data that the video information has been directly recorded, this video data is just used. On the other hand, if the difference has been recorded, the video information which is located very close to the time instant "t" and is not the different value is retrieved at a step 3005. Then, the retrieved video information is recorded in the main storage 2302 within the audio recording unit 2108. At a step 3006, a difference is calculated from the video information from this storage so as to produce an image. If the video image includes all portion of the corresponding camera images, this video image is displayed. If not, then after this video image is combined with a back scene, the combined video image is displayed.

When a reproduction instruction for designating a reproducing direction and a reproducing speed is sent from the work station 2103, the CPU 2301 within the video/audio recording unit 2108 sets forward display time data "t" owned therein in accordance with the following formula:

$$t = t + a*w$$

where symbol "w" indicates a video reading speed at the standard reproducing speed, and symbol "a" indicates a positive value when the reproducing direction is the forward direction, and a negative value when the reproducing direction is the reverse direction, and also such a coefficient that an absolute value is 2 in case of the double reproducing speed, and that an absolute value is 1 in case of the standard reproducing speed. As to the picture representation during the reproducing operation, in case of the reproduction in the forward direction, when this time data "t" exceeds the time data 2835, the video data 2836 is sent to the work station 2103. In case of the reproduction in the reverse direction, when this time data "t" becomes smaller than the time data subsequent to the time data 2835, the video data 2836 is transferred. When a demand to recognize a time instance when a picture under display is generated is issued from the work station 2103, this time instant "t" is transferred to the work station 2103.

Figure 34:
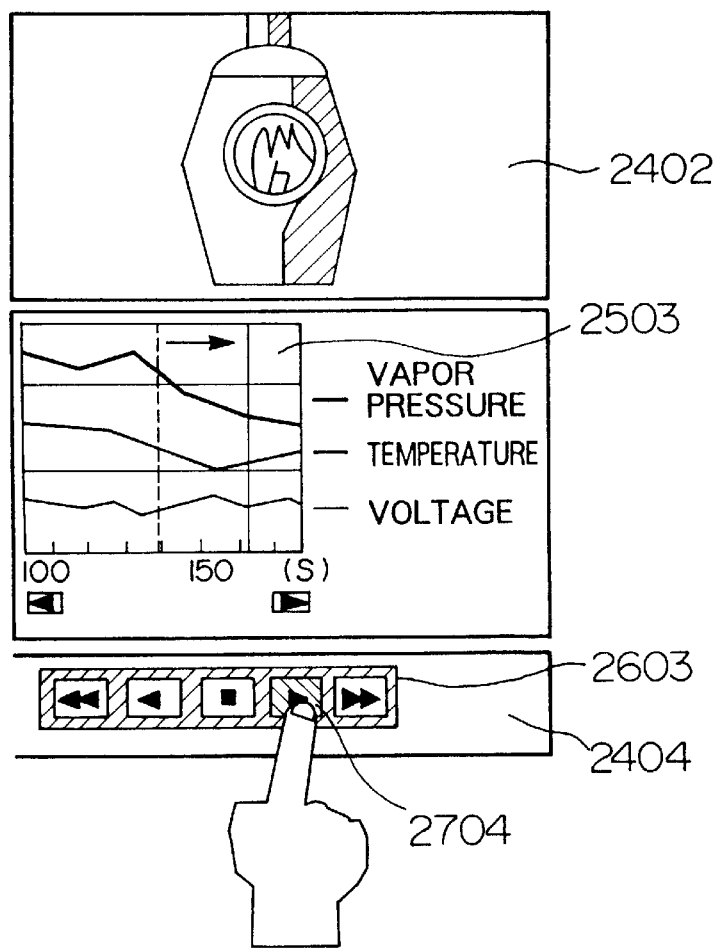
FIG. 34 is an explanatory diagram of a display representation according to a further embodiment of the present invention.
Figure 35A:
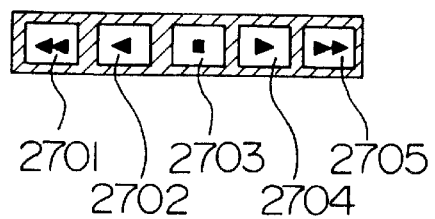
FIGS. 35A and 35B are explanatory diagrams of a video controller for determining the reproducing direction and speed of the picture and sound.
Figure 35B:
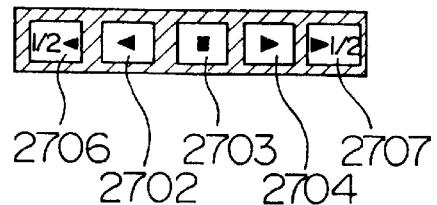
Figure 39:
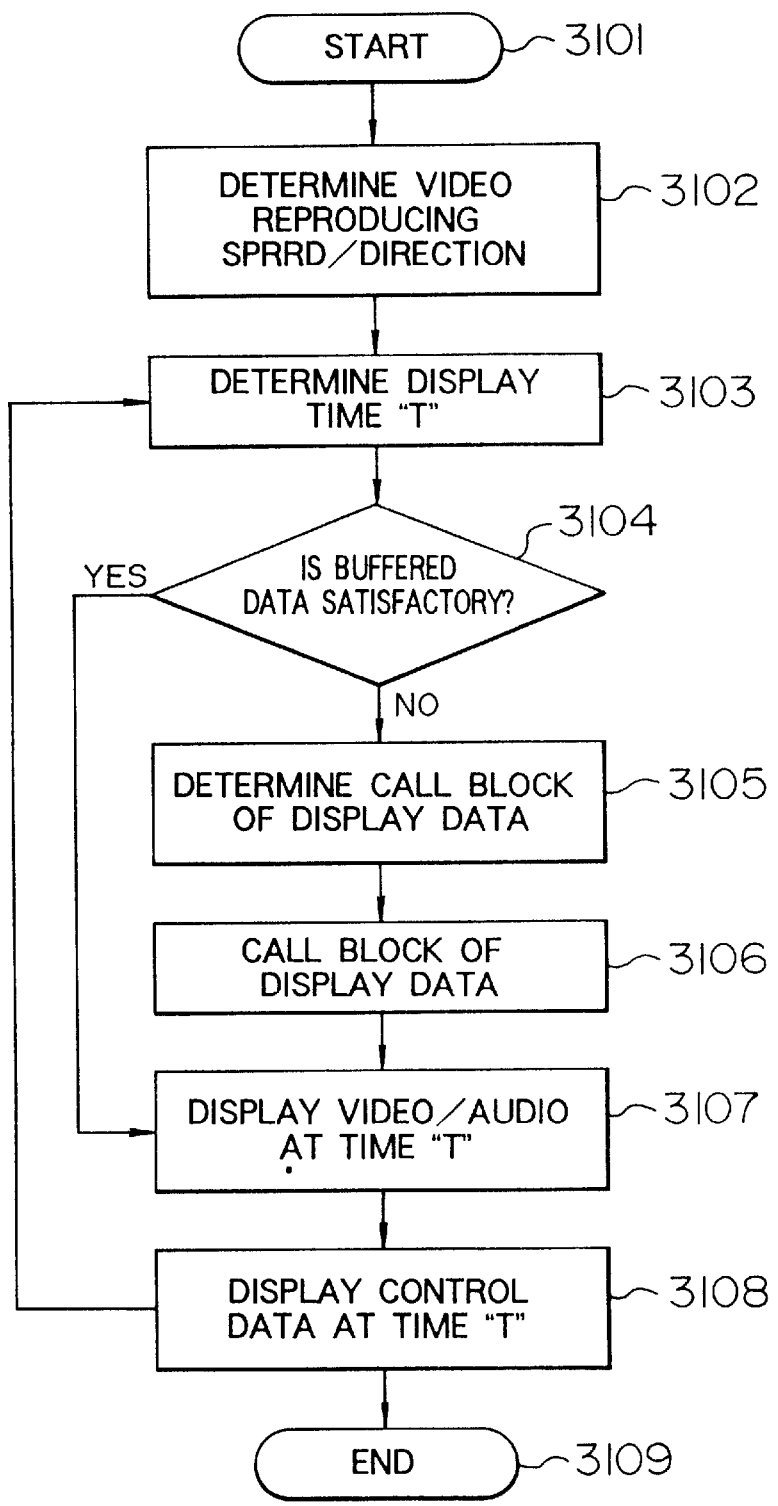
FIG. 39 is a flow chart for indicating an example of an operation to realize a further embodiment of the present invention.

Under the above-described recording/reproducing methods, FIG. 39 represents a process sequence for implementing the first function. At a step 3101, a reproduction mode is selected by a menu. At this time, the work station 2103 displays the control button indicated by reference numeral 2603 of FIG. 34. At a process step 3102, the work station 2103 detects a sort of button by processing an input signal from the pointing device such as the touch panel and by checking this input signal. At this time, in order to indicate that this button is depressed, as indicated in FIG. 34, the depressed button whose color has been changed is again displayed on the display, and also both of the reproducing direction and the speed are determined. At a process step 3103, a time instant "t" when the process data to be displayed at next time is produced is determined based on the determined reproducing speed and reproducing direction.

As a concrete example, there are two methods as follows:

(1). An interrogation is issued to the video/audio recording unit 2108 as to the time instant "t" when the video and audio data under display have been recorded.

(2). A time instance "t" indicated by the below-mentioned formula is used as a time instance to be represented at next time:

$$t = t + a*v;$$

where symbol "v" denotes a time period for rewriting all data being displayed one time, and symbol "a" indicates a positive value when the reproducing direction is the forward direction, and a negative value when the reproducing direction is the reverse direction, and also such a coefficient that an absolute value is 2 in case of the double reproducing speed, and that an absolute value is 1 in case of the standard reproducing speed. It should be understood that since the data rewriting time period is varied by other loads given to the computer, the method (1) is also combined. Since this method is employed, a time period of the next display information may be led by such a leading time period equal to a time period during which the video information and the audio information are displayed by the work station 2103.

At a process step 3104, a judgement is made as to whether or not the process data to be displayed at the time instant "t" are satisfied with the data buffered in the work station 2103, and if these process data are satisfied, then these process data are displayed. This satisfied case implies such a case that the process data at the time instant "t" have been buffered, or although there was no data at the time instant "t", the data before/after this data has been buffered. When only the data before/after this data has been buffered, the data very close to the time instant "t" is used to substitute the process data, or data is newly produced by linearly interpolating the data before/after this data. If the data is not satisfied, at a process step 3105, the work station 2103 determines a range for reading data as the display data from the database 2104 based upon the display speed and the display direction. At a process step 3106, both of a sort of process data to be displayed and a range of data to be read are sent via a LAN to the database 2104, and the process data requested from the database 2104 is transferred to the work station 2103. At a process step 3107, the video and audio information is displayed or outputted, and at a process step 3108, at the work station 2103, the respective sent process data is displayed together with the video information and the audio information in a form of a trend graph, or a meter under display manners of the process data stored in the main storage 2202.

Figure 40:
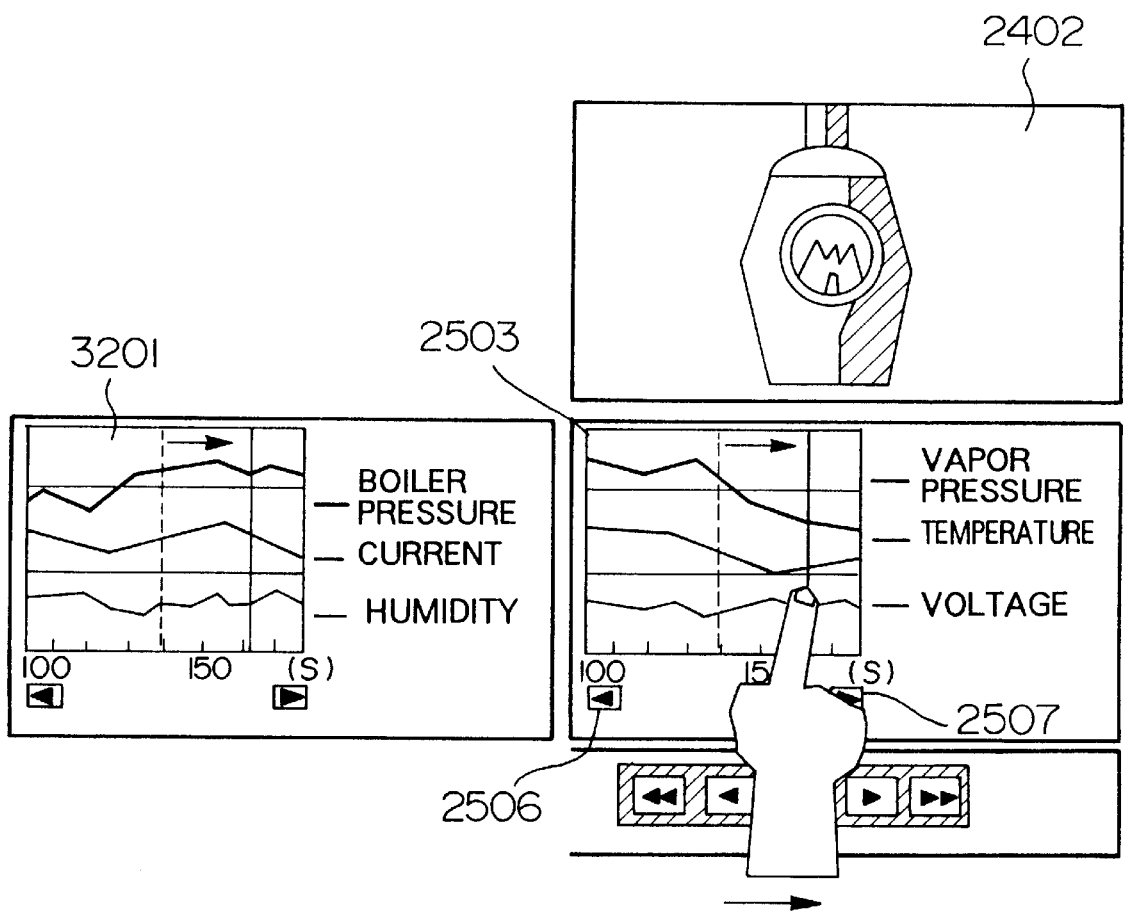
FIG. 40 is an explanatory diagram for showing a display representation according to another embodiment of the present invention.

Referring now to FIG. 29 to 34 and FIG. 40, a second function will be described. The time cursor 2503 is movable in right/left directions by moving a finger in the right/left directions while depressing the cursor 2503 by the finger with employment of the touch panel 2107. At this time, as shown in FIG. 40, the time cursor 2503 in the trend graph 2403 is directly moved at time when an operator wish to refer, so that a time cursor 3201 within another trend graph 2403 is moved to a time instant indicated by the time cursor 2503, and a picture at a time instance determined by the time cursor 2503 is called and then displayed in the video display region 2402. At this time, the meter 2405 and the like in FIG. 30 represent data about the time instant indicated by the time cursor 2503. A designation of a time instant which is not presently indicated on the time axis of the trend graph 2403 may be done by employing the time axis moving buttons 2506 and 2507. As previously described, by designating the place to which the process data under representation is wanted to be referred, both of the picture at the time instant when this process data is recorded and other process data at this time instant may be referred. As a consequence, an operator directly designates the time instant when the process data is wended to be referred, while observing the trend graph 2403, so that the picture can be displayed.

As a consequence, the concrete conditions of the field may be referred by referring the process data.

Figure 41:
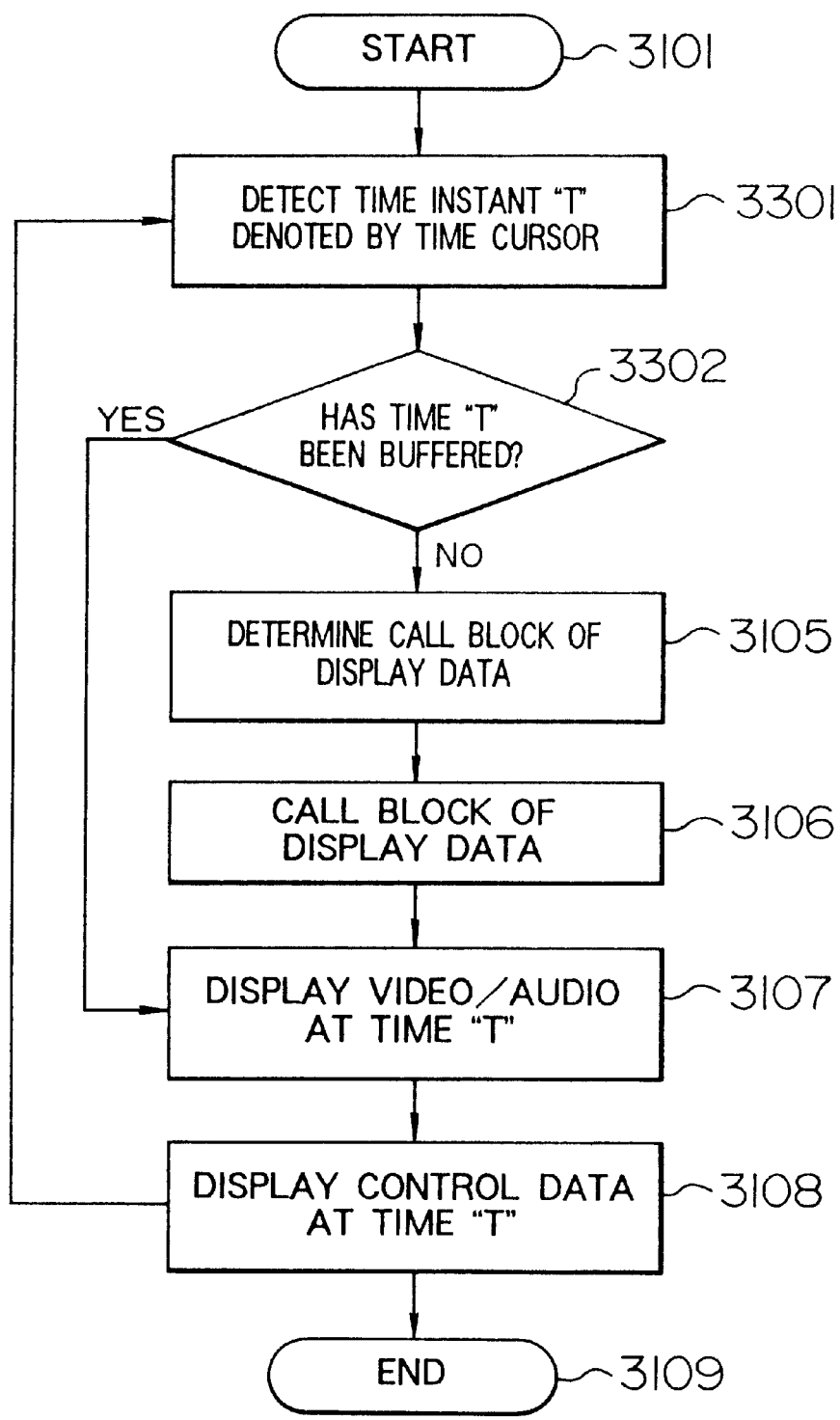
FIG. 41 is a flow chart for showing an example of an operation to realize another embodiment of the present invention.

A reading method of this example will now be described with reference to FIG. 41. An algorithm shown in FIG. 41 has such different points, as compared with the algorithm of FIG. 39, that a time instant "t" denoted by the time cursor is detected at a process 3301, and also a judgement of a process 3302 is made as to whether or not the time instant "t" has been previously buffered within the work station 2103. At the process 3301, the coordinate value of the input signal by the pointing device such as the touch panel and the like is processed by the CPU 2201 in the work station 2103, the time cursor 2503 is again drawn on this coordinate system and also the time instant denoted by the time cursor 2503 is calculated from the coordinate value. If the data at the time instant "t" is not buffered within the work station 2103, the sequential steps 3105 and 3106 defined in the preferred embodiment 1 are carried out, and then the data, video and sound are displayed at the sequential steps 3106 and 3107.

Figure 42:
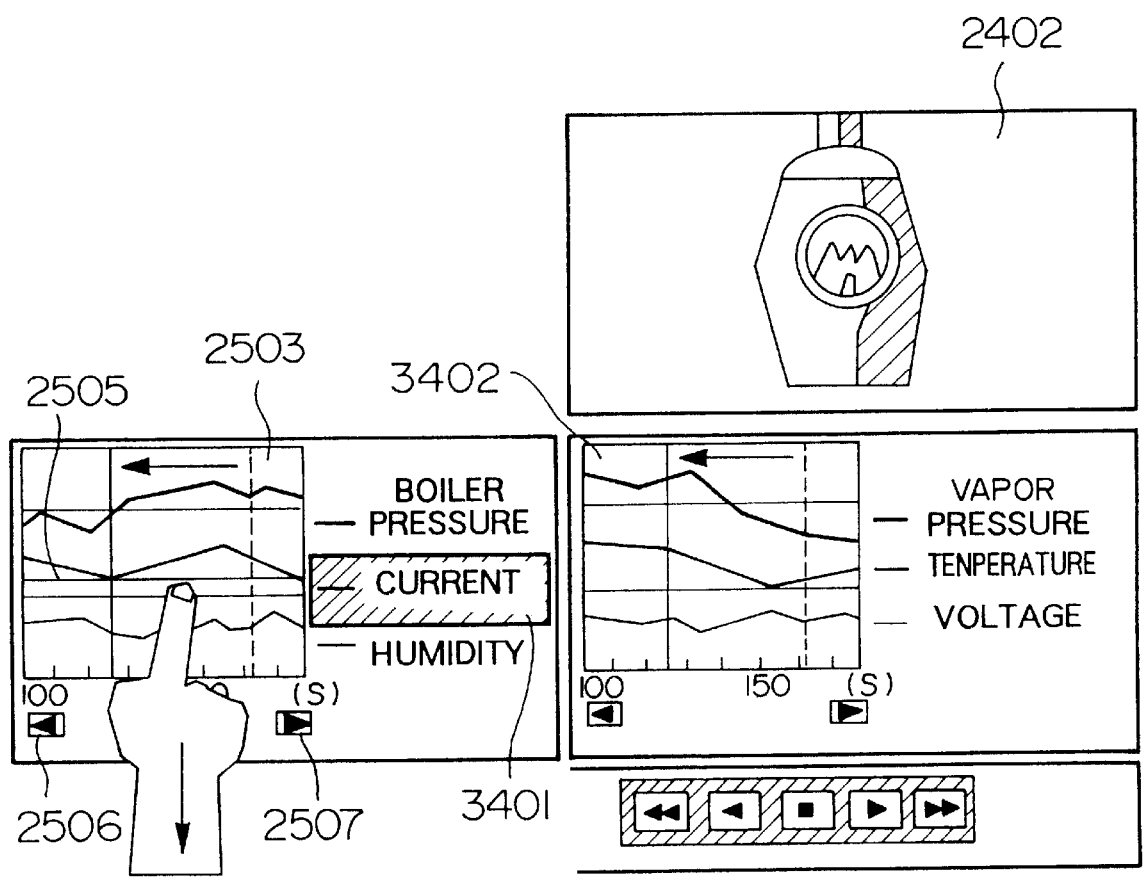
FIG. 42 is an explanatory diagram for indicating a display representation according to another embodiment of the present invention.

A third function will now be described. As represented in FIG. 42, after a data item 3401 in a data item display unit within a trend graph 2403 has been selected by employing the touch panel 2107, a data value cursor 2505 is brought to a value to be searched, whereby a search value is determined. At this time, when the selected data has a value indicated by the data value cursor 2505, the time cursor 2503 is moved, and the time cursor 3402 is moved at this time in another trend graph 2403, so that a picture at this time is displayed on the video display unit 2402. Also at this time, data about the time instance denoted by the time cursor 2503 is represented on the meter 2405 shown in FIG. 32. Here, the search operation is carried out only once in a reverse direction with respect to the time axis. Furthermore, if another search operation is wanted, the search operation is performed in the reverse direction by depressing the time axis moving button 2506. On the other hand, when the search operation is performed along a forward direction, the search operation is carried out by depressing a button 2507 along the forward direction. As previously stated, with respect to the process data under representation, when a value is searched, a search result is displayed, and both of the picture at the time instant when this displayed data has been recorded, and the other process data at this time instant can be referred.

A realizing method of this example will now be described. At a process 3501, a coordinate value of an input signal by a pointing device such as the touch panel 2107 and the like is processed by the work station 2103, and a search value indicated by a data value cursor 2505 selected to be a searching object in a data item display unit 2502 is determined. Next, at a process 3502, a search direction, namely a forward direction search or a reverse direction search is determined with respect to the time axis. It is assumed, for instance, that basically, the reverse direction search is carried out one, and furthermore when a forward direction button 2507 of a time axis moving button is depressed, the search operation is performed in the forward direction, and also when a reverse direction button 2506 of the time axis moving button is depressed, the search operation is performed in the reverse direction. A judgement whether or not this button is depressed is executed by the work station 2103. At a process 3503, a search instruction containing a search object, a search value, a data forming time instant under representation, a search direction and the like is issued to the database 104, and both of a search value which is discovered at a first time and a display time are determined at a step 3504. Since the subsequent steps 3104 to 3109 of the example 1, explanations thereof are omitted.

In accordance with this function, the comparison and analysis can be done with employment of other process data value and the video information, and the extraordinary value which very rarely happens to occur can be called under such a condition that certain process data takes a constant value.

Figure 44:
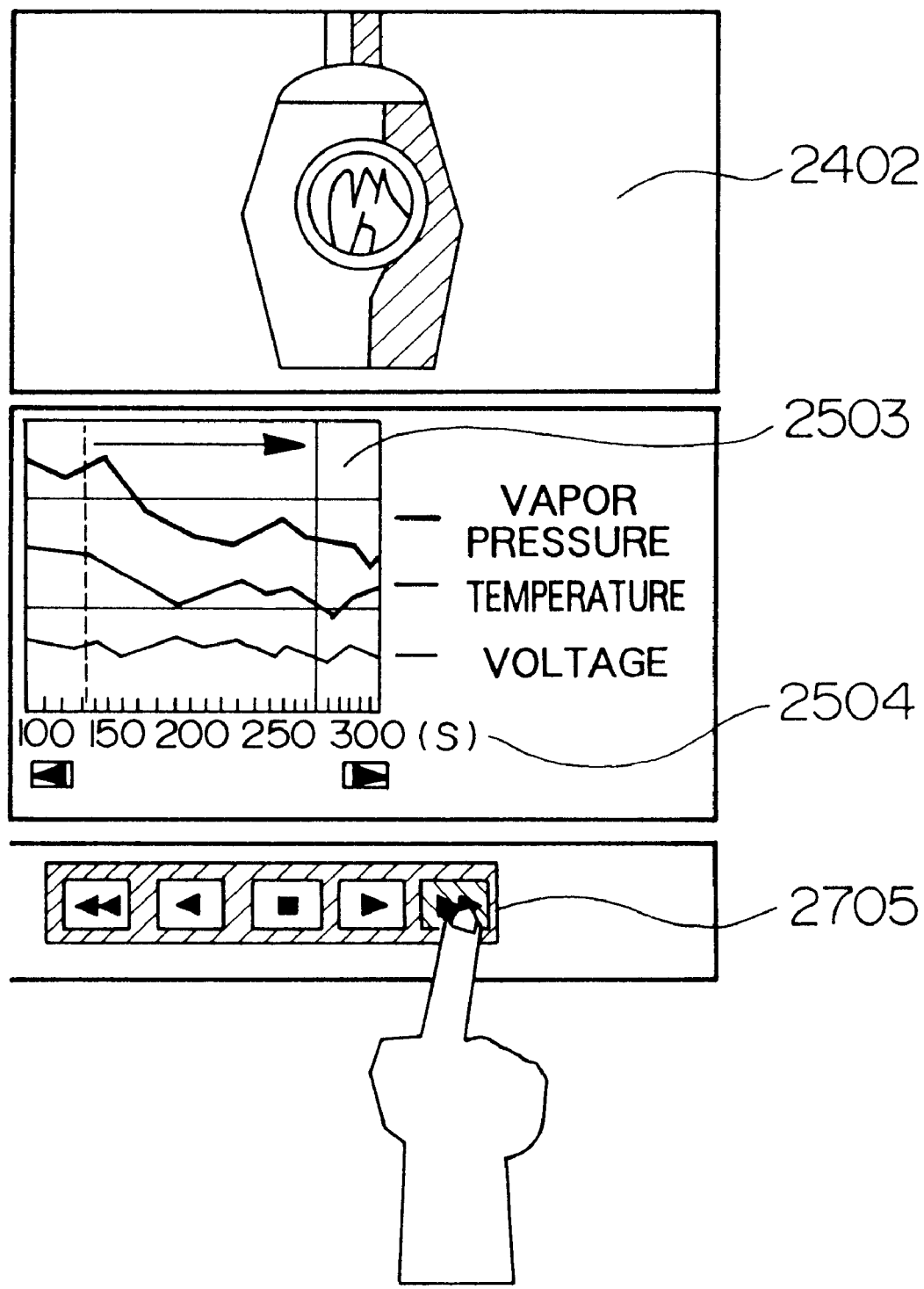
FIG. 44 is an explanatory diagram of a display representation in accordance with another embodiment of the present invention.

An example for the fourth function will now be described with reference to FIGS. 44, 45 and 46. In FIG. 44, in case that the button 2705 with the double reproducing speed in the forward direction is selected when the video information is reproduced, a time axis 2504 within a trend graph 2403 represents time in a twice range, process data presently displayed is adjusted with a new time axis to be redisplayed, and also data which has not been displayed is read out from the database, and then is adjusted with the time axis to be displayed. Next, a picture is displayed on the video display unit 2402 at a speed two times higher than the standard speed, so that the time cursor 2503 is moved. As described above, during the double speed reproduction, data about longer time can be displayed within the trend graph 2403 and then the temporal variations in the data caused by time may be observed. Such a representation is useful for data search operation.

Figure 45:
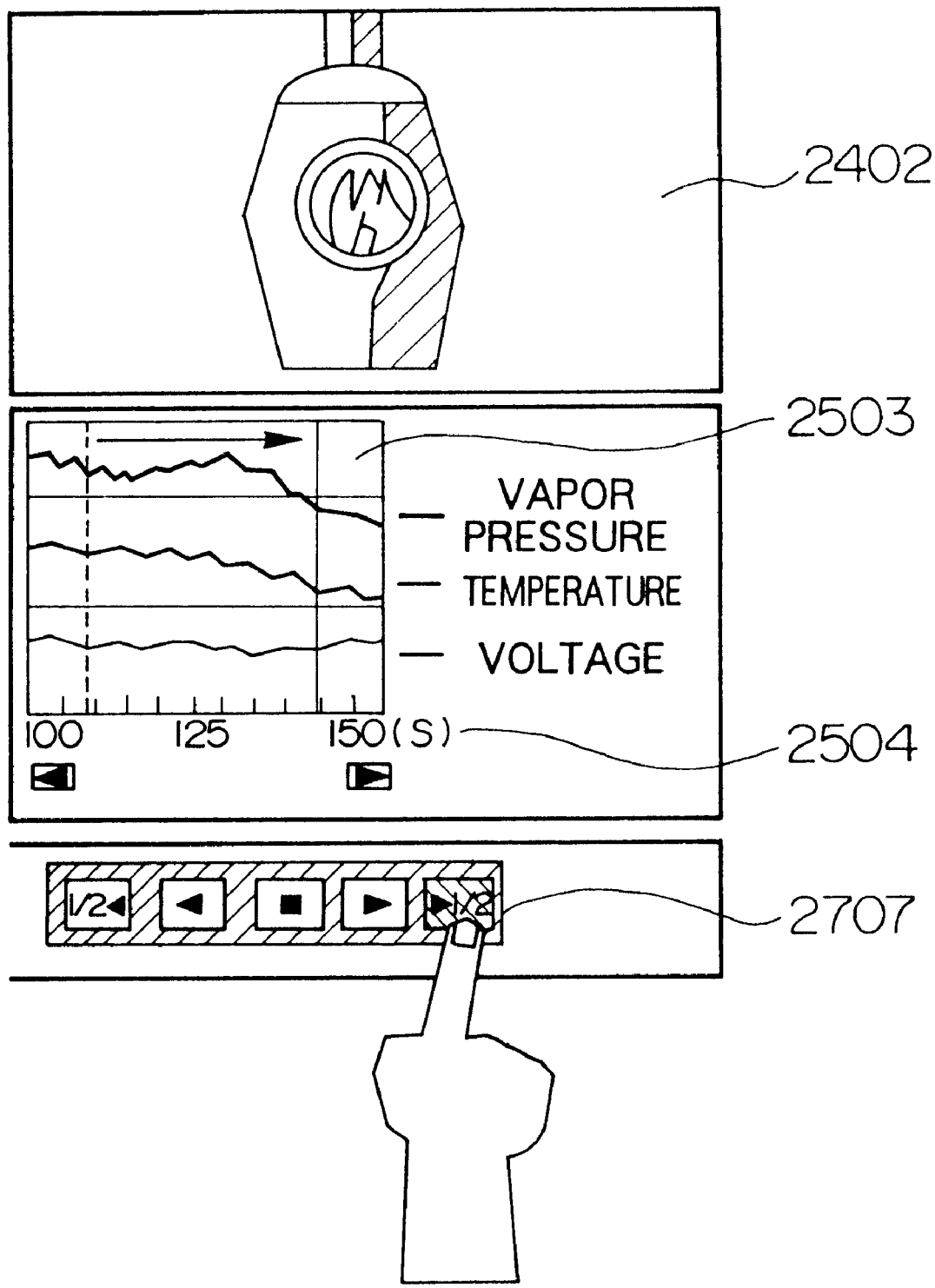
FIG. 45 is an explanatory diagram of a display representation according to another embodiment of the present invention.
Figure 46:
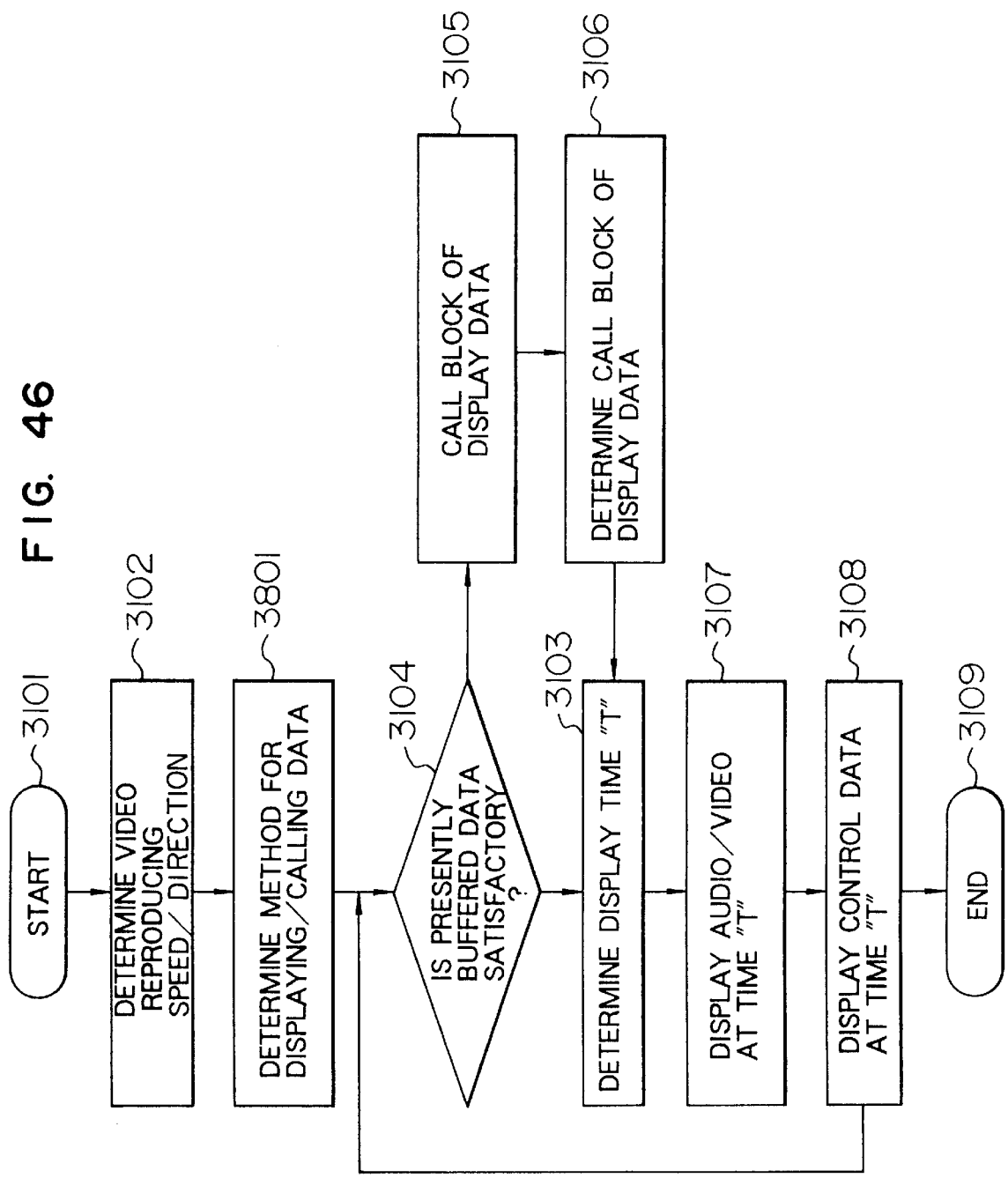
FIG. 46 is a flow chart for representing an operation example to realize another embodiment of the present invention.

On the other hand, in FIG. 45, when the button 2707 with the ½ reproducing speed is selected, the time axis 2504 indicates time of a ½ range smaller than that of the standard speed. At this time, since more precise data can be displayed, the data which has not been displayed during the standard speed is redisplayed together with the data which has been previously read out from the database and is present. That is to say, when the picture is reproduced, the method for calling the process data and the method for displaying the process data are changed, depending upon the reproducing speeds. As a consequence, when the reproducing speed is increased, since the data with lengthy time can be displayed on the trend graph 2403, the data search and observation can be readily performed. If the reproducing speed is increased while calling the process data, the time intervals between the data generation time become long. However, the rough calling caused by this representation is not emphasized. On the other hand, when the reproducing speed is delayed, the data may be displayed more in detail. Accordingly, when a detailed analysis is required, the process data can be displayed more in detail by merely reproducing the picture at the slow reproducing speed.

As a result, since a display degree of the process data with respect to the time is varied in accordance with the reproducing speed, the load given to the computer may be suppressed to some extent.

A realizing method of this example will now be described with reference to FIG. 46. At a step 3102, a reproducing direction and a reproducing speed for video information and audio information are determined by receiving an input from an operator. At a step 3801, based upon the determined speed, a display method and a calling method of process data are determined in the work station 2103. As the display method, a display unit for a time axis in the trend graph 2403 is determined, namely how long a time interval is determined. As the calling method, both of a time interval among data in a called block, and a time length in a block which is called one time are determined. When the data buffered in the step 3104 is not sufficient, the time interval and the time length which have been determined at the step 3105 are coded and then are transferred to the database. In the database, based upon the codes sent at the step 3105, the block data about the time interval and the time interval are read out from the database and then are transferred to the work station 2103. Subsequently, the data representation is carries out based upon the predetermined display method in the work station. Since this part is the same as the steps 3104 to 3109 of the above-described embodiment, an explanation thereof is omitted.

Figure 47:
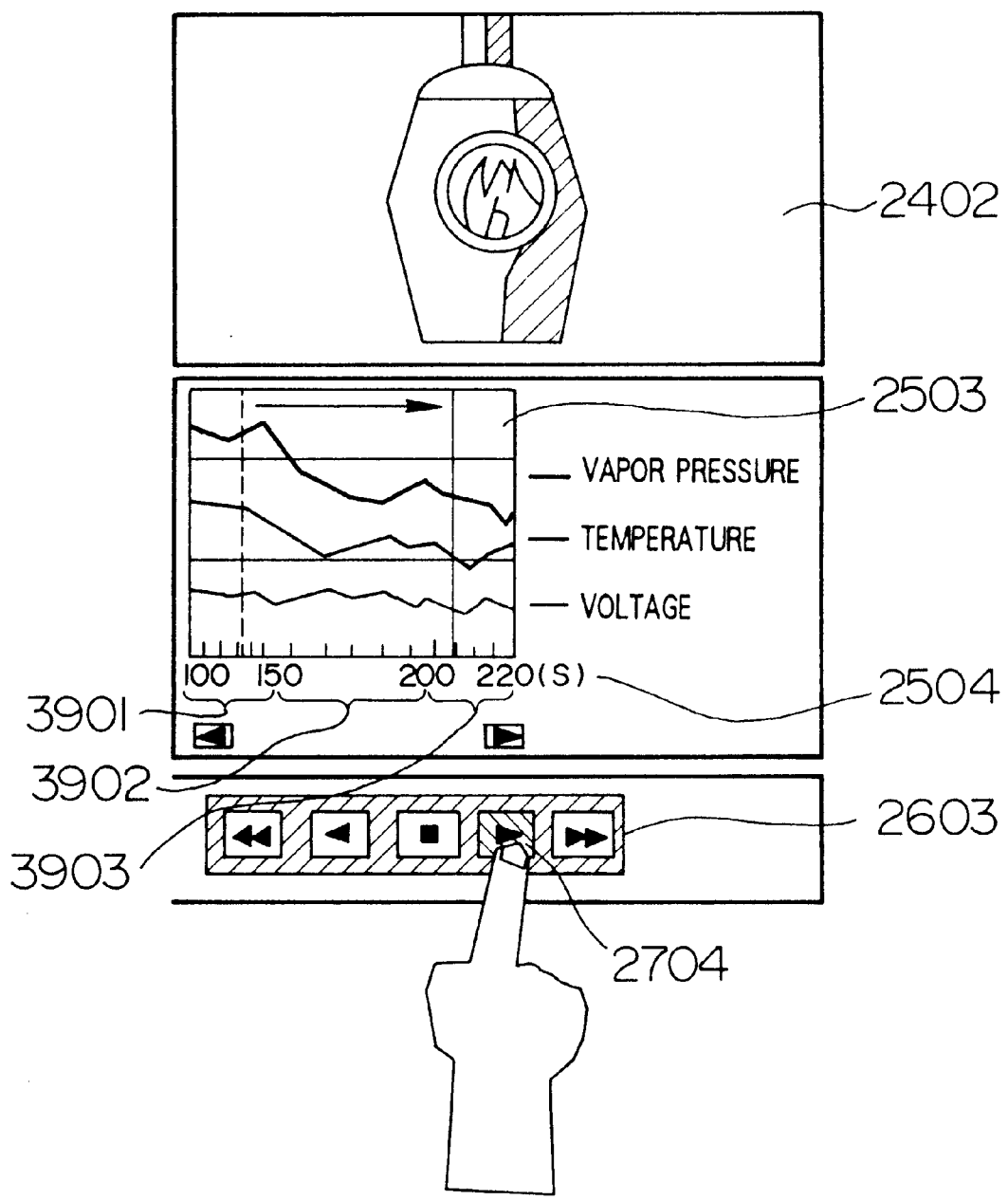
FIG. 47 is an explanatory diagram of a display representation in accordance with another embodiment of the present invention.

A fifth function will now be described. In FIG. 47, as a method for displaying process data, the time axis 2504 is reduced by ½ in a section 3901 of the time axis of the trend graph 2403, the time axis is remained in a section 3902 thereof, and the time axis is enlarged twice in a section 3903 thereof. At this time, the time interval of the generation time of the process data to be displayed in the section 3901 becomes two times longer than that of the section 39022, whereas the time interval of the generation time thereof in the section 3903 becomes ½ time interval of the section 3902. As a consequence, the same display as in the double reproducing speed of the previous embodiment is made in the section 3901, the same display as in the standard reproducing speed is made in the section 3902, and the same display as in the ½ reproducing speed is made in the section 3903. In this case, when the reproduction at the standard speed along the forward direction is performed by the video controller 2603 with using the button 2704, the picture is displayed in the video display region 2402 at the double reproducing speed in case that the time cursor 2503 is located at the section 3901. Also, when the time cursor 2503 is positioned at the section 3902, the picture is displayed at the standard reproducing speed; and when the time cursor 2503 is positioned at the section 3903, the picture is displayed at the ½ reproducing speed. In other words, since the method for displaying the process data is previously set, the reproducing speed of the picture is set in conformity with this display method and then the picture is reproduced at this set speed during the reproduction operation.

As a consequence, not only the method for displaying the data can be designated by the operator, but also the picture can be reproduced at a slow speed when the operator wants to observe the data in detail, and also at a quick speed when the operator wishes to skip the data.

Figure 48:
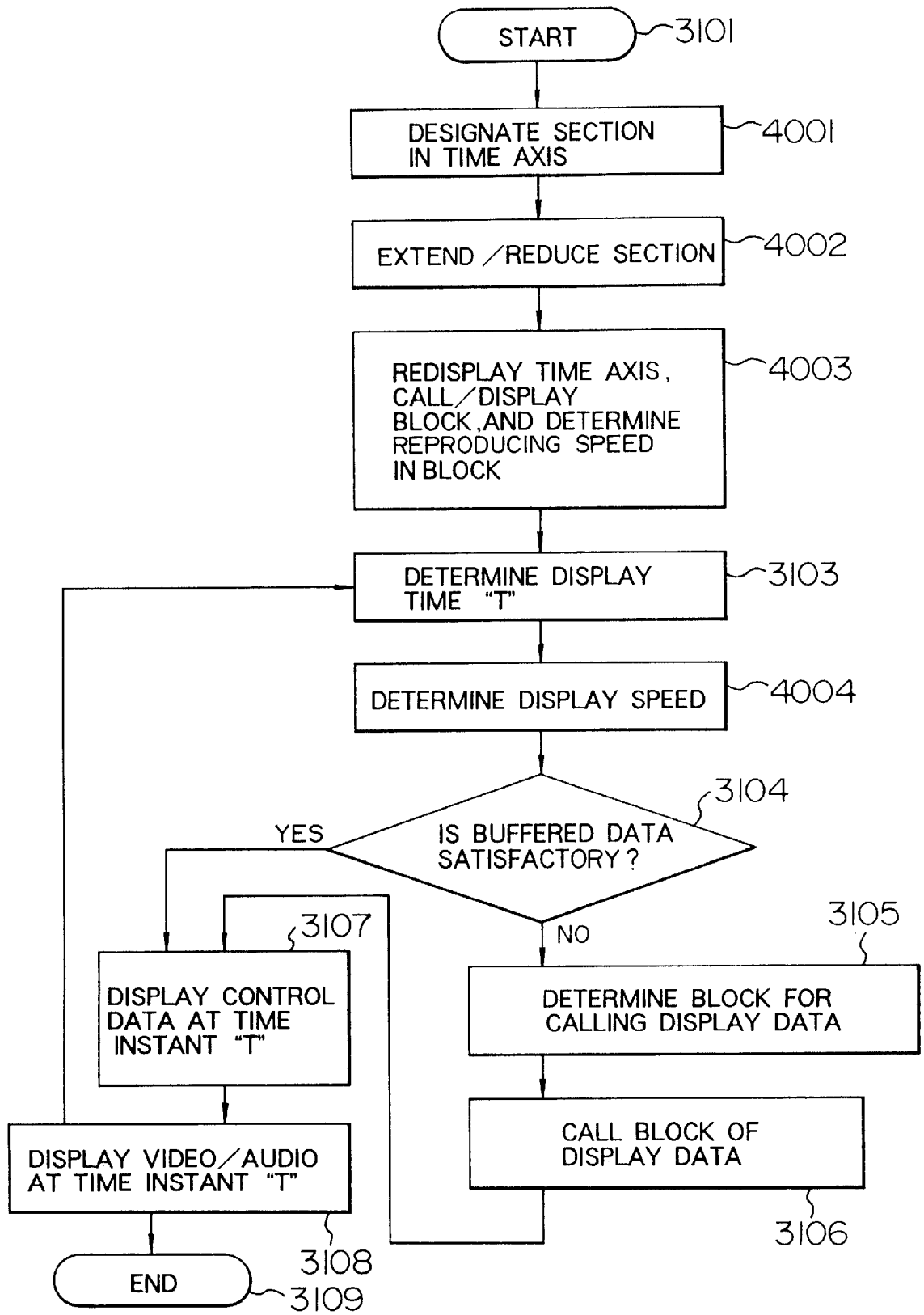
FIG. 48 is a flow chart for showing an operation example to realize another embodiment of the present invention.

As to a realizing method of this example, a description will now be made with reference to FIG. 48. At a step 4001, in response to an input by an operator, sections of time axes to be reduced and enlarged are designated. At a step 4002, the operator selects one of reduction and enlargement with respect to this section. These designation and selection may be performed by using, for instance, a menu. Also, as similar to this example, after the section is designated by way of the touch panel, end points of this section are grasped to reduce and enlarge this section. At this time, the time axis is again displayed at the step 4003 and also the process data is again displayed. At this time, the work station determined the reproducing speeds of the respective sections and the determined reproducing speeds are stored in the main storage 2202. Subsequently, the reproduction is commenced, and the display time "t" is determined at a step 3103. After a section containing this display time "t" has been decided, if the decided section does not correspond to the previous section, a reproducing instruction such as a reproducing speed and a reproducing direction is sent to the video/audio recording unit 2108 at a step 4004. A subsequent step of this method is similar to the steps 3104 to 3109 of the previous embodiment.

Figure 49:
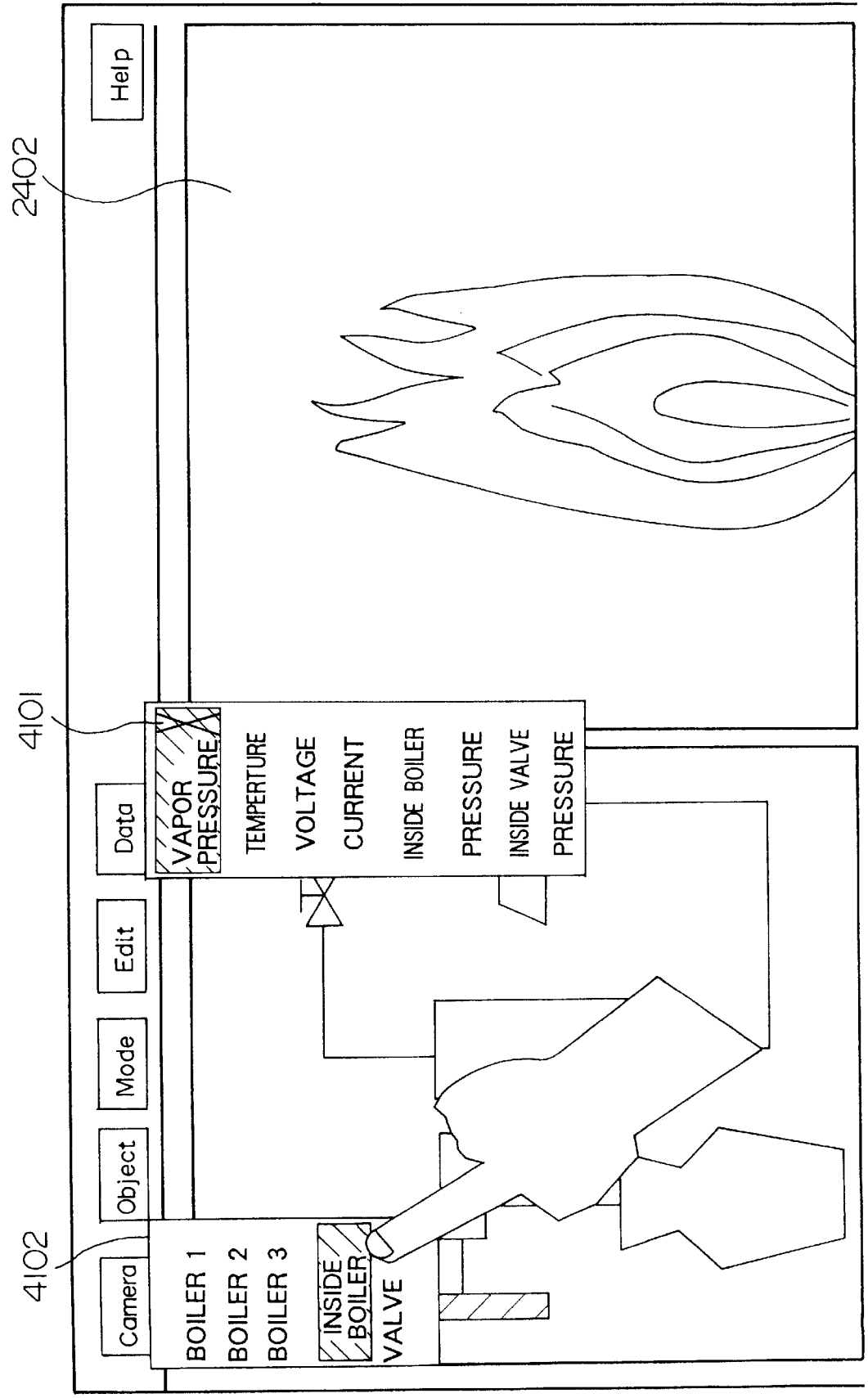
FIG. 49 is an explanatory diagram of a display representation in accordance with another embodiment of the present invention.

A sixth function will now be described. In FIG. 49, when video information is reproduced, not only process data, but also operation information instructed by an operator are reproduced in combination thereto. At this time, both of the picture and the process data which have been displayed on the display at this time, are represented, and furthermore an input from the operator indicated by a mouse cursor 4101 is reproduced and represented. At this time, as shown by 4102, a picture displayed in the picture display region 2402 is newly selected, so that video information which happens to occur in response to the operation of the operator and could not be seen when the recording operation was performed, can be referred. Also, the process data and the like which were not displayed may be represented by way of the similar operation. As a result, for example, an extraordinary matter which happens to occur due to misoperation by an operator can be quickly found out. This may give a great advantage in an education of control operation.

It can be recognized whether or not the variations in the process operation conditions are caused by the operation instruction of the operator by reproducing the operation information of the operator. Also, such an operation instruction is recorded and reproduced, this operation instruction may be used to explain the operation sequence, and to monitor the educational system and also the operation conditions of the operator.

A seventh function is such that operation information to be searched by an operator is inputted, the inputted operation information is searched, and operation information, video information, audio information and also process data at this time are called out and displayed. As a result, a search for information can be done in such a way that the operation carried out by the operator is set to a target.

Therefore, since the operation instruction by the operator can be searched, the variations in the process data and in the picture, which are caused by the operation of the operator, can be searched.

A realizing method for the above-explained two examples will now be described. In FIG. 36F, the data 2850 indicates screen information recorded in the database 2104. The screen information 2850 is arranged by a time instant 2851, a title of a camera 2852 for imaging a picture to be displayed on the moving picture display region 2202; titles of process data 2853 to 2855 displayed in a trend graph 2403, and titles of data being displayed in a meter 2405 and other data display units. This data is transferred from the work station 2103 to the database 2104 when the operator selects the pictures to be displayed in the moving picture display region 2402, changes, adds, or deletes the data to be displayed in the trend graph 2403.

A data structure of operation data inputted by an operator is identical to the data structure 2820 of the process data of FIG. 36B. It should be noted that instead of the process data value 2824, the operation instruction inputted as the operation data (namely, an instruction produced by processing a coordinate value inputted by the operator with employment of a pointing device in the work station 2103) is entered. This data is also sent from the work station 2103 to the database 2104 at a time instant when the operation instruction is issued.

As to the reproduction, a reproduction algorithm is the same as the algorithm indicated by FIG. 39. It should be noted that although the process data has been produced at the step 3108 by selecting the data very close to the display time "t", or interpolating the preceding data and the succeeding data, the execution of the operator operation data is effected when the display time "t" exceeds the recording time of the operation data during the forward reproducing direction, and when the display time "t" is less than the recording time of the operation data during the reverse reproducing direction. The contents of the screen information data recorded at the time instant 2851 is represented when the display time "t" exceeds the time instant 2851 during the forward reproducing direction, or when the display time "t" is less than the time instant 2857 during the reverse reproducing direction.

Figure 43:
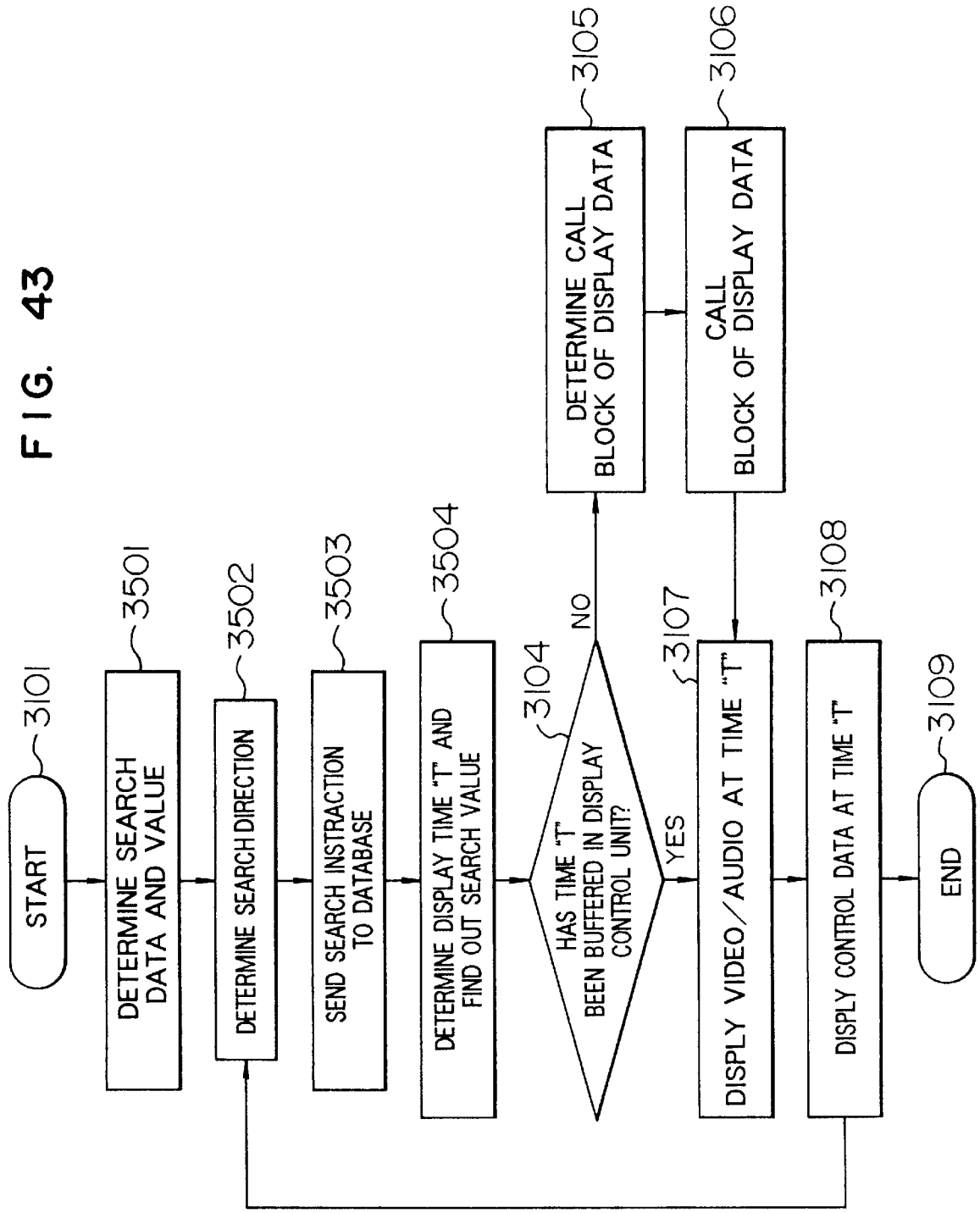
FIG. 43 is a flow chart for showing an example of an operation to realize another embodiment of the present invention.

As to the search operation, a search algorithm is the same as the algorithm shown in FIG. 43. It should be noted that after the display time "t" has been determined at the step 3504, the screen information data very close to a time instant before the display time "t" is first called out at a step 3506, and thereafter process data to be displayed s determined and then is called out.

The following examples describe relating representations of video and process data when video, audio and process data are reproduced in all of the above-described embodiments.

Figure 50:
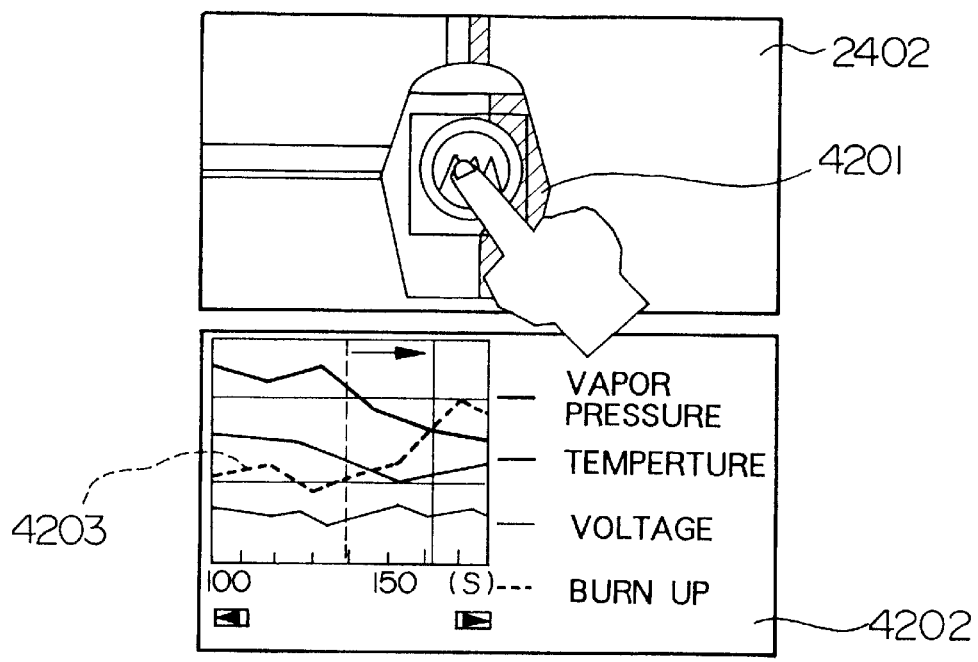
FIG. 50 is an explanatory diagram of a display representation in accordance with another embodiment of the present invention.

An eighth function is such that in FIG. 50, a window of a boiler displayed in the moving picture display region 2402 is defined as a selecting object 4201, when this object is selected, a graphics for indicating that this selecting object is selected is represented, and also a title of process data 4202 produced therefrom is represented in the process data item in the trend graph 2403, and furthermore the process data 4203 is displayed as a graph. As described above, the related process data is displayed by selecting the selecting object within the picture with employment of the pointing device. It should be noted that the selected object is not the window of the boiler, but the window may be previously registered as the selecting object in the controlling computer. Although the data may be displayed in the meter 2405 other than in the trend graph 2403, for the sake of simplicity, only such a case that the data is displayed in the trend graph 2403 will now be described.

Figure 51:
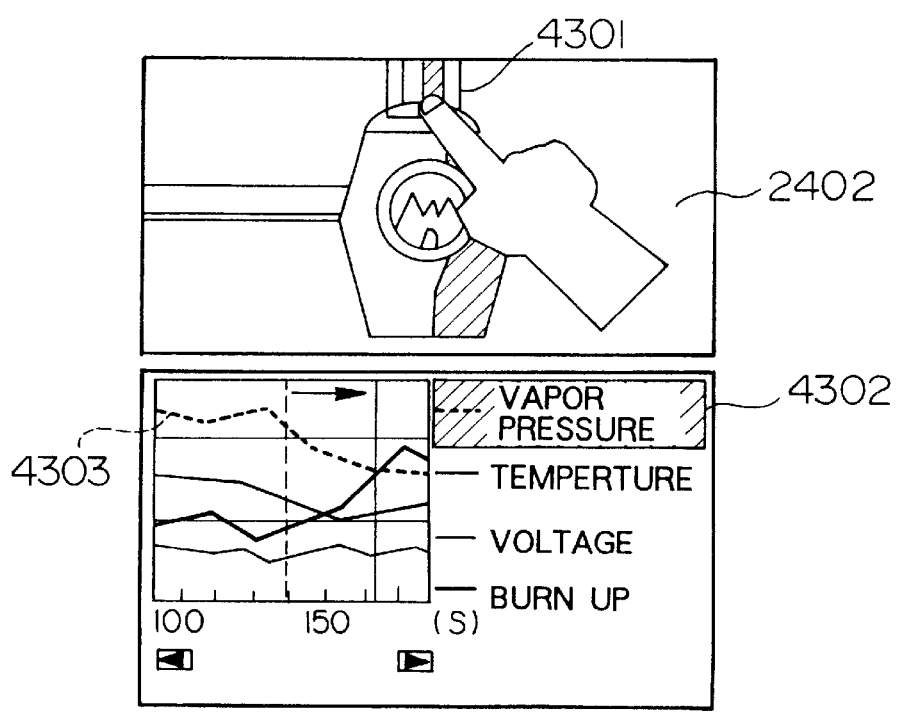
FIG. 51 is an explanatory diagram of a display representation in accordance with another embodiment of the present invention.

A ninth function is such that in FIG. 51, an upper pipe of a boiler displayed in the moving picture display region 2402 is defined as a selecting object 4301, when this object is selected, a graphics for representing that this selecting object is selected is represented, in case that process data 4302 related to this selecting object corresponds to a vapor pressure which has been previously displayed in the trend graph 2403, vapor pressure 4302 of the process data item is highlighted and also a graph 4303 is highlighted, which represents the data related to the selecting object which has been selected by the operator. In other words, when the data about the selecting object within the selected picture was already displayed, the data is highlighted by which the selecting object has been selected.

Figure 52:
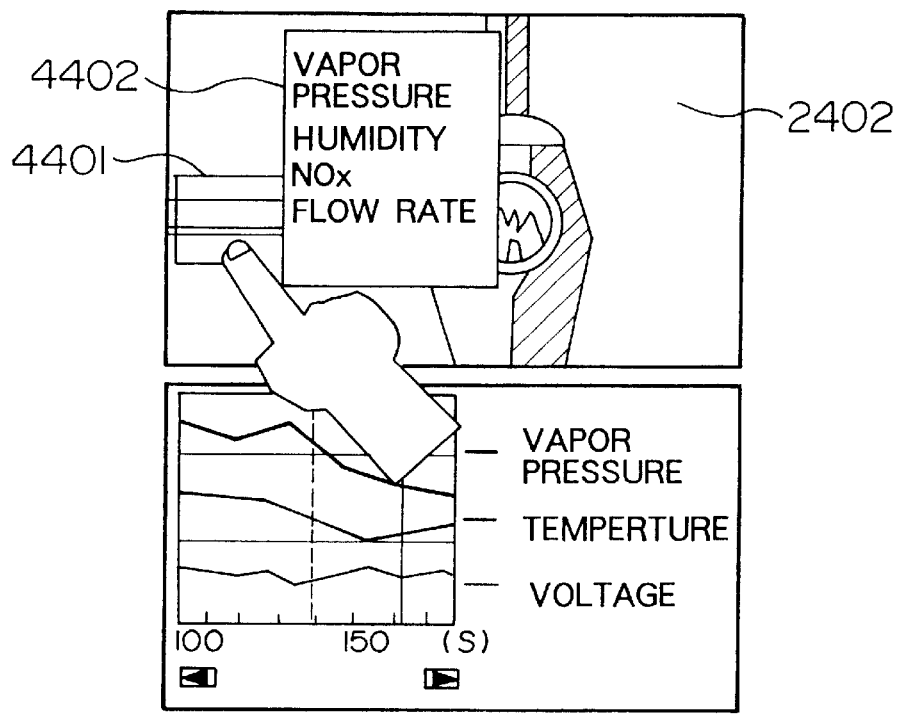
FIG. 52 is an explanatory diagram of a display representation in accordance with another embodiment of the present invention.

A tenth function is such that in FIG. 52, a left pipe of a boiler displayed in the moving picture display region 2402 is defined as a selecting object 4401, when this object is selected, a graphics indicating that this object has been selected is represented; when there are a plurality of process data related to this selecting object, a selection menu 4402 located just beside the selecting object within the moving picture and containing process data as an item, is represented, and also data is displayed within the trend graph 2403 by selecting desirable process data for reference from the selection menu 4402 with employment of the pointing device. In other words, in case that there are plural data related to the selecting object within the selected picture, the selection menu is displayed from which an operator can select desirable data to be referred.

Figure 53:
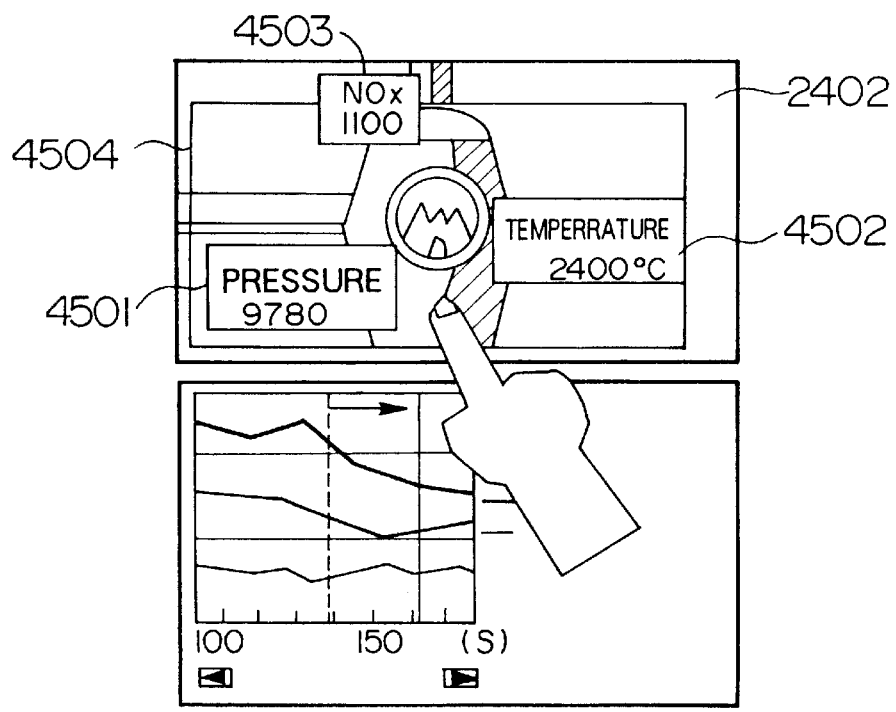
FIG. 53 is an explanatory diagram of a display representation in accordance with another embodiment of the present invention.

An seventh function is such that in FIG. 53, a main body of a boiler displayed in the moving picture display region 2402 is defined as a selecting object, when this selecting object is selected, a graphics 4501 for indicating that this selecting object has been selected, and process data 4502 to 4504 related to this graphics are displayed with being superimposed with the corresponding moving pictures. That is to say, the related process data is displayed at the relevant place within the picture by selecting the selecting object within the picture with employment of the pointing device.

Figure 54:
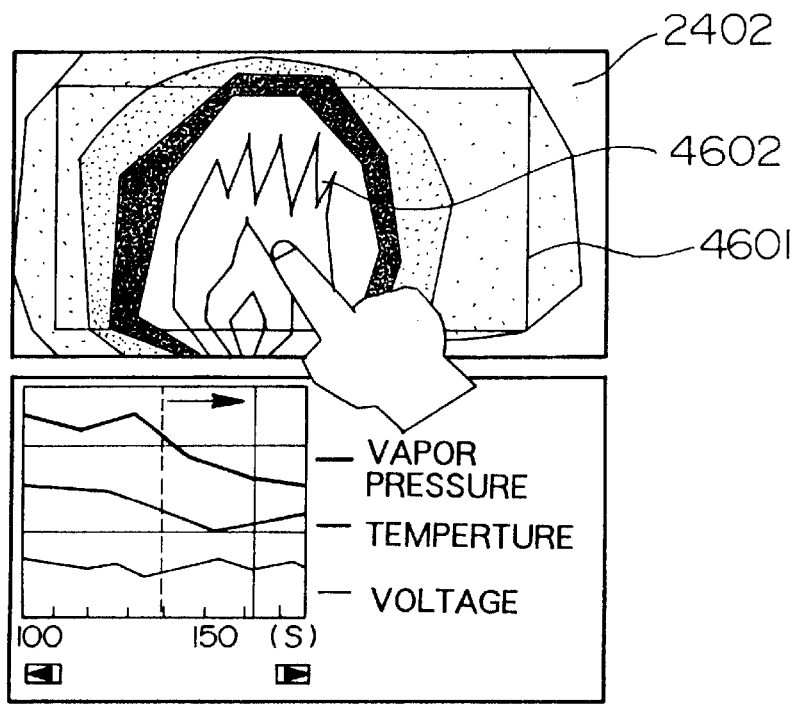
FIG. 54 is an explanatory diagram of a display representation in accordance with another embodiment of the present invention.

A twelfth function is such that in FIG. 54, an entire boiler displayed in the moving picture display region 2402 is defined as a selecting object, when this object is selected, a graphics 4601 for representing that this object has been selected is displayed, temperature distribution data related to this selecting object is called out, and this temperature distribution data is superimposed with a computer graphics 4602 on a picture for a display purpose. The selecting object within the picture is selected by employing the pointing device, and a representation made by the process data with the computer graphics is superimposed on this selecting object.

Figure 55:
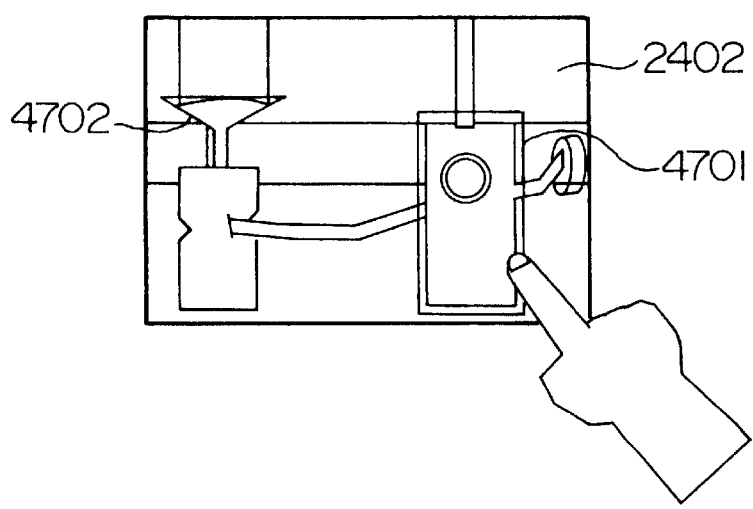
FIG. 55 is an explanatory diagram of a display representation in accordance with another embodiment of the present invention.

A thirteenth function is such that in FIG. 55, an overall boiler displayed in the moving picture display region 2402 is defined as a selecting object, when this object is selected, a graphics 4701 for indicating that this selecting object has been selected is represented, and also a graphics 4701 is displayed on a fuel supply unit having a close relationship with this selecting object. In other words, the selecting object within the picture is selected by using the pointing device, so that the selecting object within the picture related to this selecting object is displayed.

Figure 56:
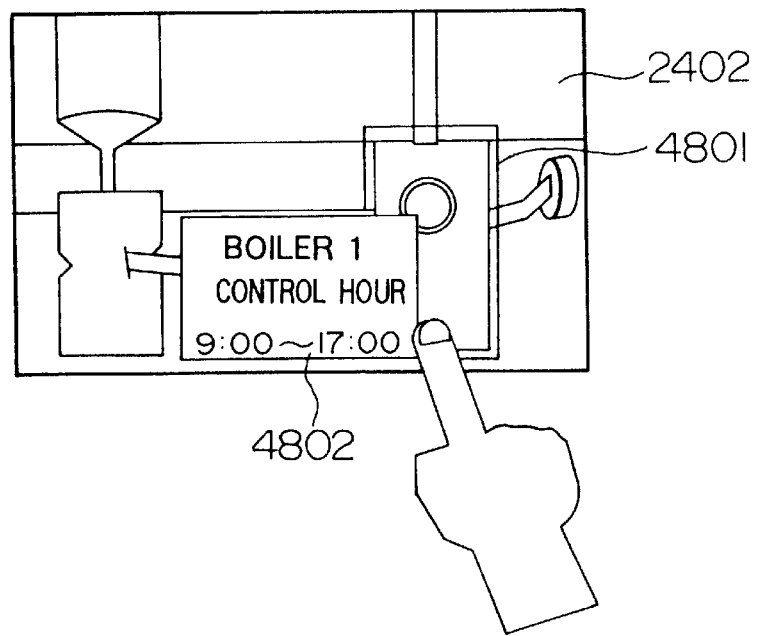
FIG. 56 is an explanatory diagram of a display representation in accordance with another embodiment of the present invention.

A fortieth function is such that in FIG. 56, an entire boiler displayed in the moving picture display region 2402 is defined as a selecting object, when this object is selected, a graphics 4801 for indicating that this selecting object has been selected is displayed, and also additional information 4802 such as the control method and the maintenance information concerning this selecting object are read out from the database, and then displayed on the picture. In other words, the selecting object within the picture is selected by employing the pointing device, and therefore the additional information such as the controlling method and the maintenance information and also the operation method for this selecting object is represented.

As described above, based on the functions 8 to 14, the relationships between the process data and the apparatuses displayed in the picture information can be established, so that the operator can refer to the relevant apparatus within the picture by the process data, and also refer to the process by the apparatus within the picture. As a consequence, for instance, even if an operator has not much experience, he can simply operate the apparatus and can monitor the apparatus while observing the picture and the data.

Next, information is represented within a picture with employment of process data.

Figure 57:
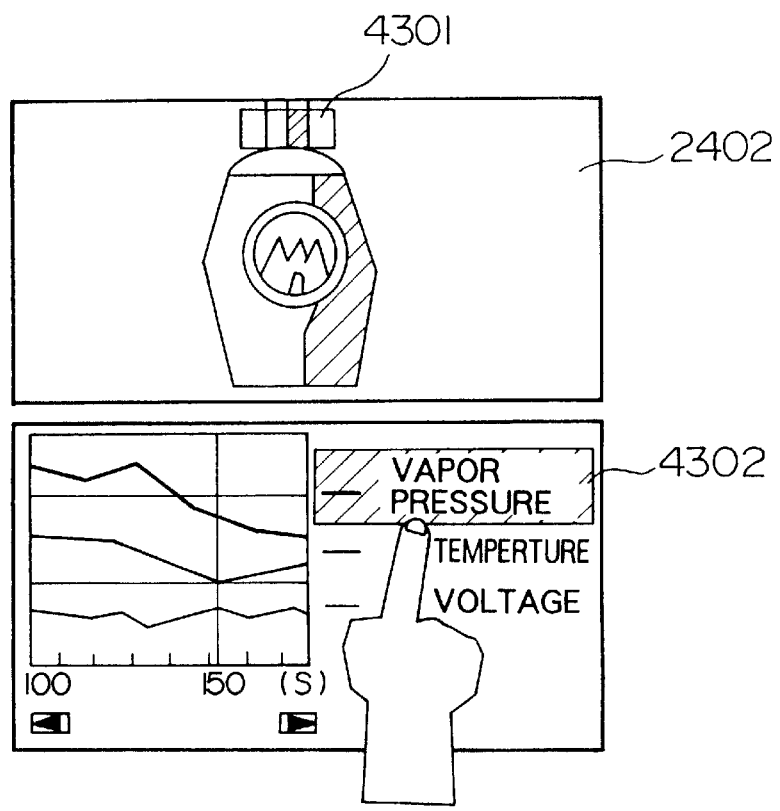
FIG. 57 is an explanatory diagram of a display representation in accordance with another embodiment of the present invention.

A fifteenth function is such that in FIG. 57, a process data item 4302 in the trend graph 2403 is selected and this process data item 4302 is highlighted, whereby a representation is made that this process data has been selected, and further a graphics 4301 for indicating that a selecting object related to this process data is present in the picture display region 2402, is displayed. In other words, a graphics is displayed which indicates which selecting object has a relationship with the process data within the picture.

Figure 58:
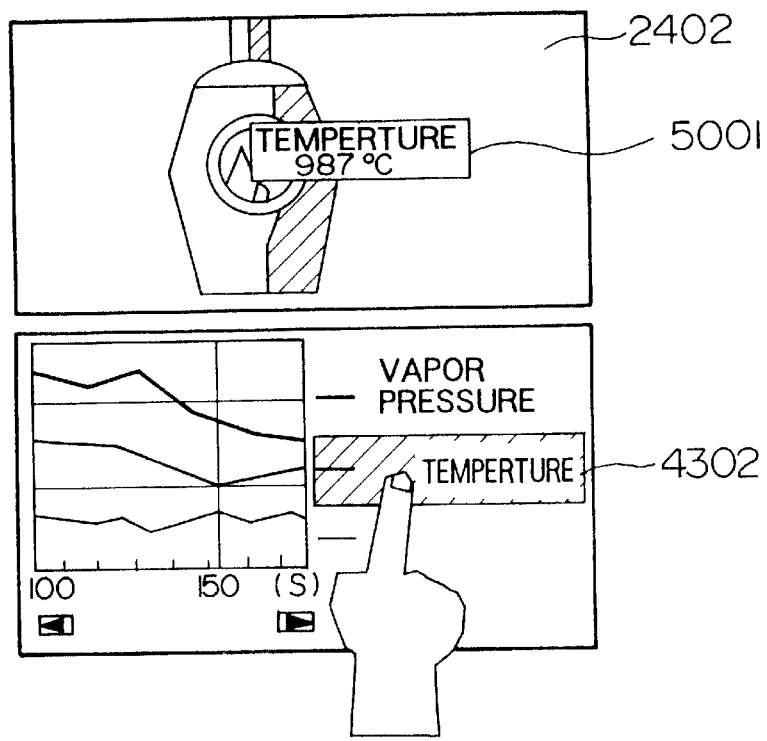
FIG. 58 is an explanatory diagram of a display representation in accordance with another embodiment of the present invention.

A sixteenth function is such that in FIG. 58, a process data item 4302 in a trend graph 2403 is selected, whereby process data 5001 is superimposed on a selecting object related to this process data and is displayed in the picture 2402.

Figure 59:
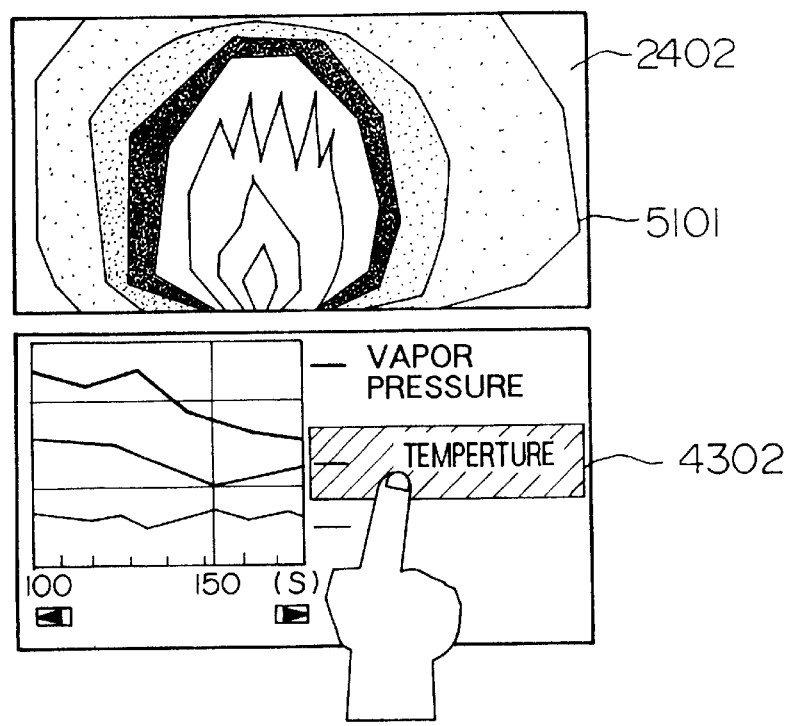
FIG. 59 is an explanatory diagram of a display representation in accordance with another embodiment of the present invention.

A seventeenth function is such that in FIG. 59, a selection is made of a process data item 4302 within a trend graph 2403, so that process data is superimposed with a computer graphics 5101 on a selecting object related to this process data, and is displayed within the picture 2402.

With respect to the examples of the above-described functions 8 to 16, a realizing method thereof will now be described with using FIG. 60. A shape model of a apparatus 5201 to be controlled is recorded in the work station 2103, which is an object to be monitored. A portion of this shape model is defined as a selecting object for receiving an input from an operator. This shape model may be such a mere rectangular region which has been defined by 3-dimensional data such as a CAD model, a process design drawing, or an image obtained from the camera 2110, which is observed by an operator. To determine a position and a size of this selecting object within a picture, view angle information, vertical angle information, and horizontal angle information derived from the ITV camera 2110 are recorded together with a time instant in the database 2104. Alternatively, based upon the camera control command to be transferred to the ITV camera and the initial set of the ITV camera, the view angle information, vertical angle information and horizontal angle information are calculated by the CPU 2201 in the work station 2103, the calculation result is sent to the database 2104 and then is recorded together with the time instants. Since the ITV camera and the apparatus to be controlled are not moved, the position and the dimension of the selecting object within the image can be recognized by combining the initial position of the camera, the camera information to be recorded, and the shape model.

The ITV camera 2110 for imaging the process apparatus 5201 forms images 5202 to 5204 by giving the vertical angle information 5211, the horizontal angle information 5212 and the zoom values thereto. Here, images of the process apparatus 5201 displayed on the respective pictures are 5202, 5206 and 5207, depending upon the zoom values. A scaling operation of the selecting object inside the computer is carried out in accordance with the respective zoom values. If a simple rectangular region is employed as the selecting region, a selecting object corresponding to the image 5202 is 5208, a selecting object corresponding to the image 5203 is 5209, and also a selecting object corresponding to the image 5204 is 5210. Since the scaling operations are linear, these scaling operations can be readily carried out.

With respect to such a defined selecting object, when either a selection is made from an operator, or any message command is transferred from other selecting object, such a definition has been made to initiate operations that the selecting object is displayed and the related data is issued.

A data structure of this selecting object is indicated by data 286 shown in FIG. 36G. Reference numerals 2861 and 2862 show a size of the selecting object, reference numerals 2863 and 2864 indicate a position, and reference numeral 2865 indicates an operation which is initiated when being selected by an operator, or into which a pointer or the like to an operation table is entered, and also relevant text information is inputted into 2866. As a consequence, the apparatuses within the picture can be related to either the process data, or the related information. Also, a relationship among the apparatuses within the picture can be established. Furthermore, the process data and the selecting object are merely displayed, but also a predefined instruction may be executed when a selection is made.

As described above, the process data can be displayed on the apparatus in the picture, and an operator can observe both of the moving picture and the process data without moving his eyes. Also, this is represented as a computer graphics, so that an operator can intuitively judge a data value. It can be avoid to record useless pictures or a back scene within a picture which is not continuously required to be recorded, by setting a condition of picture recording time. Thus, the video, audio and process data are reproduced in synchronism with each other, so that the process conditions can be more easily grasped and the extraordinary cases can be quickly found out.

A direct operation can be achieved by selecting the process data to which the operator wishes to refer, from the picture, or directly selecting such a picture from the process data display unit. As a result, the monitoring characteristic, operability and reliability of the process can be improved. Furthermore, the process data with employment of the video data can be searched, and the video data with employment of the process data can be searched.

The above-described 8th to 17th functions can be realized as the same realizing methods as to not only the sound and the picture which have been recorded, but also the sound and the picture which are inputted in real time. At this time, the control data to be displayed corresponds to data which is actually acquired. The image selections are carried out by selecting the ITV cameras, or by remote-controlling the ITV cameras to pan, or zoom the cameras.

As previously described, the present embodiments have the following advantages.

(1). Preview When Process Data Values Are Set

A preview can be performed by searching/displaying the video and process data from the past data to check how the process is going when an operator sets the process data to a certain value.

(2). Comparison in Operation Monitoring

The condition of the process can be grasped by comparing the operation state of the monitoring process with the video for imaging the recorded operation state, the audio, and the process data.

(3). Determination on Process Data Set Value

To set a certain process data value to a desired value, a related data value must also be set. As described above, when a plurality of data values are needed to be set, a determination policy of the set value can be given to an operator by referring to the past data, video and audio data.

(4). Search and Analysis of Extraordinary Matter

The search of the extraordinary case and the detection of the malfunction area can be effectively performed by using the synchronizing reproduction of the past process data, video and audio.

(5). Educational Simulation

An operation manual of an operator may be employed as an educational simulation by reproducing the operation manual.

It should be noted that although the time is recorded in order to synchronize the measured data with the video data, or the audio data in this embodiment, the present invention is not limited thereto. For instance, a serial number is attached to the measured data and the video data or the like, and then the measured data may be synchronized with either the video data, or the audio data under condition that this serial number is used as the keys.

With respect to the reproduction of the video data, or the audio data, the reproducing speed is increased or delayed in the above-described embodiments, but the present invention is not limited thereto. For example, as the reproducing method, the video data or the audio data may be stationary (paused). As to this stationary method, a method by an operation of an operator may be employed, or an alarm is previously recorded, and the video data reproduction may be stopped when the alarm happens to occur. At this time, there is such a merit that the screen when the failure happens to occur can be quickly searched if the reason of this failure is analyzed.

Furthermore, the present embodiment is not only directed to the moving picture by the above-described ITV cameras, but also may process a still picture by a still camera.

According to this embodiments, it is possible to provide a monitoring system capable of reproducing the measured data in synchronism with the video or sound information.

What is claimed is:

1. An interactive live video image operating apparatus, for performing information processing using stored data to control at least one apparatus, including stored at least one of audio and video data related to said at least one apparatus, a live video image of said at least one apparatus photographed live by a video camera being displayed live on a screen of a display means, comprising:

a data memory for storing said control data and said at least one of audio and video data with respect to said at least one apparatus;

a means for designating a subject apparatus of said at least one apparatus by designating a subject live video image corresponding to said subject apparatus being displayed live on said display means;

a means for searching said data memory based on a designated said subject apparatus to obtain said control data and said at least one of audio and video data corresponding to said subject apparatus;

a means for relating said control data with said at least one of audio and video data;

a means for using a related data obtained from said means for relating to control said subject apparatus;

a first reproducing means for reproducing said control data;

a second reproducing means for reproducing said at least one of said audio data and said video data; and an output means, wherein said means for relating includes means for storing information for relating said control data to said at least one of said audio data and said video data, wherein said output means including:

a first output means for outputting a measurement data with respect to said subject apparatus;

a second output means for outputting a reproduced said et least one of said audio data and said video data;

a synchronizing means for controlling said first and second output means in such a manner that an outputted said control data is synchronized with said at least one of said audio data and said video data based on said related, wherein said second output means further includes:

a direction/speed designating means for designating at least one of a reproducing direction and a reproducing speed with respect to said at least one of said audio data and said video data; and a means for reproducing said at least one of said audio data and said video data at a designated reproducing speed and a designated reproducing direction.

2. An interactive live video image operating apparatus as claimed in claim 1, further comprising an input storage means for storing operation input information of an operator; and wherein said output means includes third output means for outputting said operation input information of said operator in synchronism with reproduction of said at least one of said video data and said audio data.

3. An interactive live video image operating apparatus as claimed in claim 1, further comprising time designating means for designating a time instant when a control data is reproduced, and wherein said synchronizing means instructs said first output means in such a manner that said at least one of said video data or said audio data is outputted at a time very close to said time instant when said control data is reproduced.

4. An interactive live video image operating apparatus as claimed in claim 3, wherein said time designating means includes a means for accepting a search value of said control data;

said synchronizing means includes a means for searching for designated said control data with respect to said time instant search value; and said first output means includes a means for outputting both of said time instant and said control data with respect to said time instant.

5. An interactive live video image operating apparatus as claimed in any one of the preceding claims 1 to 4, wherein said synchronizing means includes:

a means for determining a display degree of said control data in accordance with a reproducing speed of said at least one of said video data and said audio data; and a means for displaying said control data at a determined said display degree in synchronization with reproduction of said at least one of said audio data and said video data.

6. An interactive live video image operating apparatus as claimed in any one of the preceding claims 4 to 5, wherein said designating means includes a means for accepting a control display degree of said control data;

wherein said first output means includes a means for displaying said control data in accordance with a determined said control display degree;

said synchronizing means includes a means for determining a reproducing speed from said determined said control display degree; and said first output means includes a means for outputting said video data and said audio data at a determined speed.

7. An interactive live video image operating apparatus, an information processing apparatus for storing data to control an object (referred to "control datal hereinafter), and also for storing either audio, or video data related to said object, comprising:

means for relating the control data with the audio, or video data; and means for relating the control data with the audio, or video data based upon said relating means to be outputted;

an information processing apparatus, wherein;

first reproducing means for reproducing said control data, and second reproducing means for reproducing at least one of said audio data and said video data are further comprised;

said relating means includes means for storing information for relating said control data to said audio data, or said video data;

an output means which includes: first output means for outputting said reproduced measurement data;

second output means for outputting said reproduced sound data, or said reproduced video data;

synchronizing means for controlling said first and second output means in such a manner that said outputted control data is synchronized with said audio data, or said video data based on said relating information to be outputted;

further comprising an input storage means for storing operation input information of an operator; and wherein said output means includes third output means for outputting said operation input information of said operator in synchronism with reproduction of said at least one of said video data and said audio data;

further comprising an accepting means for accepting operation input information; and wherein said synchronizing means includes a means for searching said at least one of said video and said audio data acquired at a time very close to a time when an accepted said operation input information is inputted; and said second output means includes a means for controlling said third output means to output said operation input information in synchronism with reproduction of said at least one of said video data and said audio data by said second output means.

* * * * *